United States Patent
Tomita

(10) Patent No.: US 12,050,363 B2
(45) Date of Patent: *Jul. 30, 2024

(54) INTERCHANGEABLE LENS, CAMERA BODY, AND CAMERA

(71) Applicant: NIKON CORPORATION, Tokyo (JP)

(72) Inventor: Hiroyuki Tomita, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 16/913,175

(22) Filed: Jun. 26, 2020

(65) Prior Publication Data
US 2020/0326502 A1    Oct. 15, 2020

Related U.S. Application Data

(63) Continuation of application No. 15/522,585, filed as application No. PCT/JP2015/081280 on Nov. 6, 2015, now Pat. No. 10,732,379.

(30) Foreign Application Priority Data

Nov. 7, 2014   (JP) .................................. 2014-227560

(51) Int. Cl.
*G02B 7/28*      (2021.01)
*G02B 7/02*      (2021.01)
(Continued)

(52) U.S. Cl.
CPC ............... *G02B 7/282* (2013.01); *G02B 7/02* (2013.01); *G02B 7/021* (2013.01); *G02B 7/09* (2013.01);
(Continued)

(58) Field of Classification Search
CPC .......... G02B 7/282; G02B 7/02; G02B 7/021; G02B 7/09; G02B 7/28; G02B 26/0816;
(Continued)

(56) References Cited

U.S. PATENT DOCUMENTS 5,079,582 A    1/1992   Hamada et al.
5,206,677 A    4/1993   Onuki et al.
(Continued)

FOREIGN PATENT DOCUMENTS

CN    1573505 A    2/2005
CN    1847901 A    10/2006
(Continued)

OTHER PUBLICATIONS

Sep. 8, 2021 Office Action issued in U.S. Appl. No. 17/227,709.
(Continued)

*Primary Examiner* — Collin X Beatty
(74) *Attorney, Agent, or Firm* — Oliff PLC

(57) ABSTRACT

An interchangeable lens attachable to a camera body, the interchangeable lens including: a focusing optical system configured to vary a focal position of the interchangeable lens; and a transmitter configured to transmit a first value and a second value to the camera body, the first value indicating a relationship between an amount of movement of the focusing optical system and an amount of movement of an image plane at a position to which the focusing optical system has moved, the second value indicating a relationship between an amount of movement of the focusing optical system and an amount of movement of the image plane, the second value being equal to or smaller than the first value.

6 Claims, 27 Drawing Sheets

(51) Int. Cl.
*G02B 7/09* (2021.01)
*G02B 15/14* (2006.01)
*G02B 26/08* (2006.01)
*G03B 17/14* (2021.01)
*H04N 23/51* (2023.01)
*H04N 23/55* (2023.01)
*H04N 23/67* (2023.01)

(52) U.S. Cl.
CPC ............ *G02B 7/28* (2013.01); *G02B 15/144* (2019.08); *G03B 17/14* (2013.01); *H04N 23/51* (2023.01); *H04N 23/55* (2023.01); *H04N 23/673* (2023.01); *G02B 26/0816* (2013.01); *H04N 23/672* (2023.01)

(58) Field of Classification Search
CPC ................. G02B 15/144; G03B 17/14; H04N 5/232123; H04N 5/2252; H04N 5/2254; H04N 5/232122
See application file for complete search history.

(56) References Cited

U.S. PATENT DOCUMENTS

| | | | |
|---|---|---|---|
| 5,227,832 | A | 7/1993 | Kawasaki et al. |
| 6,208,811 | B1 | 3/2001 | Tanaka |
| 7,742,693 | B2 | 6/2010 | Kobayashi |
| 8,139,140 | B2 | 3/2012 | Yumiki |
| 8,400,722 | B2 | 3/2013 | Imafuji et al. |
| 8,542,314 | B2 | 9/2013 | Shibuno et al. |
| 8,619,180 | B2 | 12/2013 | Kimura |
| 8,947,579 | B2 | 2/2015 | Terashima et al. |
| 9,635,239 | B2 | 4/2017 | Tomita et al. |
| 10,302,902 | B2 | 5/2019 | Tomita et al. |
| 10,536,620 | B2 | 1/2020 | Tomita |
| 11,006,032 | B2 | 5/2021 | Tomita |
| 11,375,099 | B2 | 6/2022 | Tomita |
| 11,474,325 | B2* | 10/2022 | Tomita ............... H04N 23/672 |
| 2002/0127012 | A1 | 9/2002 | Okawara |
| 2004/0057712 | A1 | 3/2004 | Sato et al. |
| 2005/0012843 | A1 | 1/2005 | Kuwakino et al. |
| 2006/0232701 | A1 | 10/2006 | Ito et al. |
| 2007/0196093 | A1 | 8/2007 | Tanaka |
| 2007/0258710 | A1 | 11/2007 | Yamasaki |
| 2008/0007644 | A1 | 1/2008 | Matsumoto |
| 2009/0115883 | A1 | 5/2009 | Tsuchiya |
| 2009/0251554 | A1 | 10/2009 | Kido et al. |
| 2009/0256951 | A1 | 10/2009 | Yumiki |
| 2010/0026821 | A1 | 2/2010 | Sato et al. |
| 2010/0091175 | A1 | 4/2010 | Shintani et al. |
| 2010/0110277 | A1 | 5/2010 | Shibuno et al. |
| 2010/0128144 | A1 | 5/2010 | Tay |
| 2010/0157134 | A1 | 6/2010 | Kawarada |
| 2010/0165479 | A1 | 7/2010 | Ishikawa |
| 2011/0141340 | A1 | 6/2011 | Yumiki et al. |
| 2011/0261251 | A1 | 10/2011 | Okamoto et al. |
| 2011/0293256 | A1 | 12/2011 | Ishiwata et al. |
| 2012/0026386 | A1 | 2/2012 | Tomita |
| 2012/0038818 | A1 | 2/2012 | Hamada |
| 2012/0307133 | A1 | 12/2012 | Gao et al. |
| 2012/0307134 | A1 | 12/2012 | Morimoto |
| 2013/0010179 | A1 | 1/2013 | Takahara et al. |
| 2013/0022348 | A1 | 1/2013 | Hasuda et al. |
| 2013/0148953 | A1* | 6/2013 | Imafuji ............... H04N 23/663 396/529 |
| 2014/0320736 | A1 | 10/2014 | Tomita et al. |
| 2016/0269617 | A1 | 9/2016 | Tomita |
| 2017/0184811 | A1 | 6/2017 | Tomita et al. |
| 2018/0081148 | A1 | 3/2018 | Tomita |
| 2018/0109718 | A1 | 4/2018 | Okubo |

FOREIGN PATENT DOCUMENTS

| | | |
|---|---|---|
| CN | 101025467 A | 8/2007 |
| CN | 101101429 A | 1/2008 |
| CN | 102262332 A | 11/2011 |
| CN | 102819168 A | 12/2012 |
| JP | 03-150513 | 6/1991 |
| JP | 04-315116 | 11/1992 |
| JP | H05-257055 A | 10/1993 |
| JP | 05-313062 | 11/1993 |
| JP | 08-76001 | 3/1996 |
| JP | H08-265620 A | 10/1996 |
| JP | H09-211648 A | 8/1997 |
| JP | 11-084220 | 3/1999 |
| JP | 2000-019379 A | 1/2000 |
| JP | 2002023041 A | 1/2002 |
| JP | 2002-267924 A | 9/2002 |
| JP | 2003-029135 A | 1/2003 |
| JP | 2006-78660 A | 3/2006 |
| JP | 2007-206451 A | 8/2007 |
| JP | 2007233943 A | 9/2007 |
| JP | 2008-052191 A | 3/2008 |
| JP | 2008-158028 A | 7/2008 |
| JP | 2008-203515 A | 9/2008 |
| JP | 2008-241733 A | 10/2008 |
| JP | 2009-145645 A | 7/2009 |
| JP | 2010-139666 A | 6/2010 |
| JP | 2010-145887 A | 7/2010 |
| JP | 2011043776 A | 3/2011 |
| JP | 2011-248161 A | 12/2011 |
| JP | 2012-032569 A | 2/2012 |
| JP | 2013-057746 A | 3/2013 |
| JP | 2014-153615 A | 8/2014 |
| JP | 2014219643 A | 11/2014 |
| JP | 2016-090903 A | 5/2016 |
| WO | 2013/069795 A1 | 5/2013 |

OTHER PUBLICATIONS

Apr. 6, 2021 Office Action issued in Japanese Patent Application No. 2020-107791.
Aug. 31, 2020 Office Action issued in U.S. Appl. No. 16/713,631.
Jun. 15, 2021 Office Action issued in U.S. Appl. No. 16/390,358.
Oct. 5, 2021 Office Action issued in Japanese Patent Application No. 2020-125706.
Oct. 6, 2021 Office Action issued in U.S. Appl. No. 16/390,358.
Jan. 2, 2020 Office Action issued in Chinese Patent Application No. 201810105612.5.
Jan. 22, 2019 Office Action issued in Chinese Application No. 201480037465.2.
Mar. 27, 2018 Office Action issued in Japanese Patent Application No. 2017-039743.
Apr. 3, 2018 Office Action issued in Japanese Patent Application No. 2017-099025.
May 15, 2018 Office Action issued in Japanese Patent Application No. 2017-099024.
May 24, 2018 Search Report issued in European Patent Application No. 15857370.9.
Aug. 12, 2014 International Search Report issued in International Patent Application No. PCT/JP20141062529.
Oct. 2, 2015 International Preliminary Report on Patentability issued in International Patent Application No. PCT/JP2014/062529.
Jun. 17, 2015 Partial Supplementary Search Report in European Patent Application No. 12847609.0.
Feb. 12, 2013 International Search Report issued in International Patent Application No. PCT/JP20121079189.
Ijima, English Language Abstract of Japanese Patent Application Publication No. H04-315116 filed Jun. 11, 1992.
Oct. 8, 2015 Extended European Search Report issued in European Patent Application No. 12847609.0.
Jun. 14, 2016 Office Action issued in Japanese Patent Application No. 2013-543059.
Sep. 16, 2016 Extended Search Report issued in European Patent Application No. 14794746.9.
Jan. 31, 2018 Decision to Grant issued in Russian Patent Application No. 2014123677.
Jun. 4, 2018 Office Action issued in U.S. Appl. No. 15/461,151.
U.S. Appl. No. 14/267,348, filed May 1, 2014 in the name of Tomita, et al.

(56) References Cited

OTHER PUBLICATIONS

Apr. 19, 2016 Office Action Issued In U.S. Appl. No. 14/267,348.
Mar. 26, 2018 Office Action Issued in U.S. Appl. No. 15/138,711.
Dec. 16, 2016 Notice of Allowance cited in U.S. Appl. No. 14/267,348.
Sep. 26, 2017 Office Action issued in Japanese Patent Application No. 2016-191382.
Sep. 26, 2017 Office Action issued in Japanese Patent Application No. 2016-190995.
Jun. 30, 2017 Office Action issued in U.S. Appl. No. 15/138,711.
Jan. 19, 2016 International Search Report issued in International Patent Application No. PCT/JP2015/081280.
Nov. 20, 2020 Office Action issued in U.S. Appl. No. 16/390,358.
Dec. 1, 2020 Office Action issued in Japanese Patent Application No. 2019-237139.
May 3, 2018 Office Action issued in U.S. Appl. No. 15/522,585.
Feb. 5, 2019 Office Action issued in U.S. Appl. No. 15/522,585.
Aug. 28, 2019 Office Action issued in U.S. Appl. No. 15/522,585.
Aug. 19, 2022 Office Action issued in Chinese Patent Application No. 202010711351.9.
Dec. 14, 2022 Office Action issued in U.S. Appl. No. 17/751,918.
May 30, 2023 Office Action issued in U.S. Appl. No. 17/751,918.
Nov. 20, 2023 Office Action issued in U.S. Appl. No. 18/132,462.

\* cited by examiner

FIG.3

| SHOOTING DISTANCE / FOCAL LENGTH | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

FIG.6
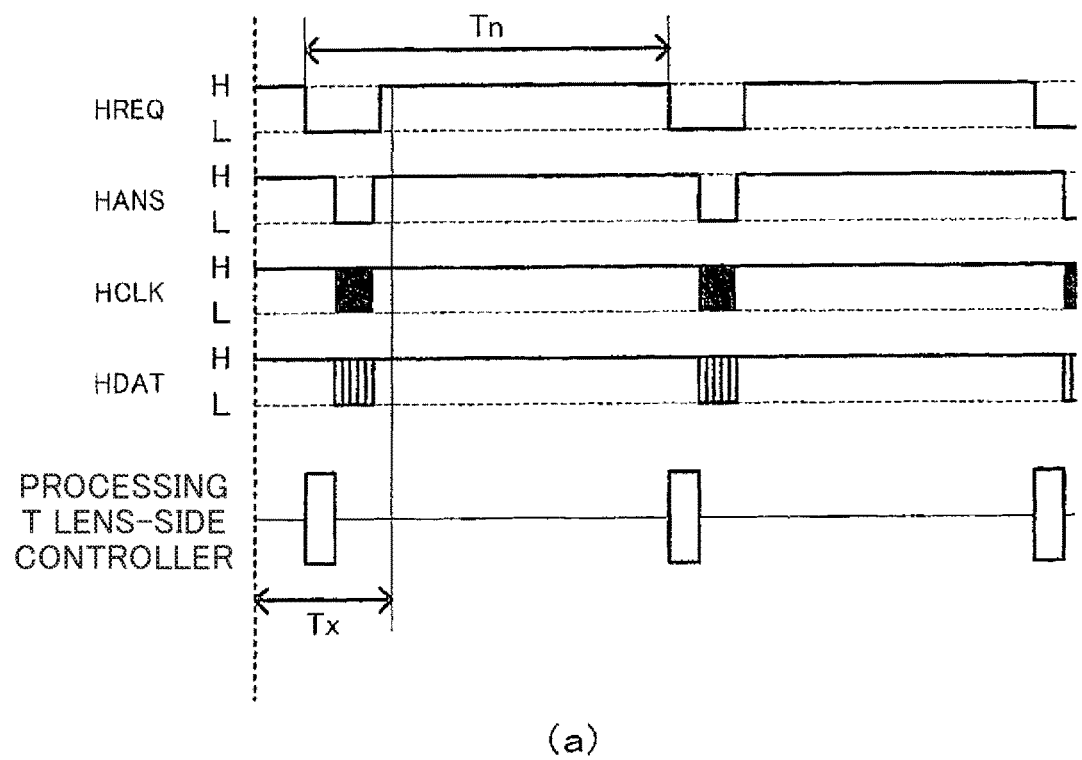
(a)
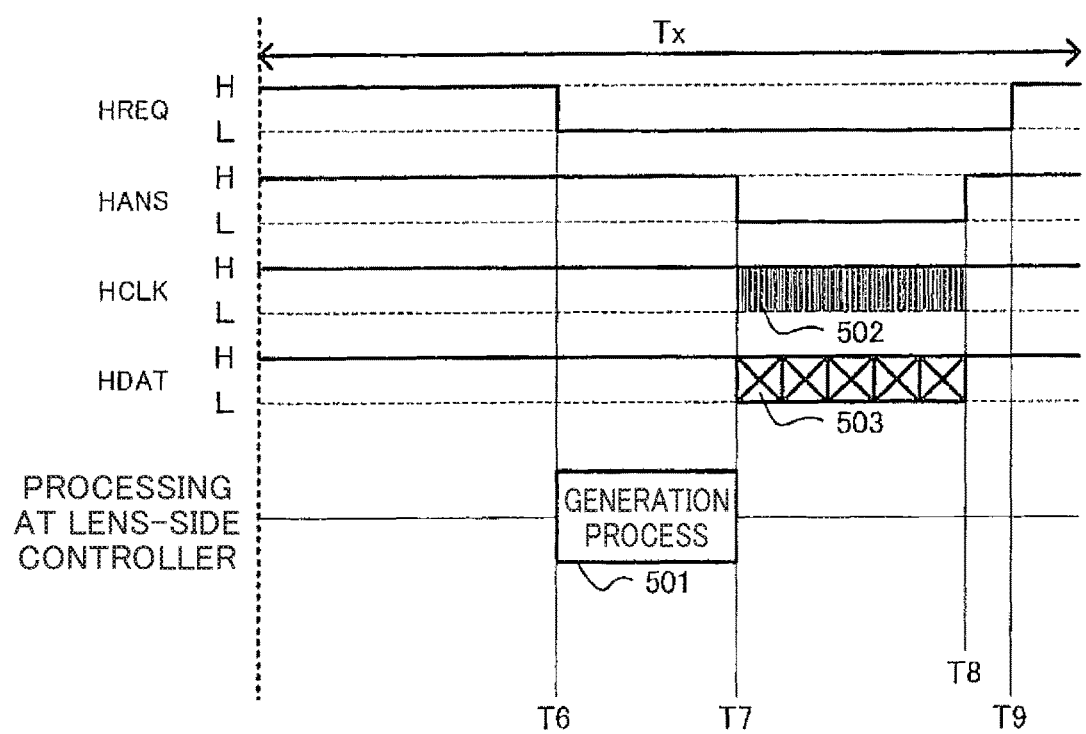
(b)

| | L<0.1a | 0.1a≤L<0.3a | 0.3a≤L<0.5a | 0.5a≤L |
|---|---|---|---|---|
| K2 | $K_{cur}$ | $K_{min}+0.6 \times (K_{cur}-K_{min})$ | $K_{min}+0.3 \times (K_{cur}-K_{min})$ | $K_{min}$ |

L: PREVIOUS FOCUS POSITION
a: ENTIRE SEARCH RANGE

FIG.14

| | T<1s | 1s≦T<2s | 2s≦T<3s | 3s≦T |
|---|---|---|---|---|
| K2 | $K_{cur}$ | $K_{min} \times 0.5$ $+0.6 \times (K_{cur} - K_{min})$ | $K_{min} \times 0.5$ $+0.3 \times (K_{cur} - K_{min})$ | $K_{min} \times 0.5$ |

T: TIME REQUIRED TO SEARCH ENTIRE SEARCH RANGE

FIG.25

| SHOOTING DISTANCE / FOCAL LENGTH | X1 | X2 | D0 | D1 | D2 | D3 | D4 | D5 | D6 | D7 | D8 | D9 | D10 | X3 | X4 |
|---|---|---|---|---|---|---|---|---|---|---|---|---|---|---|---|
| f1 | α11 | α12 | K10 | K11 | K12 | K13 | K14 | K15 | K16 | K17 | K18 | K19 | K110 | α13 | α14 |
| f2 | α21 | α22 | K20 | K21 | K22 | K23 | K24 | K25 | K26 | K27 | K28 | K29 | K210 | α23 | α24 |
| f3 | α31 | α23 | K30 | K31 | K32 | K33 | K34 | K35 | K36 | K37 | K38 | K39 | K310 | α33 | α34 |
| f4 | α41 | α24 | K40 | K41 | K42 | K43 | K44 | K45 | K46 | K47 | K48 | K49 | K410 | α43 | α44 |
| f5 | α51 | α25 | K50 | K51 | K52 | K53 | K54 | K55 | K56 | K57 | K58 | K59 | K510 | α53 | α54 |
| f6 | α61 | α26 | K60 | K61 | K62 | K63 | K64 | K65 | K66 | K67 | K68 | K69 | K610 | α63 | α64 |
| f7 | α71 | α27 | K70 | K71 | K72 | K73 | K74 | K75 | K76 | K77 | K78 | K79 | K710 | α73 | α74 |
| f8 | α81 | α28 | K80 | K81 | K82 | K83 | K84 | K85 | K86 | K87 | K88 | K89 | K810 | α83 | α84 |
| f9 | α91 | α29 | K90 | K91 | K92 | K93 | K94 | K95 | K96 | K97 | K98 | K99 | K910 | α93 | α94 |

FOCUSING DRIVE RANGE OF FOCUSING LENS 33 (D1–D10)

INTERCHANGEABLE LENS, CAMERA BODY, AND CAMERA

CROSS-REFERENCE TO RELATED APPLICATION(S)

This application is a continuation of U.S. application Ser. No. 15/522,585 filed Apr. 27, 2017, which is a National Stage Entry of PCT/JP2015/081280 filed on Nov. 6, 2015, and which is based on and claims priority under 35 U.S.C. 119 from Japanese Patent Application No. 2014-227560 filed on Nov. 7, 2014. The contents of the above applications are incorporated herein by reference.

TECHNICAL FIELD

The present invention relates to an interchangeable lens, a camera body, and a camera.

BACKGROUND ART

A digital single-lens reflex camera is formed with a camera body and an interchangeable lens (lens barrel).

CITATION LIST

Patent Literature

Patent Literature 1: JP 2010-139666 A

SUMMARY OF INVENTION

Technical Problem

The present invention is to provide an interchangeable lens that can drive a focusing optical system in a preferred manner, a camera body to which the interchangeable lens can be attached, and a camera that includes the interchangeable lens and the camera body.

Solution to Problem

A mode of the present invention is an interchangeable lens that can be attached to a camera body, and characteristically includes: a focusing optical system movable in the direction of an optical axis; and a transmitter that transmits a first image plane movement coefficient and a second image plane movement coefficient to the camera body, the first image plane movement coefficient varying with positions of the focusing optical system on the optical axis, the second image plane movement coefficient being equal to or smaller than the first image plane movement coefficient.

Another mode of the present invention is an interchangeable lens that includes: a movable focusing optical system; and a communication module that transmits a first coefficient and a second coefficient to a camera body, the first coefficient being an amount of movement of the focusing optical system relative to an amount of driving of an image plane in a case where the focusing optical system is located at the current position, the second coefficient being equal to or smaller than the first coefficient.

BRIEF DESCRIPTION OF DRAWINGS

FIG. 3 is a table showing the relationship between image plane movement coefficients K, and lens positions of a zoom lens 32 and a focusing lens 33.

FIGS. 6(a) and 6(b) are timing charts showing an example of hot-line communication.

FIG. 12 is a chart for explaining the operation to be performed by the camera 1 when a high-speed search is permitted.

FIG. 13 is a table showing an example relationship between a second coefficient K2 and the distance between the previous focus position and the initial lens position.

FIG. 14 is a table showing an example relationship between the second coefficient K2 and the time required to search an entire search range.

FIG. 25 is a table showing the relationship between image plane movement coefficients K, and lens positions of the zoom lens 32 and lens positions of the focusing lens 33.

DESCRIPTION OF EMBODIMENTS

First Embodiment

The following is a detailed description of embodiments, with reference to the accompanying drawings.

Figure 1:
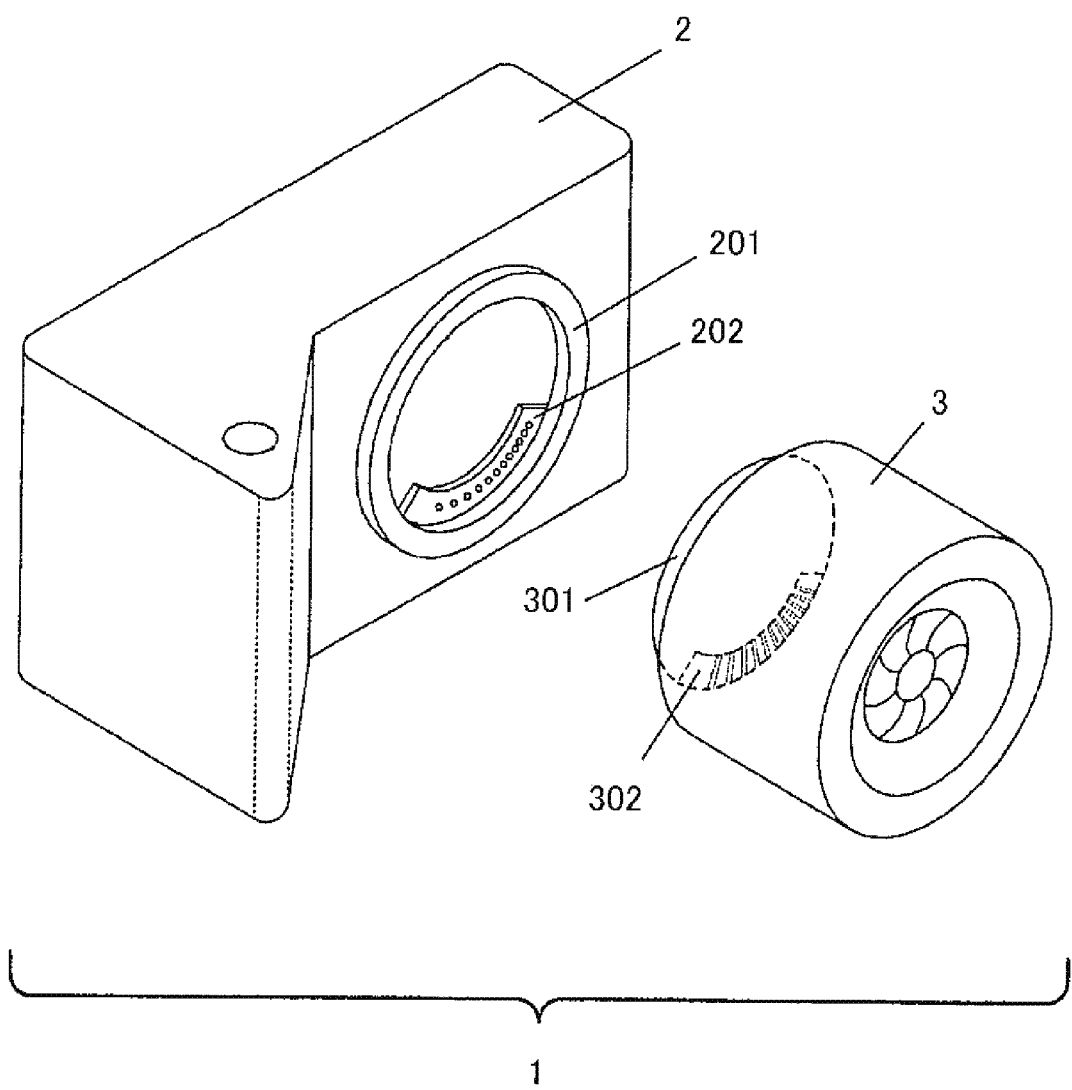
FIG. 1 is a perspective view of a digital single-lens reflex camera 1.
Figure 2:
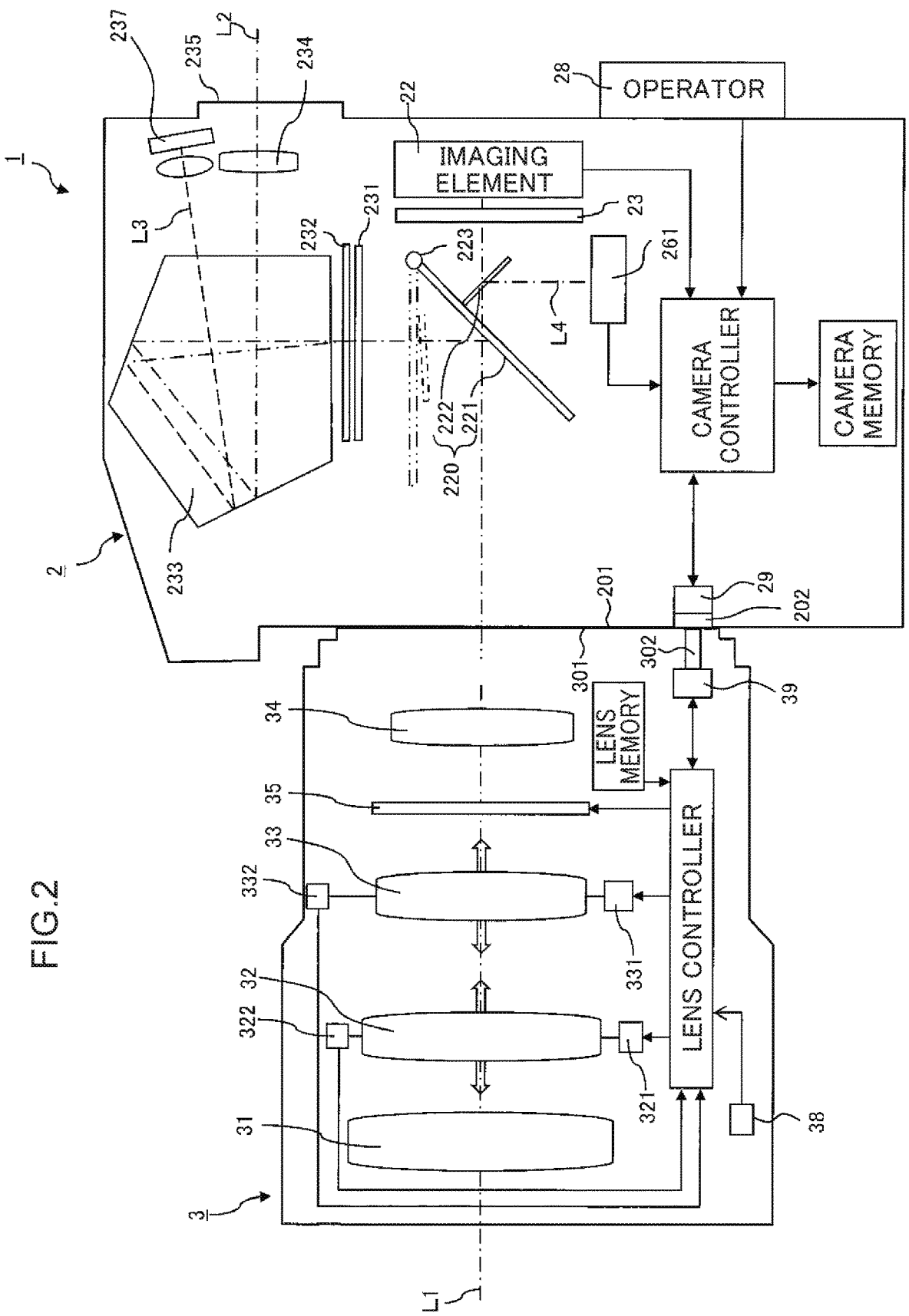
FIG. 2 is a configuration diagram showing the relevant components of the digital single-lens reflex camera 1.

FIG. 1 is a perspective view showing a digital single-lens reflex camera 1 (hereinafter referred to simply as the camera 1). FIG. 2 is a configuration diagram showing the relevant components of the camera 1. The camera 1 is formed with a camera body 2 and a lens barrel 3, and the camera body 2 and the lens barrel 3 are detachably joined to each other.

The lens barrel 3 is an interchangeable lens that can be detachably attached to the camera body 2. As shown in FIG. 2, the lens barrel 3 has an imaging optical system that includes lenses 31, 32, 33, and 34, and a diaphragm 35.

The lens 33 is a focusing lens (an example of a focusing optical system), and is capable of adjusting the focusing-state length of the imaging optical system by moving in the direction of an optical axis L1. The focusing lens 33 is provided so as to be movable along the optical axis L1 of the lens barrel 3, and, while being detected by an encoder 332 for a focusing lens, the position of the focusing lens 33 is adjusted by a focusing lens drive motor 331.

The focusing lens drive motor 331 is an ultrasonic motor, for example, and drives the focusing lens 33 in accordance with an electrical signal (pulse) that is outputted from a lens controller 36. Specifically, the driving speed of the focusing lens 33 driven by the focusing lens drive motor 331 is expressed in terms of pulses per second, and, as the number of pulses per unit time becomes larger, the driving speed of the focusing lens 33 becomes higher.

In this embodiment, a camera controller 21 of the camera body 2 transmits a designated driving speed (unit: pulses per second) of the focusing lens 33 to the lens barrel 3. The lens controller 36 then outputs a pulse signal to the focusing lens drive motor 331 in accordance with the designated driving speed (unit: pulses per second) transmitted from the camera body 2. With this, the focusing lens drive motor 331 drives the focusing lens 33 at the designated driving speed (unit: pulses per second) transmitted from the camera controller 21. The above process is also referred to simply as "the camera controller 21 driving the focusing lens 33".

The lens 32 is a zoom lens (an example of a variable magnification optical system), and is capable of adjusting the focal length of the imaging optical system by moving in the direction of an optical axis L1. Like the position of the above described focusing lens 33, the position of the zoom lens 32 is also adjusted by a zoom lens drive motor 321 while being detected by an encoder 322 for a zoom lens. The position of the zoom lens 32 is adjusted by operating a zoom button provided on an operator 28 of the camera body 2, or by operating a zoom ring (not shown) provided on the lens barrel 3.

The diaphragm 35 is designed to be able to adjust the size of the aperture centered at the optical axis L1, to limit the flux of light reaching an imaging element 22 of the camera body 2 through the above described imaging optical system and adjust the amount of blurring. In order for the diaphragm 35 to adjust the aperture size, an appropriate aperture size calculated in an automatic exposure mode, for example, is transmitted from the camera controller 21 via the lens controller 36. Also, an aperture size that is set by a manual operation performed at the operator 28 provided on the camera body 2 is inputted from the camera controller 21 to the lens controller 36. The aperture size of the diaphragm 35 is detected by a diaphragm aperture sensor (not shown), and the current aperture size is recognized by the lens controller 36.

A lens memory 37 stores an image plane movement coefficient K and the like. The image plane movement coefficient K is a value indicating the correspondence relationship between the amount of driving of the focusing lens 33 and the amount of movement of the image plane, and indicates the amount of driving of the focusing lens 33 relative to the amount of movement of the image plane, for example. The image plane movement coefficient is defined according to the expression (1) shown below, for example. As the image plane movement coefficient K becomes smaller, the amount of image plane movement caused by driving of the focusing lens 33 becomes larger.

$$\text{Image plane movement coefficient } K = (\text{the amount of driving of the focusing lens 33/the amount of movement of the image plane}) \quad (1)$$

In the camera 1, even in a case where the amount of driving of the focusing lens 33 stays the same, the amount of movement of the image plane varies depending on the lens position of the focusing lens 33. Likewise, even in a case where the amount of driving of the focusing lens 33 stays the same, the amount of movement of the image plane varies depending on the lens position of the zoom lens 32.

That is, the image plane movement coefficient K varies depending on the lens position of the focusing lens 33 or the zoom lens 32 in the direction of the optical axis. In this embodiment, the lens memory 37 stores image plane movement coefficients K for respective lens positions of the focusing lens 33 and respective lens positions of the zoom lens 32.

It should be noted that an image plane movement coefficient K may be defined as follows: image plane movement coefficient K=(the amount of movement of the image plane/the amount of driving of the focusing lens 33). In this case, as the image plane movement coefficient K becomes larger, the amount of image plane movement caused by driving of the focusing lens 33 becomes larger. In the description below, however, an image plane movement coefficient K is defined according to the above expression (1).

FIG. 3 is a table showing the relationship between image plane movement coefficients K, and lens positions (focal lengths) of the zoom lens 32 and lens positions (shooting distances) of the focusing lens 33. In the table in FIG. 3, the drive region for the zoom lens 32 is divided into nine regions "f1" through "f9" in order from the wide end to the tele end, the drive region for the focusing lens 33 is divided into nine regions "D1" through "D9" in order from the close end to the infinite end, and the image plane movement coefficients K corresponding to the respective lens positions are stored. For example, in a case where the lens position (focal length) of the zoom lens 32 is at "f1", and the lens position (shooting distance) of the focusing lens 33 is at "D1", the image plane movement coefficient K is "K11". Although the drive region for each lens is divided into nine regions in the table shown in FIG. 3, the number of divided regions is not necessarily nine, and may be set at any appropriate number. In the above described example in this embodiment, the position of the focusing lens 33 corresponding to the minimum image plane movement coefficient $K_{min}$ is closer to the close end than the position of the focusing lens 33 corresponding to the maximum image plane movement coefficient $K_{max}$ is. However, the present technology is not limited to such a case. For example, the position of the focusing lens 33 corresponding to the minimum image plane movement coefficient $K_{min}$ may be closer to the infinite end than the position of the focusing lens 33 corresponding to the maximum image plane movement coefficient $K_{max}$ is. Alternatively, the image plane movement coefficient may become smaller as the position of the focusing lens 33 becomes closer to the close end, the image plane movement coefficient may become larger as the position of the focusing lens 33 becomes closer to the close end, or the minimum value of the image plane movement coefficient or the maximum value of the image plane movement coefficient may be located in a position other than the position of the focusing lens 33 closest to the close side and the position of the focusing lens 33 closest to the infinite side.

Referring now to FIG. 3, the minimum image plane movement coefficient $K_{min}$ and the maximum image plane movement coefficient $K_{max}$ are described.

The minimum image plane movement coefficient $K_{min}$ is the value corresponding to the minimum value of the image plane movement coefficient K. For example, in FIG. 3, when "K11"="100", "K12"="200", "K13"="300", "K14"="400", "K15"="500", "K16"="600", "K17"="700", "K18"="800", and "K19"="900", "K11"="100", which is the smallest value, is the minimum image plane movement coefficient $K_{min}$, and "K19"="900", which is the largest value, is the maximum image plane movement coefficient $K_{max}$.

In a case where the zoom lens 32 is movable, the minimum image plane movement coefficient $K_{min}$ normally varies with the current lens position of the zoom lens 32. Unless the current lens position of the zoom lens 32 changes, the minimum image plane movement coefficient $K_{min}$ is normally a constant value (fixed value) even when the current lens position of the focusing lens 33 changes. That is, the minimum image plane movement coefficient $K_{min}$ is normally a constant value (fixed value) determined in accordance with the lens position (focal length) of the zoom lens 32, and does not depend on the lens position (shooting distance) of the focusing lens 33.

For example, "K11", "K21", "K31", "K41", "K52", "K62", "K72", "K82", and "K91" in gray in FIG. 3 are the minimum image plane movement coefficients $K_{min}$ indicating the minimum values of the image plane movement coefficients K in the respective lens positions (focal lengths) of the zoom lens 32. That is, in a case where the lens position (focal length) of the zoom lens 32 is at "f1", "K11", which is the image plane movement coefficient K in a case where the lens position (shooting distance) of the focusing lens 33 is at "D1" among "D1" through "D9", is the minimum image plane movement coefficient $K_{min}$ indicating the minimum value. Accordingly, "K11", which is the image plane movement coefficient K in a case where the lens position (shooting distance) of the focusing lens 33 is at "D1", indicates the smallest value among "K11" through "K19", which are the image plane movement coefficients K in cases where the lens positions (shooting distances) of the focusing lens 33 are at "D1" through "D9".

Likewise, in a case where the lens position (focal length) of the zoom lens 32 is at "f2", "K21", which is the image plane movement coefficient K in a case where the lens position (shooting distance) of the focusing lens 33 is at "D1", indicates the minimum value among "K21" through "K29", which are the image plane movement coefficients K in the cases of "D1" through "D9". That is, "K21" is the minimum image plane movement coefficient $K_{min}$. In cases where the respective lens positions (focal lengths) of the zoom lens 32 are at "f3" through "f9", "K31", K41", "K52", "K62", "K72", "K82", and "K91" shown in gray are also the minimum image plane movement coefficients $K_{min}$.

Likewise, the maximum image plane movement coefficient $K_{max}$ is the value corresponding to the maximum value of the image plane movement coefficient K. The maximum image plane movement coefficient $K_{max}$ normally varies with the current lens position of the zoom lens 32. Unless the current lens position of the zoom lens 32 changes, the maximum image plane movement coefficient $K_{max}$ is normally a constant value (fixed value) even when the current lens position of the focusing lens 33 changes. For example, "K19", "K29", "K39", "K49", "K59", "K69", "K79", "K89", and "K99" in the hatched column in FIG. 3 are the maximum image plane movement coefficients $K_{max}$ indicating the maximum values of the image plane movement coefficients K in the respective lens positions (focal lengths) of the zoom lens 32.

In this manner, the lens memory 37 stores, as shown in FIG. 3, the image plane movement coefficients K corresponding to lens positions (focal lengths) of the zoom lens 32 and lens positions (shooting distances) of the focusing lens 33, the minimum image plane movement coefficients $K_{min}$ indicating the minimum values of the image plane movement coefficients K for the respective lens positions (focal lengths) of the zoom lens 32, and the maximum image plane movement coefficients $K_{max}$ indicating the maximum values of the image plane movement coefficients K for the respective lens positions (focal lengths) of the zoom lens 32.

In the above description, the regions ("D1" through "D9") are set as the drive region of the focusing lens 33 in order from the close end to the infinite end, the minimum values of the image plane movement coefficients K of the regions ("D1" through "D9") are the minimum image plane movement coefficients $K_{min}$, and the maximum values of the image plane movement coefficients K of the regions are the maximum image plane movement coefficient $K_{max}$. However, the present invention is not limited to that example. For example, a minimum image plane movement coefficient $K_{min}$ may be the image plane movement coefficient at a position corresponding at least one position among a close focus position and a close soft limit position shown in FIG. 24 and others described later, the position of a mechanical end point in the direction of the close end, a position between the close focus position and the position of the mechanical endpoint in the direction of the close end, and a position closer to the close end than the position of the mechanical end point in the direction of the close end is. Likewise, a maximum image plane movement coefficient $K_{max}$ may be the image plane movement coefficient at a position corresponding at least one position among an infinite focus position and an infinite soft limit position shown in FIG. 24 and others described later, the position of a mechanical end point in the direction of the infinite end, a position between the infinite focus position and the position of the mechanical end point in the direction of the infinite end, and a position closer to the infinite end than the position of the mechanical endpoint in the direction of the infinite end is, for example.

Also, in a case where the value of an optical minimum image plane movement coefficient $K_{min}$ is a number with a large number of digits, such as 102.345, 100 or 105 as a value in the neighborhood of 102.345 may be stored as a minimum image plane movement coefficient $K_{min}$. The reason for this is that, in a case where 100 or 105 is stored into the lens memory 37, the number of digits is smaller than that of 102.345 that would have been stored into the lens memory 37, and the storage capacity of the memory can be saved accordingly. It is also possible to reduce the amount of transmission data to be transmitted when a second coefficient K2 ($K_{min}$) that will be described later is transmitted to the camera controller 21.

Likewise, in a case where the value of an optical maximum image plane movement coefficient $K_{max}$ is a number with a large number of digits, such as 1534.567, 1500 or 1535 as a value in the neighborhood of 1534.567 may be stored as a minimum image plane movement coefficient $K_{min}$.

Likewise, in a case where the value of a current-position image plane movement coefficient $K_{cur}$ is a number with a large number of digits, such as 533.246, 530 or 533 as a value in the neighborhood of 533.246 may be stored as a current-position image plane movement coefficient $K_{cur}$.

Also, the values of a current-position image plane movement coefficient $K_{cur}$, a minimum image plane movement coefficient $K_{min}$, and a maximum image plane movement coefficient $K_{max}$ may be the values of optical image plane movement coefficients, and may be set at greater values or smaller values than the values of optical image plane movement coefficients, with the type of the lens barrel, the drive mechanism of the focusing lens 33, the detection mechanism of the focusing lens 33, and the like being taken into consideration.

Meanwhile, the camera body 2 includes a mirror system 220 for guiding a light flux from the object to the imaging element 22, a viewfinder 235, a photometric sensor 237, and a focus detection module 261. This mirror system 220 includes: a quick return mirror 221 that rotates a predetermined angle about a rotary shaft 223 between the object viewing position and the shooting position; and a sub mirror 222 that is supported by the quick return mirror 221 serving as a shaft, and rotates with the quick return mirror 221 rotating. In FIG. 1, a solid line indicates the mirror system 220 located at the object viewing position, and a two-dot and dash line indicates the mirror system 220 located at the object-image shooting position.

The mirror system 220 located at the object viewing position is inserted in the optical path along the optical axis L1, and the mirror system 220 located at the object-image shooting position rotates so as to move away from the optical path along the optical axis L1.

The quick return mirror 221 is formed with a semi-reflective mirror. When the quick return mirror 221 is located at the object viewing position, light fluxes (optical axes L2 and L3) that are part of the light flux (optical axis L1) from the object are reflected by the quick return mirror 221 and are guided to the viewfinder 235 and the photometric sensor 237, so that a light flux (optical axis L4) is passed on to the sub mirror 222. On the other hand, the sub mirror 222 is formed with an all-reflective mirror, and guides the light flux (optical axis L4) that has passed through the quick return mirror 221 to the focus detection module 261.

As a result, when the mirror system 220 is located at the viewing position, the light flux (optical axis L1) from the object is guided to the viewfinder 235, the photometric sensor 237, and the focus detection module 261. Thus, the operator views the object, and an exposure operation and detection of the focus adjustment state of the focusing lens 33 are performed. When the operator fully presses a release button, the mirror system 220 rotatively moves to the shooting position, so that all the light flux (optical axis L1) from the object is guided to the imaging element 22, and the captured image data is saved in a camera memory 24.

The light flux (optical axis L2) that has come from the object and been reflected by the quick return mirror 221 forms an image on a focusing glass 231 placed on a plane optically equivalent to the imaging element 22, and the image can be viewed through a pentaprism 233 and an eye lens 234. At this point, a transmissive liquid crystal display module 232 displays a focus detection area mark or the like overlapping the object image on the focusing glass 231, and displays image-shooting-related information, such as the shutter speed, the aperture value, the number of pictures to be taken, in an area outside the object image. With this, the operator in the stage of preparation for image shooting can view the object and its background, as well as the image-shooting-related information and the like, through the viewfinder 235.

The photometric sensor 237 is formed with a two-dimensional color CCD image sensor or the like, and calculates an exposure value for the time of shooting. In doing so, the photometric sensor 237 divides the shooting screen into multiple regions, and outputs photometric signals corresponding the luminances of the respective regions. The signals detected by the photometric sensor 237 are outputted to the camera controller 21, and are then used in automatic exposure control.

The imaging element 22 is provided on a predetermined focal plane of the imaging optical system including the lenses 31, 32, 33, and 34. The predetermined focal plane is located in the camera body 2 and on the optical axis L1 of the light flux from the object. A shutter 23 is provided on the side of the front surface of the imaging element 22. This imaging element 22 has photoelectric conversion elements two-dimensionally arranged therein, and may be formed with a device such as a two-dimensional CCD image sensor, a MOS sensor, or a CID. An image signal photoelectrically converted by the imaging element 22 is subjected to image processing at the camera controller 21, and is then recorded on the camera memory 24 serving as a recording medium. It should be noted that either a detachable card memory or an embedded memory can be used as the camera memory 24.

The camera controller 21 drives the focusing lens 33 in the lens barrel 3, and performs focus detection. In performing focus detection, the camera controller 21 can detect the focus adjustment state of the imaging optical system by a contrast detection method (this detection will be hereinafter referred to as "contrast AF", where appropriate), and perform focus detection by a phase difference detection technique.

In the contrast AF, the camera controller 21 calculates a focus evaluation value at each position while driving the focusing lens 33, and determines that the position of the focusing lens 33 at which the focus evaluation value becomes largest is the focus position.

By the phase difference detection technique, the focus detection module 261 included in the camera body 2 is used. The focus detection module 261 includes a pair of line sensors (not shown) that have microlenses arranged in the vicinities of the predetermined focal plane of the imaging optical system, and pixels arranged for the respective microlenses, the pixels each including a photoelectric conversion element. A pair of light fluxes passing through a pair of regions having difference eye points on the focusing lens 33 are received by the respective pixels arranged in the pair of line sensors, so that a pair of image signals can be obtained. The phase difference between the pair of image signals obtained by the pair of line sensors is then determined by a known correlation calculation, so that the focus adjustment state is detected.

The operator 28 is formed with input switches for the operator to set various operation modes of the camera 1, such as a shutter release button and a video shooting start switch, and is designed to switch between a still image shooting mode and a video shooting mode, switch between an autofocus mode and a manual focus mode, and further switch between an AF-S mode and an AF-F mode in the autofocus mode. Each mode set by this operator 28 is sent to the camera controller 21, and the entire operation of the camera 1 is controlled by the camera controller 21. Meanwhile, the shutter release button includes a first switch SW1 that is turned on when the button is pressed halfway, and a second switch SW2 that is turned on when the button is pressed all the way.

Here, the AF-S mode is a mode in which, after the focusing lens 33 is driven in accordance with a result of focus detection when the shutter release button is pressed halfway, the position of the focusing lens 33 that has been adjusted once is steadied, and image shooting is performed at the focusing lens position. It should be noted that the AF-S mode is a suitable mode for still image shooting, and is normally selected when a still image is to be taken. The AF-F mode is a mode in which, regardless of whether the shutter release button has been operated, after the focusing lens 33 is driven in accordance with a result of focus detection, focusing state detection is repeatedly conducted, and, if the focusing state changes, search driving (scan driving or detection driving) of the focusing lens 33 is performed. It should be noted that the AF-F mode is a suitable mode for video shooting, and is normally selected when a video image is to be taken.

Also, in this embodiment, a switch for switching between a one-shot mode and a continuous mode may be provided as a switch for changing autofocus modes. In this case, when the one-shot mode is selected by the operator, the AF-S mode can be set. When the continuous mode is selected by the operator, the AF-F mode can be set.

Next, a method of data communication between the camera body 2 and the lens barrel 3 is described.

The camera body 2 has a body-side mounting module 201 to which the lens barrel 3 is detachably attached. Also, as shown in FIG. 1, a connecting portion 202 that protrudes toward the inside of the body-side mounting module 201 is formed at a position in the vicinity of the body-side mounting module 201 (or on the inner surface side of the body-side mounting module 201). Electrical contacts are formed on this connecting portion 202.

Meanwhile, the lens barrel 3 is an interchangeable lens that can be detachably attached to the camera body 2, and the lens barrel 3 has a lens-side mounting module 301 that is detachably attached to the camera body 2. Also, as shown in FIG. 1, a connecting portion 302 that protrudes toward the inside of the lens-side mounting module 301 is formed at a position in the vicinity of the lens-side mounting module 301 (or on the inner surface side of the lens-side mounting module 301). Electrical contacts are formed on this connecting portion 302.

When the lens barrel 3 is attached to the camera body 2, the electrical contacts of the connecting portion 202 formed in the body-side mounting module 201 are electrically and physically connected to the electrical contacts of the connecting portion 302 formed in the lens-side mounting module 301. With this, power supply from the camera body 2 to the lens barrel 3, and data communication between the camera body 2 and the lens barrel 3 become possible via the connecting portions 202 and 302.

Figure 4:
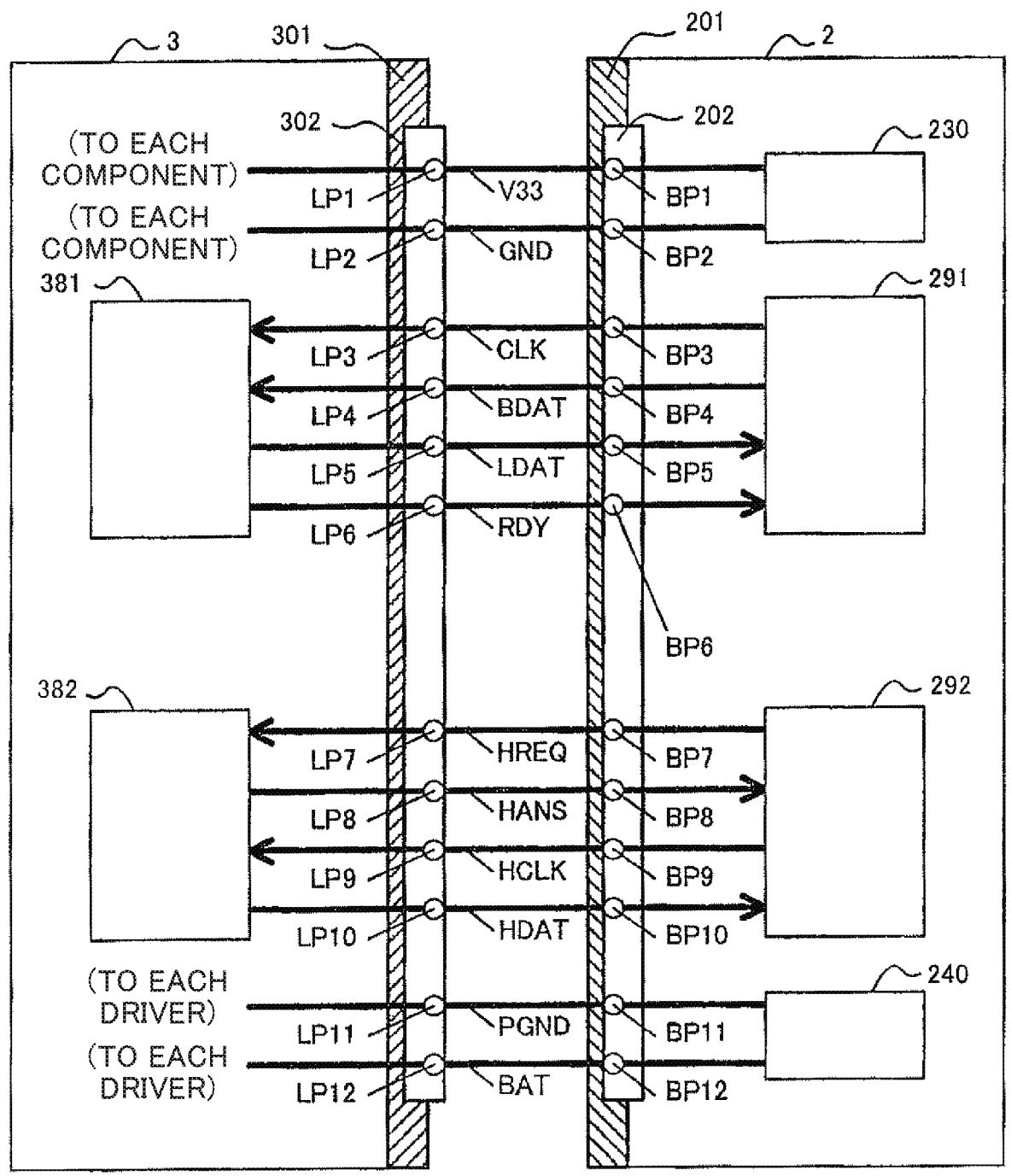
FIG. 4 is a schematic diagram showing connecting portions 202 and 302 in detail.

FIG. 4 is a schematic diagram showing the connecting portions 202 and 302 in detail. It should be noted that the connecting portion 202 is placed on the right side of the body-side mounting module 201 in FIG. 4, as in an actual mount structure. That is, the connecting portion 202 of this embodiment is placed at a deeper site than the mounting surface of the body-side mounting module 201 (or a site on the right side of the body-side mounting module 201 in FIG. 4).

Likewise, the connecting portion 302 is placed on the right side of the lens-side mounting module 301, because the connecting portion 302 of this embodiment is located at a side protruding from the mounting surface of the lens-side mounting module 301. As the connecting portion 202 and the connecting portion 302 are positioned in this manner, the connecting portion 202 and the connecting portion 302 are connected, and the electrical contacts formed on the connecting portion 202 are connected to the electrical contacts formed on the connecting portion 302, when the camera body 2 and the lens barrel 3 are mounted and joined to each other, with the mounting surface of the body-side mounting module 201 and the mounting surface of the lens-side mounting module 301 being brought into contact with each other.

As shown in FIG. 4, the connecting portion 202 has 12 electrical contacts BP1 through BP12. Also, the connecting portion 302 on the side of the lens barrel 3 has 12 electrical contacts LP1 through LP12 that correspond to the 12 electrical contacts on the side of the camera body 2.

The electrical contact BP1 and the electrical contact BP2 are connected to a first power supply circuit 230 in the camera body 2. The first power supply circuit 230 supplies an operating voltage to the respective components in the lens barrel 3 (except for the circuits with relatively large power consumption, such as the lens drive motors 321 and 331) via the electrical contact BP1 and the electrical contact LP1. The value of the voltage to be supplied from the first power supply circuit 230 via the electrical contact BP1 and the electrical contact LP1 is not limited to any particular value, and can be any voltage value between 3 and 4 V (normally a voltage value in the neighborhood of 3.5 V, which is the middle of this voltage range), for example. In this case, the value of the current to be supplied from the side of the camera body 2 to the side of the lens barrel 3 is a current value within the range of several tens of mA to several hundreds of mA in a power-on state. Also, the electrical contact BP2 and the electrical contact LP2 are ground terminals compatible with the above-mentioned operating voltage to be supplied via the electrical contact BP1 and the electrical contact LP1.

The electrical contacts BP3 through BP6 are connected to a camera-side first communication module 291, and the electrical contacts LP3 through LP6 corresponding to these electrical contacts BP3 through BP6 are connected to a lens-side first communication module 381. Using these electrical contacts, the camera-side first communication module 291 and the lens-side first communication module 381 exchange signals with each other. The communication to be performed by the camera-side first communication module 291 and the lens-side first communication module 381 will be described later in detail.

The electrical contacts BP7 through BP10 are connected to a camera-side second communication module 292, and the electrical contacts LP7 through LP10 corresponding to these electrical contacts BP7 through BP10 are connected to a lens-side second communication module 382. Using these electrical contacts, the camera-side second communication module 292 and the lens-side second communication module 382 exchange signals with each other. The communication to be performed by the camera-side second communication module 292 and the lens-side second communication module 382 will be described later in detail.

The electrical contact BP11 and the electrical contact BP12 are connected to a second power supply circuit 240 in the camera body 2. The second power supply circuit 240 supplies an operating voltage to the circuits with relatively large power consumption, such as the lens drive motors 321 and 331, via the electrical contact BP11 and the electrical contact LP11. The value of the voltage to be supplied from the second power supply circuit 240 is not limited to any particular value, but the maximum value of the voltage to be supplied from the second power supply circuit 240 can be several times greater than the maximum value of the voltage to be supplied from the first power supply circuit 230. Also, in this case, the value of the current to be supplied from the second power supply circuit 240 to the side of the lens barrel 3 is a current value within the range of several tens of mA to several mA in a power-on state. Also, the electrical contact BP12 and the electrical contact LP12 are ground terminals compatible with the above-mentioned operating voltage to be supplied via the electrical contact BP11 and the electrical contact LP11.

It should be noted that the first communication module 291 and the second communication module 292 on the side of the camera body 2 shown in FIG. 4 constitute a camera communication module 29 shown in FIG. 1. The camera communication module 29 may be divided into a camera transmission module and a camera reception module. Meanwhile, the first communication module 381 and the second communication module 382 on the side of the lens barrel 3 shown in FIG. 4 constitute a lens communication module 38 shown in FIG. 1. The lens communication module 38 may be divided into a lens transmission module and a lens reception module.

Next, communication between the camera-side first communication module 291 and the lens-side first communication module 381 (this communication will be hereinafter referred to as command data communication) is described. The lens controller 36 performs command data communication to transmit, in parallel, control data from the camera-side first communication module 291 to the lens-side first communication module 381 and response data from the lens-side first communication module 381 to the camera-side first communication module 291 at predetermined intervals (at 16-millisecond intervals, for example), via a signal line CLK formed with the electrical contacts BP3 and LP3, a signal line BDAT formed with the electrical contacts BP4 and LP4, a signal line LDAT formed with the electrical contacts BP5 and LP5, and a signal line RDY formed with the electrical contacts BP6 and LP6.

Figure 5:
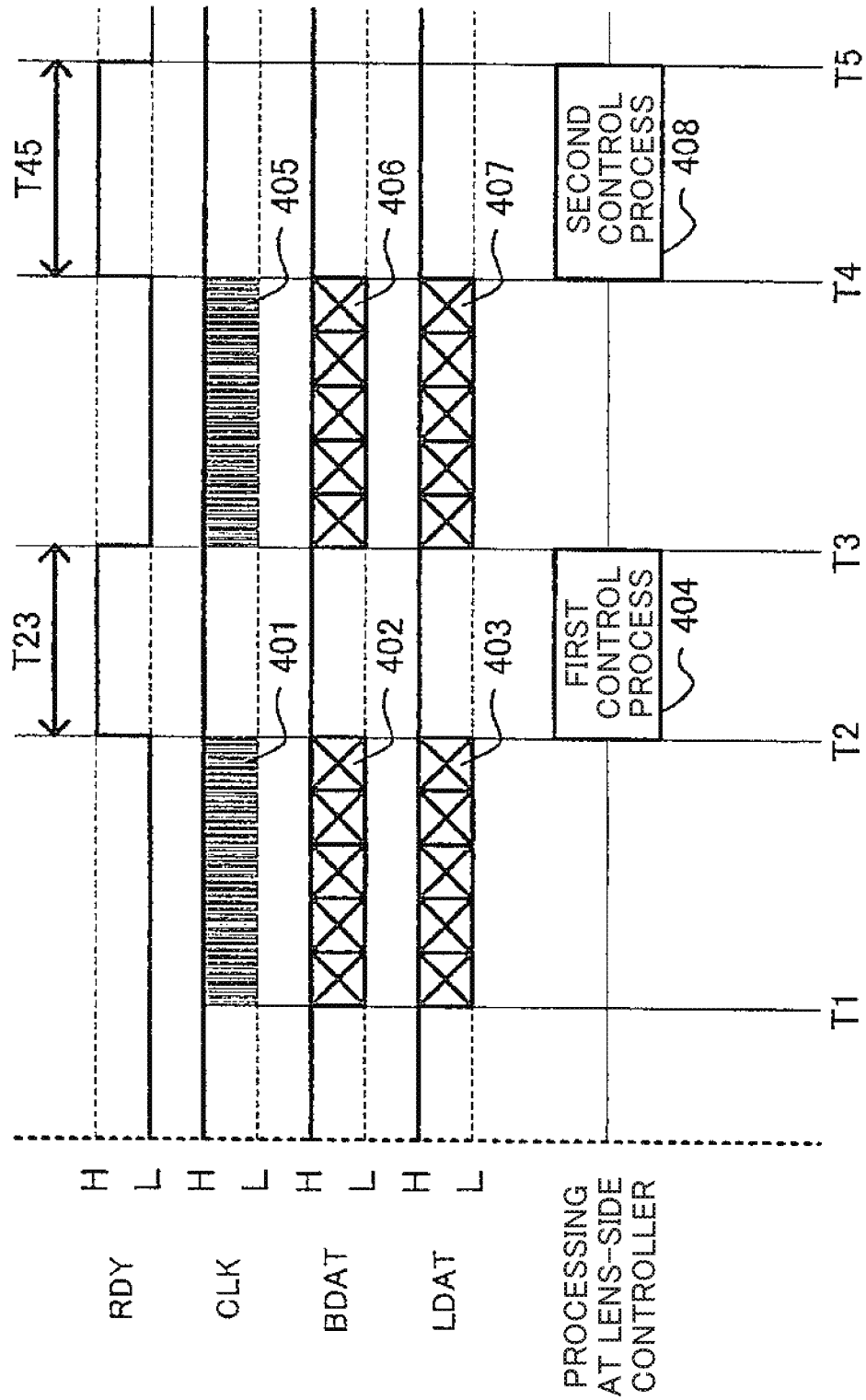
FIG. 5 is a timing chart showing an example of command data communication.

FIG. 5 is a timing chart showing an example of command data communication. When command data communication is started (T1), the camera controller 21 and the camera-side first communication module 291 first check the signal level of the signal line RDY. Here, the signal level of the signal line RDY indicates whether the lens-side first communication module 381 can perform communication, and, if the lens-side first communication module 381 cannot perform communication, the lens controller 36 and the lens-side first communication module 381 output a signal at high (H) level. In a case where the signal line RDY is at H level, the camera-side first communication module 291 does not perform communication with the lens barrel 3, or does not perform the next process if currently performing communication.

In a case where the signal line RDY is at low (L) level, the camera controller 21 and the camera-side first communication module 291 transmit a clock signal 401 to the lens-side first communication module 381, using the signal line CLK. In synchronization with this clock signal 401, the camera controller 21 and the camera-side first communication module 291 also transmit a camera-side command packet signal 402 as control data to the lens-side first communication module 381, using the signal line BDAT. When the clock signal 401 is outputted, the lens controller 36 and the lens-side first communication module 381 transmit a lens-side command packet signal 403 as response data in synchronization with this clock signal 401, using the signal line LDAT.

When the transmission of the lens-side command packet signal 403 is completed, the lens controller 36 and the lens-side first communication module 381 change the signal level of the signal line RDY from L level to H level (T2). The lens controller 36 then starts a first control process 404 in accordance with the contents of the body-side command packet signal 402 received before time T2.

For example, in a case where the received body-side command packet signal 402 is a request for particular data on the side of the lens barrel 3, the lens controller 36 performs the first control process 404, to analyze the contents of the command packet signal 402 and generate the requested particular data. Using check sum data contained in the command packet signal 402, the lens controller 36 further performs a communication error check process as the first control process 404, to check if there is an error in the communication of the command packet signal 402 in a simple manner from the number of data bytes. The signal of the particular data generated in this first control process 404 is outputted as a lens-side data packet signal 407 to the side of the camera body 2 (T3). It should be noted that a camera-side data packet signal 406 that is outputted from the side of the camera body 2 after the command packet signal 402 in this case is dummy data that has no particular meaning to the lens side (though containing check sum data). In this case, the lens controller 36 performs a communication error check process like the above described one as a second control process 408, using the check sum data contained in the camera-side data packet signal 406 (T4).

Also, in a case where the camera-side command packet signal 402 is an instruction to drive the focusing lens 33, and the camera-side data packet signal 406 indicates the speed and the amount of driving of the focusing lens 33, for example, the lens controller 36 performs the first control process 404, to analyze the contents of the command packet signal 402 and generate a confirmation signal indicating that the contents are understood (T2). The confirmation signal generated in this first control process 404 is outputted as the lens-side data packet signal 407 to the camera body 2 (T3). The lens controller 36 also performs the second control process 408, to analyze the contents of the camera-side data packet signal 406, and perform a communication error check process using the check sum data contained in the camera-side data packet signal 406 (T4). After completing the second control process 408, the lens controller 36 drives the focusing lens drive motor 331 in accordance with the received camera-side command packet signal 406 or the speed and the amount of driving of the focusing lens 33, so that the focusing lens 33 is driven by the received amount of driving at the received speed of driving (T5).

As the second control process 408 is completed, the lens controller 36 also notifies the lens-side first communication module 381 of the completion of the second control process 408. By doing so, the lens controller 36 outputs a signal at L level to the signal line RDY (T5).

The above communication performed during time from T1 to T5 is one command data communication operation. As described above, in one command data communication operation, the camera controller 21 and the camera-side first communication module 291 transmit one camera-side command packet signal 402 and one camera-side data packet signal 406. In this embodiment, the control data to be transmitted from the camera body 2 to the lens barrel 3 is divided into two for convenience of processing as described above, but one camera-side command packet signal 402 and one camera-side data packet signal 406 constitute one set of control data.

Likewise, in one command data communication operation, the lens controller 36 and the lens-side first communication module 381 transmit one lens-side command packet signal 403 and one lens-side data packet signal 407. The response data to be transmitted from the lens barrel 3 to the camera body 2 is also divided into two as described above, but one lens-side command packet signal 403 and one lens-side data packet signal 407 constitute one set of response data.

Next, communication between the camera-side second communication module 292 and the lens-side second communication module 382 (this communication will be hereinafter referred to as hot-line communication) is described. Referring back to FIG. 4, the lens controller 36 conducts hot-line communication to perform communication at shorter intervals (at 1-millisecond intervals, for example) than command data communication, via a signal line HREQ formed with the electrical contacts BP7 and LP7, a signal line HANS formed with the electrical contacts BP8 and LP8, a signal line HCLK formed with the electrical contacts BP9 and LP9, and a signal line HDAT formed with the electrical contacts BP10 and LP10.

In this embodiment, lens information about the lens barrel 3 is transmitted from the lens barrel 3 to the camera body 2 through hot-line communication, for example. The lens information to be transmitted through hot-line communication includes the lens position of the focusing lens 33, the lens position of the zoom lens 32, values related to image plane movement coefficients, and the like. Here, the values related to image plane movement coefficients include a current-position image plane movement coefficient $K_{cur}$ (which is the image plane movement coefficient corresponding to the current lens position (focal length) of the zoom lens 32 and the current lens position (shooting distance) of the focusing lens 33), a coefficient Klow not greater than the current-position image plane movement coefficient Kcur, a minimum image plane movement coefficient $K_{min}$, a maximum image plane movement coefficient K max, and the like. These values are necessary in the processing to be performed in the camera body 2. A specific example of the processing in the camera body 2 will be described later.

By referring to a table that is stored in the lens memory 37 and shows the relationship between lens positions (zoom lens positions and focusing lens positions) and image plane movement coefficients K, the lens controller 36 can determine the current-position image plane movement coefficient $K_{cur}$ corresponding to the current lens position of the zoom lens 32 and the current lens position of the focusing lens 33. In the example shown in FIG. 3, when the lens position (focal length) of the zoom lens 32 is at "f1", and the lens position (shooting distance) of the focusing lens 33 is at "D4", for example, the lens controller 36 transmits "K14" as the current-position image plane movement coefficient $K_{cur}$ to the camera controller 21 through hot-line communication.

FIGS. 6(a) and 6(b) are timing charts showing an example of hot-line communication. FIG. 6(a) is a chart showing a situation where hot-line communication is repeatedly performed at predetermined intervals of Tn. FIG. 6(b) shows one communication period Tx in the hot-line communication that is repeatedly performed. In the description below, a situation where the lens position of the focusing lens 33 is communicated through hot-line communication is explained with reference to the timing chart in FIG. 6(b).

To start communication through hot-line communication, the camera controller 21 and the camera-side second communication module 292 first output a signal at L level to the signal line HREQ (T6). The lens-side second communication module 382 then notifies the lens controller 36 that this signal has been inputted to the electrical contact LP7. In accordance with this notification, the lens controller 36 starts performing a generation process 501 to generate lens position data. The generation process 501 is a process in which the lens controller 36 causes the encoder 332 for a focusing lens to detect the position of the focusing lens 33, and generates lens position data indicating a result of the detection.

When the lens controller 36 completes the generation process 501, the lens controller 36 and the lens-side second communication module 382 output a level at L level to the signal line HANS (T7). As this signal is inputted to the electrical contact BP8, the camera controller 21 and the camera-side second communication module 292 output a clock signal 502 from the electrical contact BP9 to the signal line HCLK.

In synchronization with this clock signal 502, the lens controller 36 and the lens-side second communication module 382 output a lens position data signal 503 indicating the lens position data from the electrical contact LP10 to the signal line HDAT. When the transmission of the lens position data signal 503 is completed, the lens controller 36 and the lens-side second communication module 382 output a level at H level from the electrical contact LP8 to the signal line HANS (T8). As this signal is inputted to the electrical contact BP8, the camera-side second communication module 292 outputs a signal at H level from the electrical contact LP7 to the signal line HREQ (T9).

It should be noted that command data communication and hot-line communication can be performed simultaneously or in parallel.

In the above manner, various kinds of information can be exchanged between the camera body 2 and the lens barrel 3. For example, a current-position image plane movement coefficient $K_{cur}$ can be transmitted from the lens barrel 3 to the camera body 2. Using this current-position image plane movement coefficient $K_{cur}$, the camera body 2 can perform contrast AF as described below.

The camera controller 21 causes the focusing lens 33 to be driven at predetermined sampling intervals (distance). The camera controller 21 then calculates a focus evaluation value at each position. A focus evaluation value can be calculated by extracting the high-frequency component from an output from the imaging element 22 with the use of a high-frequency transmission filter, for example. Alternatively, it is possible to calculate a focus evaluation value by extracting the high-frequency component, using two high-frequency transmission filters with different cutoff frequencies.

The camera controller 21 then determines that the position of the focusing lens 33 with the largest focus evaluation value is the focus position. In a case where focus evaluation values are calculated while the focusing lens 33 is driven, for example, when a focus evaluation value rises twice and then drops twice, the focus position can be calculated by an interpolation method or the like using these focus evaluation values.

The predetermined sampling intervals (distance) may stabilize the driving speed (the amount of driving per unit time) of the focusing lens 33, for example. However, even where the driving speed of the focusing lens 33 is constant, the moving speed of the image plane is not necessarily constant. This is because image plane movement coefficients K vary with positions of the focusing lens 33, and, as shown in the above expression (1), the moving speed of the image plane is higher with a smaller image plane movement coefficient K, even where the driving speed of the focusing lens 33 is constant.

Therefore, where the driving speed of the focusing lens 33 is constant, the moving speed of the image plane might become too high. As a result, the intervals at which a focus evaluation value is sampled become too wide, and an appropriate focus position cannot be detected. This is because, where the focus evaluation value sampling intervals are longer, the focus position varies over a wider range, and the focusing accuracy becomes lower in some cases.

To counter this, the camera body 2 monitors whether the moving speed of the image plane is too high, in accordance with current-position image plane movement coefficients $K_{cur}$ received from the lens barrel 3. More specifically, the camera controller 21 calculates the moving speed of the image plane in accordance with the above drive signal (corresponding to the driving speed of the focusing lens 33), a current-position image plane movement coefficient $K_{cur}$, and the above expression (1). The camera controller 21 then adjusts the drive signal so that the moving speed of the image plane does not exceed a predetermined threshold value. This threshold value is set so that the moving speed of the image plane at a time of driving of the focusing lens 33 is set at such a speed that an appropriate focus position can be detected.

In a case where the camera controller 21 starts search control when the release switch is pressed halfway, the camera controller 21 may cause the focusing lens 33 to be driven at a high speed. In a case where the camera controller 21 starts search control when the release switch is pressed in a manner other than "halfway", the camera controller 21 may cause the focusing lens 33 to be driven at a low speed. Through such control, contrast AF can be performed at a high speed when the release switch is pressed halfway, and contrast AF can be performed to obtain a through-lens image with an excellent appearance when the release switch is pressed in a manner other than "halfway". A through-lens image is a monitor image that is captured by an imaging element at a predetermined frame rate before a shooting instruction is issued (or the shutter button is fully pressed).

Also, the camera controller 21 may cause the focusing lens 33 to be driven at a high speed in performing search control in the still image shooting mode, and cause the focusing lens 33 to be driven at a low speed in performing search control in the video shooting mode. Through such control, high-speed contrast AF can be performed in the still image shooting mode, and contrast AF to obtain a high-quality moving image can be performed in the video shooting mode.

Further, in at least one mode between the still image shooting mode and the video shooting mode, high-speed contrast AF may be performed in a sport recording mode, and low-speed contrast AF may be performed in a scenery recording mode. Furthermore, the driving speed of the focusing lens 33 in search control may vary with focal lengths, shooting distances, aperture values, or the like.

In this manner, the camera body 2 can perform a contrast AF process with high accuracy by receiving a current-position image plane movement coefficient $K_{cur}$.

Figure 7:
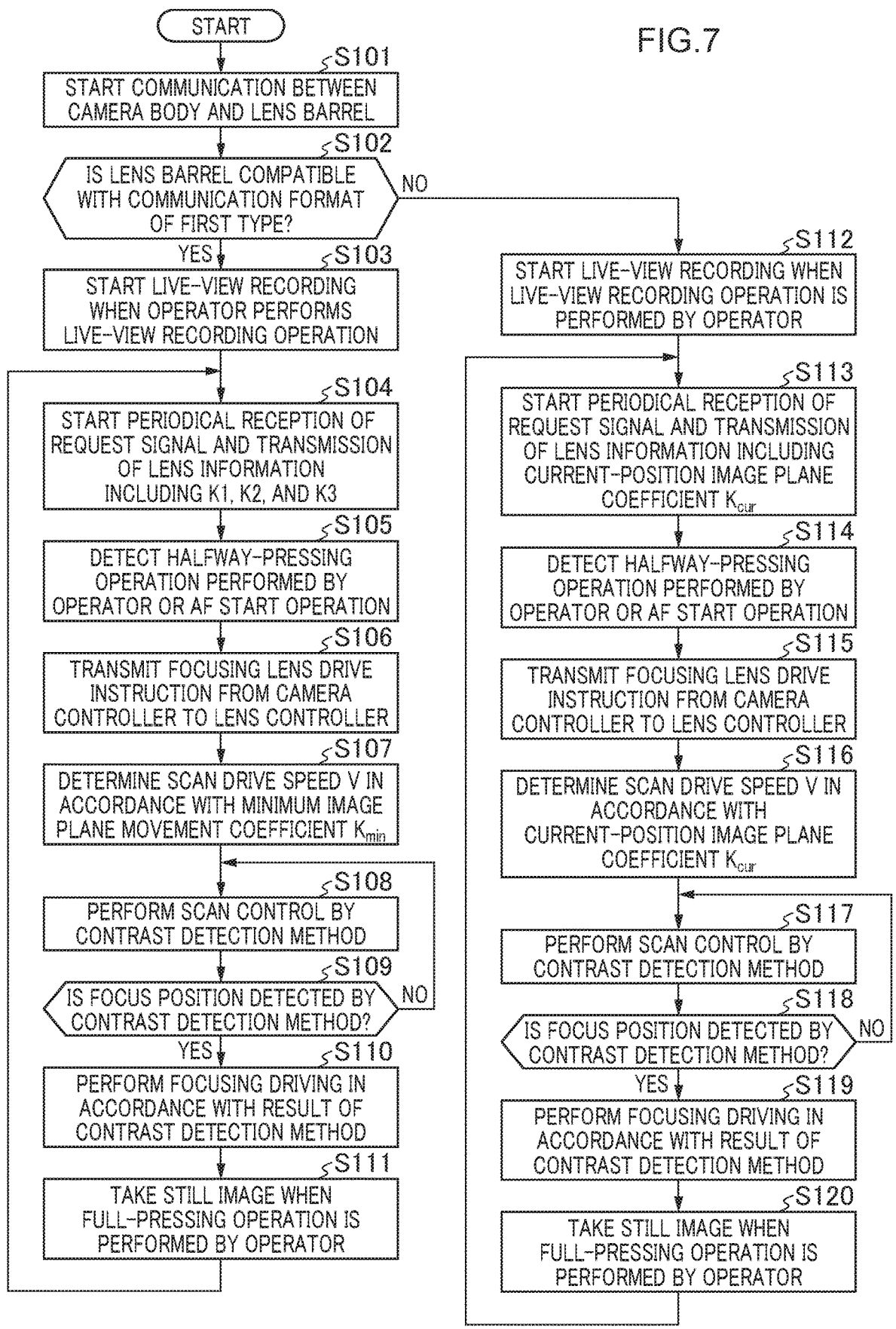
FIG. 7 is a flowchart showing an operation to be performed by the camera 1 according to this embodiment.

Referring now to FIG. 7, an example operation of the camera 1 according to this embodiment is described. FIG. 7 is a flowchart showing an operation to be performed by the camera 1 according to this embodiment. It should be noted that the operation described below is started when the power supply to the camera 1 is switched on.

First, in step S101, communication is performed so that the camera body 2 can identify the lens barrel 3. This is because the communication mode that can be employed for communication varies with the types of lens barrels. The operation then moves on to step S102, and the camera controller 21 in step S102 determines whether the lens barrel 3 is a lens compatible with a communication mode of a predetermined first type. If the lens is determined to be compatible with the communication mode of the first type, the operation moves on to step S103. If the camera controller 21 determines that the lens barrel 3 is a lens not compatible with the communication mode of the first type, on the other hand, the operation moves on to step S112. If the camera controller 21 determines that the lens barrel 3 is a lens compatible with a communication mode of a second type that is different from the communication mode of the first type, the operation may also move onto step S112. Further, if the camera controller 21 determines that the lens barrel 3 is a lens compatible with the communication modes of the first type and the second type, the operation may move on to step S103.

In step S103, a check is made to determine whether the operator has switched on a live-view recording on/off switch provided on the operator 28. If live-view recording is on, the mirror system 220 is located at the object-image shooting position, and the flux of light from the object is guided to the imaging element 22.

In step S104, hot-line communication is started between the camera body 2 and the lens barrel 3. In the hot-line communication, a signal (a request signal) at L level outputted from the camera controller 21 and the camera-side second communication module 292 to the signal line HREQ is received by the lens controller 36, and the lens controller 36 transmits lens information to the camera controller 21, as described above. Such transmission of lens information is repeatedly performed. It should be noted that the lens information includes at least one piece of information indicating the lens position of the focusing lens 33, the lens position of the zoom lens 32, a current-position image plane movement coefficient $K_{cur}$, a minimum image plane movement coefficient $K_{min}$, a maximum image plane movement coefficient $K_{max}$, and a first coefficient K1, a second coefficient K2, and a third coefficient K3 described later, for example. After step S104, hot-line communication is repeatedly conducted. For example, hot-line communication is repeated until the power switch is turned off.

To transmit lens information to the camera controller 21, for example, the lens controller 36 refers to a table that is stored in the lens memory 37 and shows the relationship between lens positions and image plane movement coefficients K (see FIG. 3). By doing so, the lens controller 36 can obtain the current-position image plane movement coefficient $K_{cur}$ corresponding to the current lens position of the zoom lens 32 and the current lens position of the focusing lens 33, and the minimum image plane movement coefficient $K_{min}$ and the maximum image plane movement coefficient $K_{max}$ corresponding to the current lens position of the zoom lens 32. Using at least one coefficient among the current-position image plane movement coefficient $K_{cur}$, the minimum image plane movement coefficient $K_{min}$, and the maximum image plane movement coefficient $K_{max}$, the lens controller 36 can set a first coefficient K1, a second coefficient K2, and a third coefficient K3, and transmit lens information that includes the first coefficient K1, the second coefficient K2, and the third coefficient K3, to the camera controller 21.

In this embodiment, before transmitting the first coefficient K1, the second coefficient K2, and the third coefficient K3 to the camera controller 21, the lens controller 36 can set the first coefficient K1, the second coefficient K2, and the third coefficient K3 at any appropriate values in accordance with the characteristics, the usage conditions, and the like of the lens barrel. The lens controller 36 sets the first coefficient K1, the second coefficient K2, and the third coefficient K3 at any appropriate values, in accordance with the characteristics, the usage conditions, and the like of the lens barrel (such as the optical characteristics of the focusing lens and the zoom lens, the speeds and the acceleration and deceleration characteristics of the motors that drive the focusing lens and the zoom lens, the drive noise generated when the drive mechanisms of the motors that drive the focusing lens and the zoom lens are driven, the positions and the sensitivities of the sensors that detect the positions of the focusing lens and the zoom lens, the amounts of backlash of the drive mechanisms of the motors that drive the focusing lens and the zoom lens, the period of use of the lens barrel, and the temperature of the lens barrel). Using at least one coefficient among the first coefficient K1, the second coefficient K2, and the third coefficient K3, the camera controller 21 performs control, so that various kinds of control can be performed in accordance with the characteristics, the usage conditions, and the like of the lens barrel.

For example, the lens controller 36 can set the current-position image plane movement coefficient $K_{cur}$ as the first coefficient K1, the minimum image plane movement coefficient $K_{min}$ as the second coefficient K2, and the maximum image plane movement coefficient $K_{max}$ as the third coefficient K3. Also, the lens controller 36 may set the current-position image plane movement coefficient $K_{cur}$, the minimum image plane movement coefficient $K_{min} \times 0.9$, and the maximum image plane movement coefficient $K_{max} \times 1.2$, as the first coefficient K1, the second coefficient K2, and the third coefficient K3, for example. Also, the lens controller 36 may set the current-position image plane movement coefficient $K_{cur}$, $K_{min} - 0.2 \times (K_{cur} - K_{min})$, and $K_{max} - 0.2 \times (K_{cur} - K_{max})$, as the first coefficient K1, the second coefficient K2, and the third coefficient K3, for example. The first coefficient K1, the second coefficient K2, and the third coefficient K3 may be set by performing predetermined four arithmetic operations on the current-position image plane movement coefficient Kcur, the maximum image plane movement coefficient K max, and the minimum image plane movement coefficient K min, for example.

In this embodiment, the first coefficient K1 (current-position image plane movement coefficient $K_{cur}$), the second coefficient K2 (minimum image plane movement coefficient $K_{min}$), and the third coefficient K3 (maximum image plane movement coefficient $K_{max}$) are repeatedly transmitted to the camera controller 21 through hot-line communication. That is, in this embodiment, a set of the first coefficient K1, the second coefficient K2, and the third coefficient K3 is transmitted during a first processing period, and a set of the first coefficient K1, the second coefficient K2, and the third coefficient K3 is transmitted during a second processing period that comes after the first processing period. During a third processing period that comes after the second processing period, a set of the first coefficient K1, the second coefficient K2, and the third coefficient K3 is transmitted.

In step S105, a check is made to determine whether the operator has halfway pressed the release button provided on the operator 28 (the first switch SW1 is turned on), or whether an AF start operation or the like has been performed. If any of these operations has been performed, the operation moves on to step S106 (in the description below, a case where a halfway pressing operation has been performed will be described in detail).

In step S106, the camera controller 21 transmits a search drive instruction (a search drive start instruction) to the lens controller 36, to conduct focus detection by a contrast detection method. The search drive instruction (an instruction as to the driving speed at a time of search drive, or an instruction as to the driving position) to be issued to the lens controller 36 may be given with the driving speed of the focusing lens 33, the image plane moving speed, a target driving position, or the like.

In step S107, in accordance with the second coefficient K2 (minimum image plane movement coefficient $K_{min}$) obtained in step S104, the camera controller 21 performs a process of determining a search drive speed V that is the driving speed of the focusing lens 33 in a search operation.

In this embodiment, a search operation is an operation in which the camera controller 21 calculates a focus evaluation value by the contrast detection method at predetermined intervals while the focusing lens 33 is driven by the focusing lens drive motor 331 at the search drive speed V determined in step S107, and thus, focus position detection by the contrast detection method is performed at predetermined intervals.

Also, in this search operation, to detect a focus position by the contrast detection method, the camera controller 21 calculates a focus evaluation value at predetermined sampling intervals while subjecting the focusing lens 33 to search driving, and determines that the lens position at which the focus evaluation value calculated as a peak is obtained is the focus position. Specifically, the camera controller 21 moves the image plane with the optical system in the direction of the optical axis by subjecting the focusing lens 33 to search driving, and thus, calculates focus evaluation values on different image planes. The lens position at which the peak focus evaluation value is obtained is detected as the focus position. However, if the moving speed of the image plane is too high, the image plane intervals at which a focus evaluation value is calculated become too wide, and an appropriate focus position cannot be detected in some cases. Particularly, an image plane movement coefficient K indicating an amount of movement of the image plane relative to the amount of driving of the focusing lens 33 varies with the lens position of the focusing lens 33 in the direction of the optical axis. Therefore, even in a case where the focusing lens 33 is driven at a constant speed, the moving speed of the image plane becomes too high, depending on the lens position of the focusing lens 33, and the image plane intervals at which a focus evaluation value is calculated become too wide. As a result, an appropriate focus position cannot be detected in some cases.

To counter this, the camera controller 21 in this embodiment calculates a search drive speed V for search driving of the focusing lens 33, in accordance with the second coefficient K2 (minimum image plane movement coefficient $K_{min}$) obtained in step S104. Using the second coefficient K2

(minimum image plane movement coefficient $K_{min}$), the camera controller 21 calculates a search drive speed V that is a driving speed with which an appropriate focus position can be detected by the contrast detection method, and also is the highest driving speed. Since the second coefficient K2 is a value that has been set in accordance with the characteristics, the usage conditions, and the like of the lens barrel, the camera controller 21 can perform control suitable for the characteristics, the usage conditions, and the like of the lens barrel by performing control using the second coefficient K2.

In step S108, a search operation is started at the search drive speed V determined in step S107. Specifically, the camera controller 21 issues a search drive start instruction to the lens controller 36. In accordance with the instruction from the camera controller 21, the lens controller 36 drives the focusing lens drive motor 331 to subject the focusing lens 33 to search driving at the search drive speed V determined in step S107. While causing the focusing lens 33 to be driven at the search drive speed V, the camera controller 21 reads pixel outputs from the imaging pixels of the imaging element 22 at predetermined intervals. In accordance with the pixel outputs, the camera controller 21 calculates focus evaluation values, to obtain focus evaluation values at different focusing lens positions. In this manner, focus position detection by the contrast detection method is conducted.

In step S109, the camera controller 21 determines whether the peak value among the focus evaluation values is detected (a focus position is detected). If the peak value among the focus evaluation values cannot be detected, the operation returns to step S108, and the processes in steps S108 and S109 are repeated until the peak value among focus evaluation values is detected, or the focusing lens 33 is driven to reach a predetermined drive end. If the peak value among the focus evaluation values is detected, on the other hand, the operation moves on to step S110.

If the peak value among the focus evaluation values is detected, the operation moves on to step S110. In step S110, the camera controller 21 transmits an instruction to the lens controller 36 so that focusing driving is performed at the position corresponding to the peak value among the focus evaluation values. In accordance with the received instruction, the lens controller 36 drives and controls the focusing lens 33.

The operation then moves on to step S111. In step S111, the camera controller 21 determines that the focusing lens 33 has reached the position corresponding to the peak value among the focus evaluation values, and performs still image shooting control when the operator fully presses the shutter release button (the second switch SW2 is turned on). After the shooting control ends, the operation returns to step S104.

If the lens barrel 3 is determined to be a lens not compatible with the communication mode of the first type in step S102, on the other hand, the operation moves on to step S112, and the processes in steps S112 through S120 are then carried out. In steps S112 through S120, when lens information transmission is repeatedly performed through hotline communication between the camera body 2 and the lens barrel 3, the same processes as those in steps S103 through S111 described above are carried out, except that information including the current-position image plane movement coefficient $K_{cur}$ but not including information about the first coefficient K1, the second coefficient K2, and the third coefficient K3 is transmitted as the lens information (step S113), and the current-position image plane movement coefficient $K_{cur}$ included in the lens information is used, instead of the second coefficient K2 (minimum image plane movement coefficient $K_{min}$), in determining the search drive speed V as the driving speed of the focusing lens 33 in a search operation (step S116).

In this embodiment, the lens controller 36 sets the first coefficient K1, the second coefficient K2, and the third coefficient K3 as appropriate in accordance with the characteristics, the usage conditions, and the like of the lens barrel, and the camera controller 21 performs control using at least one coefficient among the first coefficient K1, the second coefficient K2, and the third coefficient K3. In this manner, various kinds of control can be performed in accordance with the characteristics, the usage conditions, and the like of the lens barrel. In the above described example in this embodiment, the first coefficient K1 (current-position image plane movement coefficient $K_{cur}$), the second coefficient K2 (minimum image plane movement coefficient $K_{min}$), and the third coefficient K3 (maximum image plane movement coefficient $K_{max}$) are transmitted. However, the present invention is not limited to such an example. For example, the lens controller 36 may set the current-position image plane movement coefficient $K_{cur}$ as the first coefficient K1, set the second coefficient K2 at a value equal to or smaller than the current-position image plane movement coefficient $K_{cur}$, and set the third coefficient K3 at a value equal to or greater than the current-position image plane movement coefficient $K_{cur}$.

Second Embodiment

In a second embodiment, the camera body 2 determines whether to permit a high-speed search or whether to permit a high-speed search during a contrast AF process, using the second coefficient K2. A specific method of setting the second coefficient K2 in this embodiment will be described later.

In a case where a high-speed search is prohibited, the camera controller 21 obtains focus evaluation values on different image planes while driving the focusing lens 33 at a first search speed (low speed) in a first search range, and searches for the position of the focusing lens 33 at which a peak focus evaluation value is obtained (this search operation at the low speed will be hereinafter referred to as the "first search operation"). In a case where the position of the focusing lens 33 with a peak focus evaluation value is detected, focusing driving is performed. In a case where the position of the focusing lens 33 with a peak focus evaluation value is not detected as a result of the first search operation on the first search range, the first search operation is performed on a range outside the first search range, and, if the position of the focusing lens 33 with a peak focus evaluation value is detected, focusing driving is performed.

In a case where a high-speed search is permitted, the camera controller 21 first performs the first search operation in the first search range, and, if the position of the focusing lens 33 with a peak focus evaluation value is detected, focusing driving is performed. If any peak focus evaluation value is not obtained as a result of the first search operation on the first search range, the camera controller 21 obtains focus evaluation values on different image planes while driving the focusing lens 33 at a second search speed (high speed) on a range outside the first search range, and roughly (approximately) detects the position of the focusing lens 33 at which a peak focus evaluation value is obtained (the search operation at the high speed after the first search operation will be hereinafter referred to the "second search operation"). If the position of the focusing lens 33 with a peak focus evaluation value is detected as a result of the second search operation, focus evaluation values are obtained on different image planes while the focusing lens 33 is driven at a third search speed (low speed) on a range including the peak position detected in the second search operation, and the position of the focusing lens 33 at which the peak focus evaluation value is obtained is closely searched for (the search operation at the low speed after the second search operation will be hereinafter referred to as the "third search operation"). If the position of the focusing lens 33 with the peak focus evaluation value is detected as a result of the third search operation, focusing driving is performed. It should be noted that the third search speed should be lower than the second search speed, and the third search speed and the first search speed may be equal to each other.

In this embodiment, when a contrast AF process is performed, the camera controller 21 first determines whether to prohibit a high-speed search.

Figure 8:
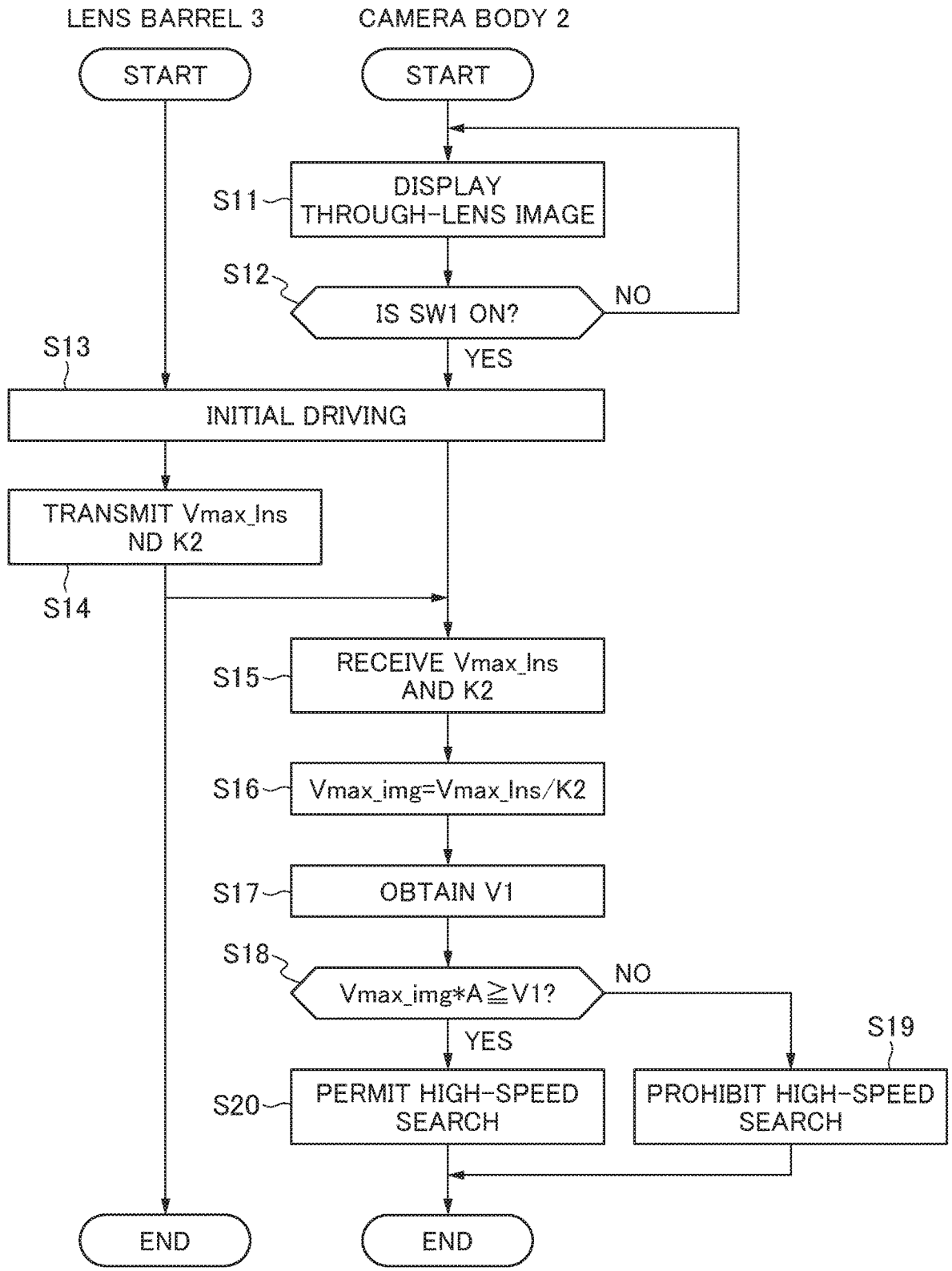
FIG. 8 is a sequence chart showing an example of a high-speed search determination process.

FIG. 8 is a sequence chart showing an example of a high-speed search determination process. This chart shows a process from the start of a contrast AF process to the determination as to whether to permit a high-speed search or whether to prohibit a high-speed search.

In step S11, the imaging element 22 receives a flux of light from the imaging optical system, and performs image shooting for displaying a through-lens image. The camera controller 21 then receives an image signal outputted from the imaging element 22, and generates a through-lens image. The through-lens image is displayed on the liquid crystal monitor (not shown) of the camera body 2.

In step S12, the camera controller 21 determines whether the shutter release button has been pressed halfway (the first switch SW1 is turned on).

If the first switch SW1 is not on (NO in step S12), the camera controller 21 repeatedly determines whether halfway pressing has been performed, until the first switch SW1 is turned on.

If the first switch SW1 is on (YES in step S12), the camera controller 21 in step S13 causes the focusing lens 33 to be driven to a predetermined initial lens position (initial driving). The initial lens position in the initial driving is not limited to any particular position. For example, the initial lens position may be a position closer to the camera body 2 or the object than the current position is, or may be determined by the scene of image shooting. Alternatively, step S13 may be skipped, and the focusing lens 33 may remain at the current position without the initial driving.

In step S14, the lens communication module 38 of the lens barrel 3 transmits a maximum driving speed V max_lns (pulses per second) that is the highest possible speed at which the focusing lens 33 can be driven, and the second coefficient K2 to the camera body 2. The maximum driving speed V max_lns is stored in the lens memory 37, for example. The lens communication module 38 may transmit the maximum driving speed V max_lns and the second coefficient K2 through hot-line communication, or may transmit the maximum driving speed V max_lns and the second coefficient K2 in response to a transmission request from the camera body 2.

In step S15, the camera communication module 29 of the camera body 2 receives the maximum driving speed V max_lns and the second coefficient K2.

Here, the maximum driving speed V max_lns is the driving speed of the focusing lens 33, and is not the moving speed of the image plane. Therefore, in step S16, the camera controller 21 converts the maximum driving speed V max_lns to a maximum image plane moving speed V max_img (mm/sec), using the second coefficient K2. Specifically, the camera controller 21 calculates the maximum image plane moving speed V max_img according to the expression (2) shown below.

$$V\max\_img = V\max\_lns/K2 \quad (2)$$

For example, if the second coefficient K2 is the current-position image plane movement coefficient $K_{cur}$, the maximum image plane moving speed V max_img is equivalent to the image plane moving speed in a case where the focusing lens 33 is driven at the current position of the focusing lens 33 at the maximum driving speed V max_lns. Also, if the second coefficient K2 is the minimum image plane movement coefficient $K_{min}$, for example, the maximum image plane moving speed V max_img is equivalent to the image plane moving speed in a case where the focusing lens 33 is driven at the position with the minimum image plane movement coefficient at the maximum driving speed V max_lns. If the second coefficient K2 is the minimum image plane movement coefficient $K_{min}$, the maximum image plane moving speed V max_img has a greater value than the maximum image plane moving speed V max_img in a case where the second coefficient K2 is the current-position image plane movement coefficient $K_{cur}$.

In step S17, the camera controller 21 obtains a first search speed V1 for the first search operation. The first search speed V1 is the image plane moving speed to be used when the focusing lens 33 is driven in the first search operation, and can be an image plane moving speed (focus-detection image plane moving speed) at which a focus position can be detected with a predetermined accuracy or higher, for example. In a specific example case where the intervals at which a focus evaluation value for detecting a focus position is obtained are approximately 300 μm in terms of image plane movement amount, and the time intervals at which a focus evaluation value is calculated are 1/60 seconds, the camera controller 21 can set the first search speed V1 at 300×60=18000 (μm/sec)=18 (mm/sec).

When the diaphragm 35 is narrowed, the focal depth becomes greater, and therefore, the intervals at which a focus evaluation value for detecting a focus position is obtained might become wider. In such a case, the first search speed V1 can be made even higher. The camera controller 21 does not need to calculate the first search speed V1, and may read the first search speed V1 stored beforehand in the camera memory 24 in the camera body 2. Alternatively, the first search speed V1 may be stored in the lens memory 37 in the lens barrel 3, and the camera controller 21 may receive the first search speed V1 from the lens barrel 3.

In step S18, the camera controller 21 determines whether the relationship shown in the expression (3) below is satisfied.

$$V\max\_img*A = V\max\_lns/K2*A \geq V1 \text{ (however,} \\ 0 < A \leq 1) \quad (3)$$

Here, A represents a predetermined constant, and may be 0.8 to 0.9, for example.

If the above expression (3) is not satisfied (NO in step S18), the maximum image plane moving speed V max_img and the first search speed V1 are determined to be almost the same. In this case, the camera controller 21 in step S19 prohibits a high-speed search. This is because the first search speed V1 is sufficiently high, and does not need to be switched to the second search speed V2. In a case where a high-speed search is prohibited, the camera controller 21 performs the first search operation in the first search range, and, if the position of the focusing lens 33 with a peak focus evaluation value is detected, focusing driving is performed, as described above. In a case where the position of the focusing lens 33 with a peak focus evaluation value is not detected as a result of the first search operation on the first search range, the first search operation is also performed on a range (or the entire range, for example) outside the first search range, and, if the position of the focusing lens 33 with a peak focus evaluation value is detected, focusing driving is performed.

If the above expression (3) is satisfied (YES in step S18), on the other hand, the maximum image plane moving speed V max_img is determined to be sufficiently higher than the first search speed V1. In this case, the camera controller 21 in step S20 permits a high-speed search. This is because the second search speed V2 is much higher than the first search speed V1, and accordingly, a quick search on a range (the entire range, for example) outside the first search range can be expected by switching the search speed to the second search speed V2. In a case where a high-speed search is permitted, the camera controller 21 performs the first search operation in the first search range, and, if the position of the focusing lens 33 with a peak focus evaluation value is detected, focusing driving is performed, as described above. If any peak focus evaluation value is not obtained as a result of the first search operation on the first search range, the camera controller 21 performs the second search operation on a range outside the first search range. In a case where the position of the focusing lens 33 with a peak focus evaluation value is detected as a result of the second search operation, the third search operation is performed on a range including the peak position detected in the second search operation, and, if the position of the focusing lens 33 with the peak focus evaluation value is detected, focusing driving is performed.

In the above manner, a determination as to whether to prohibit a high-speed search is made. In the description below, the operation to be performed when a high-speed search is prohibited, and the operation to be performed when a high-speed search is permitted will be described.

Figure 9:
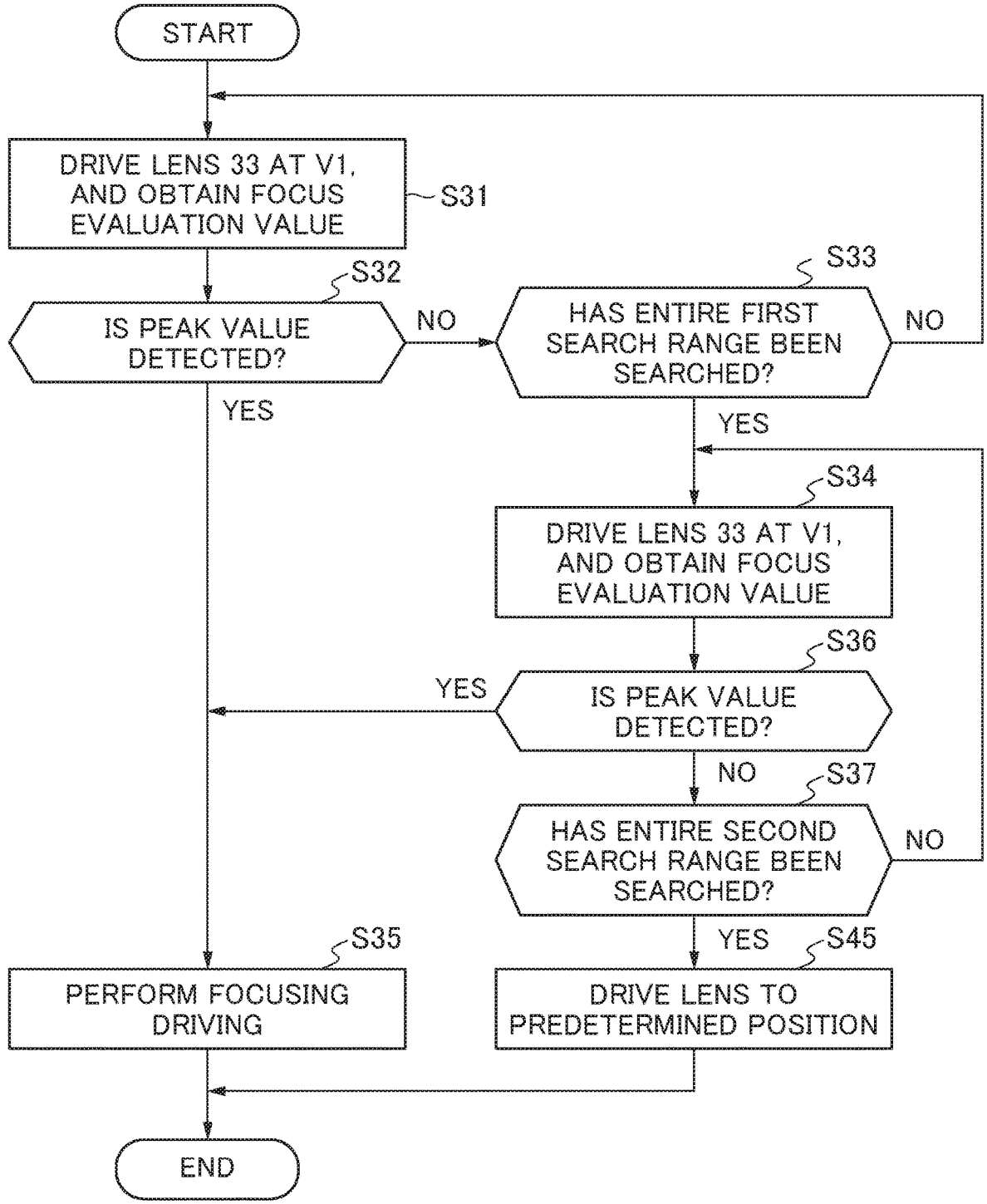
FIG. 9 is a flowchart showing the operation to be performed by the camera 1 when a high-speed search is prohibited.
Figure 10:
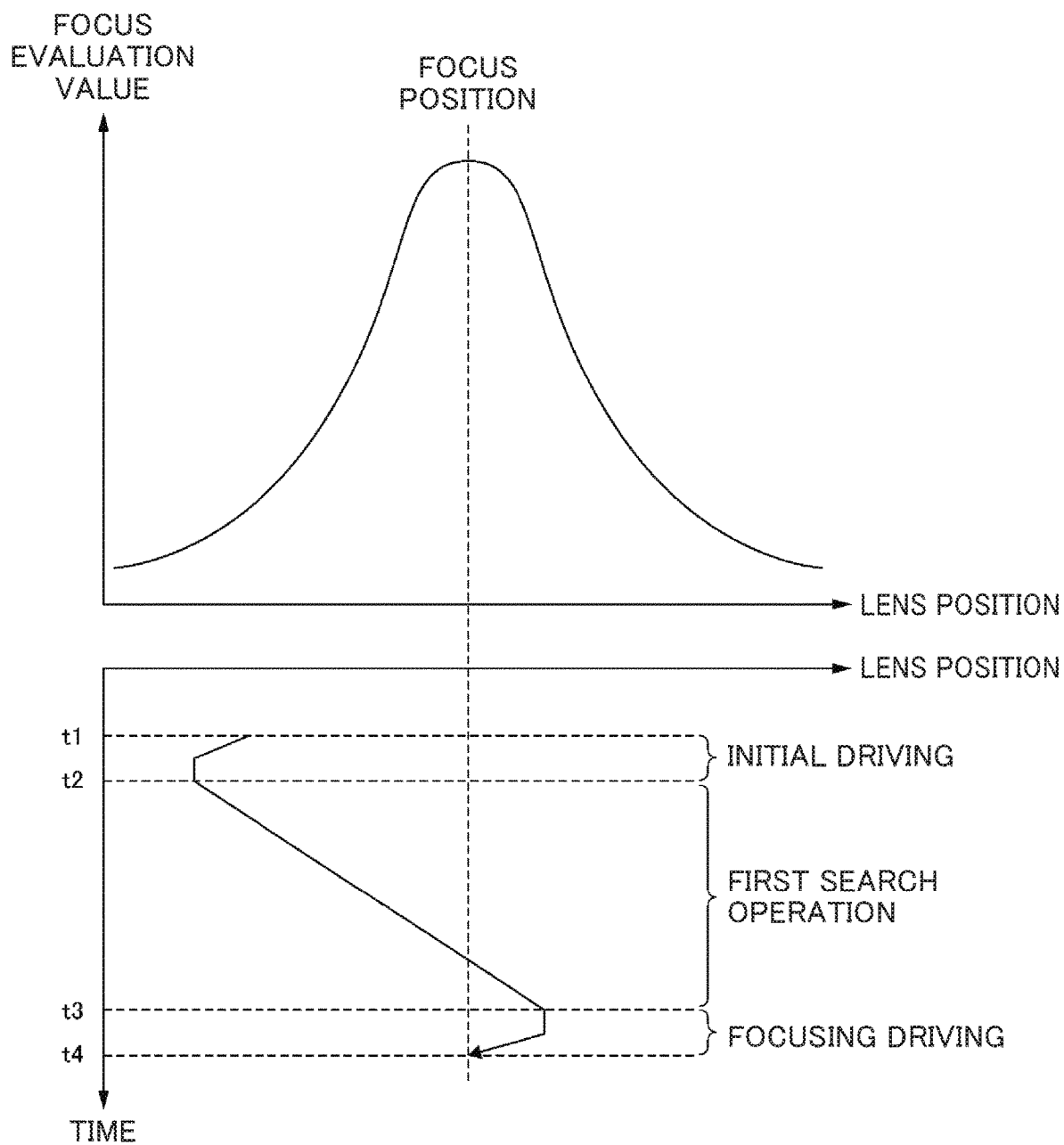
FIG. 10 is a chart for explaining the operation to be performed by the camera 1 when a high-speed search is prohibited.

FIG. 9 is a flowchart showing the operation to be performed by the camera 1 when a high-speed search is prohibited, and steps S31 through S33 in this flowchart correspond to the first search operation. FIG. 10 is a chart for explaining the operation to be performed by the camera 1 when a high-speed search is prohibited. At time from t1 to t2 in FIG. 10, the initial driving (step S13 in FIG. 8) is performed.

In step S31 in FIG. 9, in accordance with the current-position image plane movement coefficient $K_{cur}$, the camera controller 21 drives the focusing lens 33 so that the image plane moving speed becomes equal to the first search speed V1, and obtains a focus evaluation value (time t2 and later in FIG. 10). The method of calculating a focus evaluation value is not limited to any particular method. For example, the camera controller 21 processes an image signal received from the imaging element 22 with a high-frequency filter, and performs an integrating process on the filtered image signal, to calculate a focus evaluation value.

In step S32 in FIG. 9, the camera controller 21 determines whether a peak focus evaluation value is detected. For example, when the focus evaluation value rises twice and then drops twice, the camera controller 21 determines that a peak is detected.

If any peak is not detected (NO in step S32), the camera controller 21 in step S33 determines whether the first search range has been searched. The first search range is part of the entire search range (all the area in the focus adjustable range). If the search of the first search range has not been completed (NO in step S33), the operation returns to step S31, and the first search operation is continued.

If the search of the first search range has been completed (YES in step S33), the camera controller 21 in step S34 drives the focusing lens 33 at the first search speed V1, and obtains a focus evaluation value (first search operation). In step S36, the camera controller 21 determines whether a peak focus evaluation value is detected. If any peak is not detected (NO in step S36), the camera controller 21 in step S37 determines whether an entire second search range has been searched. The second search range may be the entire search range, or may be all the area in the entire search range (focus adjustable range), except for the range already searched in steps S31 through S33. If the search of the entire second search range has not been completed (NO in step S37), the operation returns to step S34, and the first search operation is continued. If the search of the entire second search range has been completed (YES in step S37), any focus position has not been detected even though the entire search range has been searched, and therefore, the camera controller 21 in step S45 drives the focusing lens 33 to a predetermined position. This predetermined position is not limited to any particular position. For example, this predetermined position may be the position at which the largest focus evaluation value is obtained, or may remain at the current position. Also, a message to the effect that any focus position has not been detected may be displayed on the liquid crystal monitor (not shown) of the camera body 2.

If a peak is detected in step S32 (YES in step S32, time t3 in FIG. 10), on the other hand, the camera controller 21 in step S35 in FIG. 9 drives the focusing lens 33 to the focus position (focusing driving, time from t3 to t4 in FIG. 10). That is, the camera controller 21 performs interpolation or the like using a few focus evaluation values in the neighborhood of the peak focus evaluation value, and thus, calculates a focus position. The camera controller 21 then drives the focusing lens 33 to the focus position. In doing so, the camera controller 21 may calculate the amount of image plane movement by taking into account the current-position image plane movement coefficient $K_{cur}$, and thus, drive the focusing lens 33 more accurately. In a case where a peak is detected in step S36, the camera controller 21 also drives the focusing lens 33 to the focus position (focusing driving).

Figure 11:
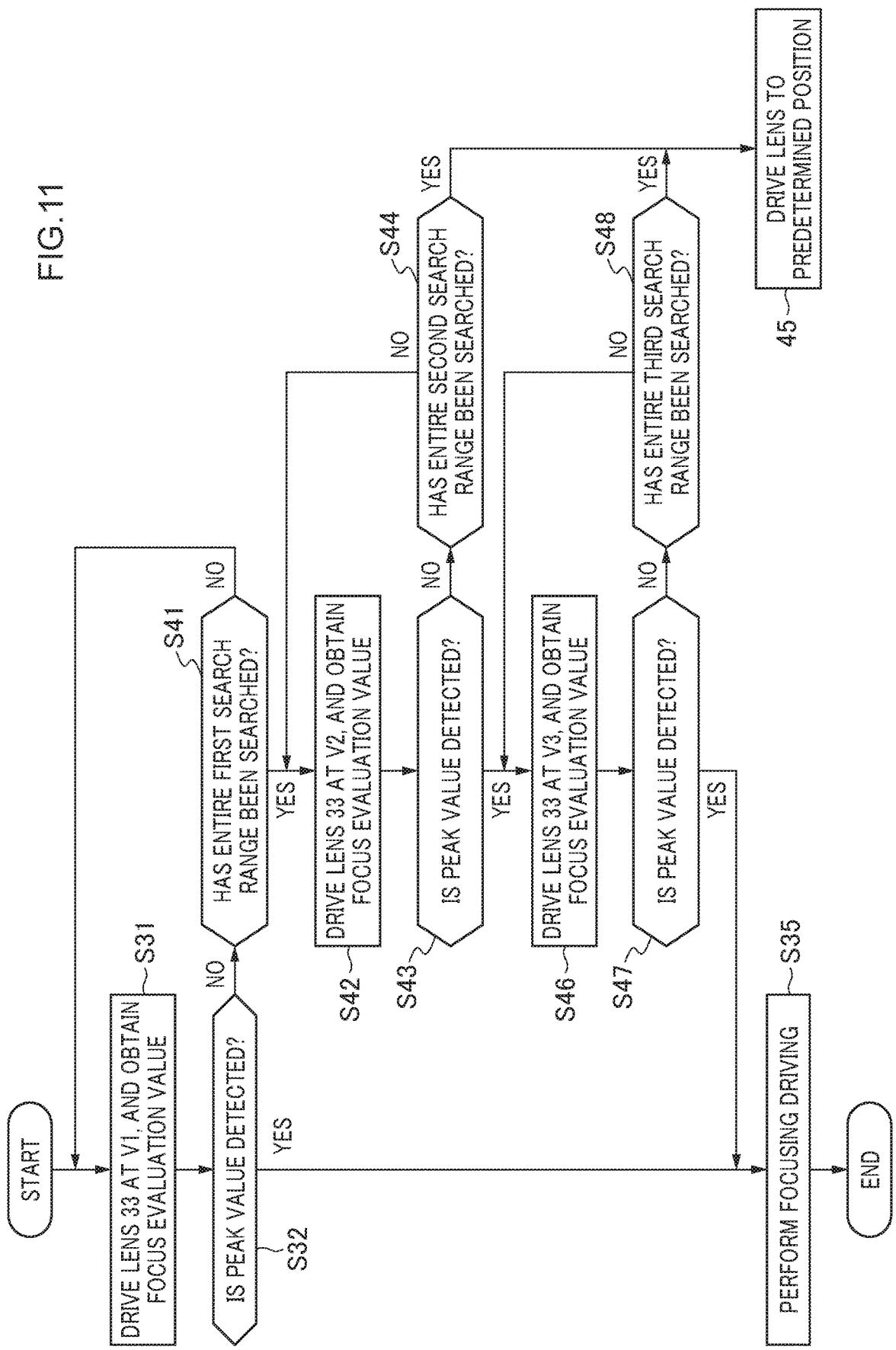
FIG. 11 is a flowchart showing the operation to be performed by the camera 1 when a high-speed search is permitted.
Figure 12:
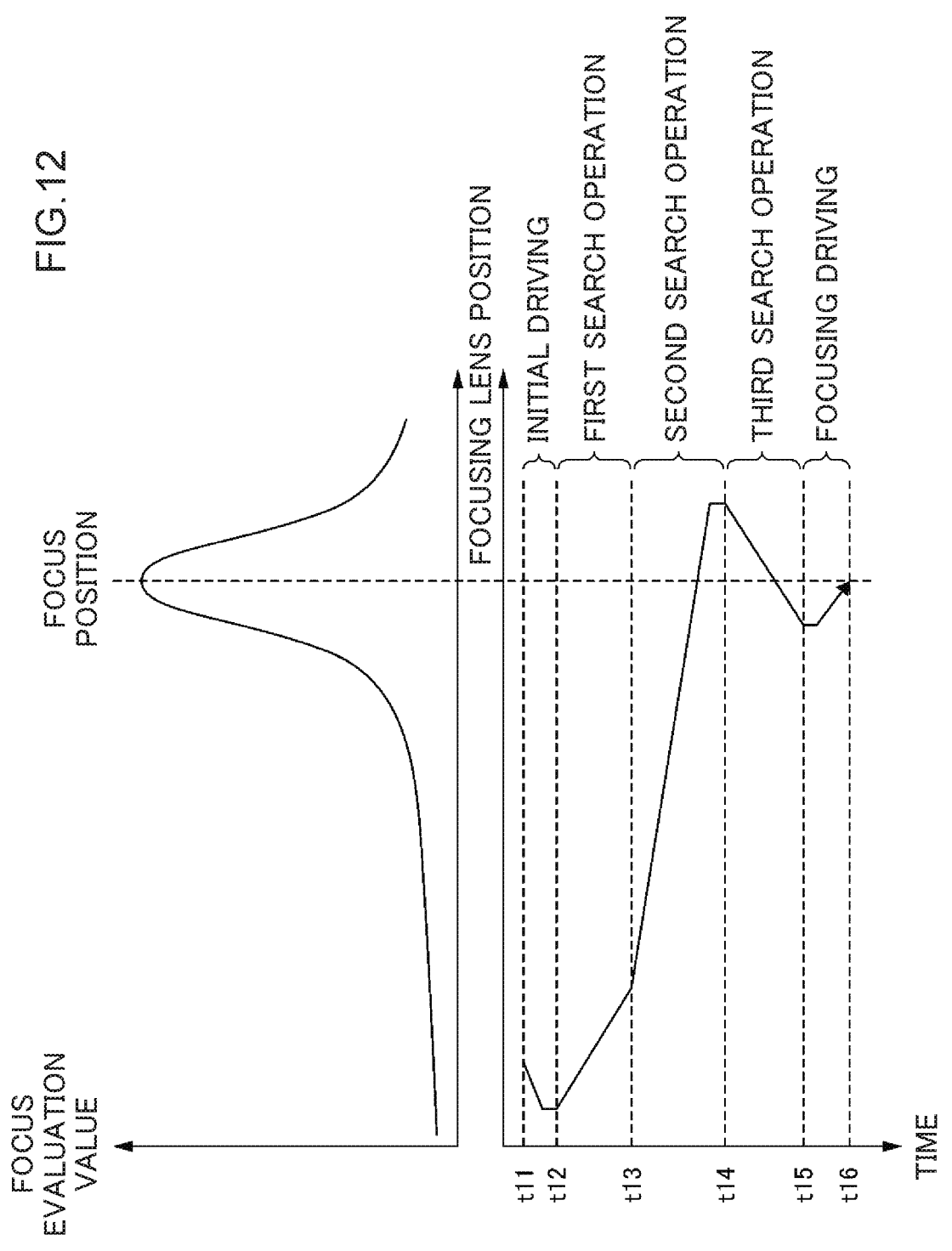

FIG. 11 is a flowchart showing the operation to be performed by the camera 1 when a high-speed search is permitted. Steps S31, S32, and S41 in this flowchart correspond to the first search operation, steps S42 through S44 correspond to the second search operation, and steps S46 through S48 correspond to the third search operation. FIG. 12 is a chart for explaining the operation to be performed by the camera 1 when a high-speed search is permitted. At time from t11 to t12 in FIG. 12, the initial driving (step S4 in FIG. 8) is performed.

The camera 1 first performs the first search operation (steps S31, S32, and S41 in FIG. 11, time from t12 to t13 in FIG. 12). If a peak focus evaluation value is detected by the first search operation (YES in step S32), the camera 1 performs focusing driving in step S35. Steps S31, S32, and S35 in FIG. 11 are substantially the same as those in FIG. 9, and therefore, detailed explanation of them is not made herein.

The difference from FIG. 9 lies in that the camera controller 21 in step S41 in FIG. 11 determines whether the entire first search range has been searched. The first search range is a narrower range than the entire search range, and is a predetermined range having its starting point at the position of the focusing lens 33 after the initial driving, for example. If the search of the first search range has not been completed (NO in step S41), the operation returns to step S31, and the first search operation is continued.

If any peak value of focus evaluation values is not detected as a result of the search of the entire first search range (YES in step S41), a focus position is not found in the first search range, and therefore, the camera 1 moves on to the second search operation.

That is, in step S42, the camera controller 21 drives the focusing lens 33 at the second search speed V2, and obtains a focus evaluation value (at time t13 and later in FIG. 12). The direction of driving of the focusing lens 33 in the second search operation is the same as the direction in the first search operation.

Here, the second search speed V2 has a greater value than the first search speed V1. The second search speed V2 should be such a speed that a peak focus evaluation value can be detected, and may not necessarily be such a speed that a focus position can be detected. For example, the second search speed V2 may be 50 to 100 (mm/sec).

In step S43, the camera controller 21 determines whether a peak focus evaluation value is detected. For example, when the focus evaluation value rises twice and then drops twice, the camera controller 21 determines that a peak is detected.

If any peak is not detected (NO in step S43), the camera controller 21 in step S44 determines whether the entire second search range has been searched. The second search range may be the entire search range, or may be all the area in the entire search range (focus adjustable range), except for the already searched first search range. If the search of the entire second search range has not been completed (NO in step S44), the operation returns to step S42, and the second search operation is continued.

If the search of the entire second search range has been completed (YES in step S44), any focus position has not been detected even though the entire search range has been searched, and therefore, the camera controller 21 in step S45 drives the focusing lens 33 to a predetermined position. This predetermined position is not limited to any particular position. For example, this predetermined position may be the position at which the largest focus evaluation value is obtained, or may remain at the current position. Also, a message to the effect that any focus position has not been detected may be displayed on the liquid crystal monitor (not shown) of the camera body 2.

If a peak is detected in step S43 (YES in step S43, at time t14 in FIG. 10), it is preferable not to perform focusing driving immediately. Since the focusing lens 33 is driven at a high speed in the second search operation, the sampling intervals are wide, and an accurate focus position cannot always be identified. Therefore, the camera 1 performs the third search operation in the following manner.

In step S46, the camera controller 21 drives the focusing lens 33 at the third search speed V3, and obtains a focus evaluation value (at time t14 and later in FIG. 12). The direction of driving of the focusing lens 33 in the third search operation is the opposite of the direction in the second search operation.

The third search speed V3 is a speed based on the image plane moving speed to be used when the focusing lens 33 is driven in the third search operation, and can be an image plane moving speed at which a focus position can be detected, for example. The third search speed V3 may be equal to the first search speed V1.

In step S47, the camera controller 21 determines whether a peak focus evaluation value is detected. For example, when the focus evaluation value rises twice and then drops twice, the camera controller 21 determines that a peak is detected.

If any peak is not detected (NO in step S47), the camera controller 21 in step S48 determines whether an entire third search range has been searched. The third search range is a predetermined range having its starting point at the position of the focusing lens 33 at the time of the peak detection in the second search operation. If the search of the third search range has not been completed (NO in step S48), the operation returns to step S46, and the third search operation is continued.

If the search of the entire third search range has been completed (YES in step S48), any focus position has not been detected, and therefore, the camera controller 21 in step S45 drives the focusing lens 33 to a predetermined position.

If a peak is detected in step S47 (YES in step S47, time t15 in FIG. 12), the camera controller 21 in step S35 in FIG. 11 drives the focusing lens 33 to the focus position (time from t15 to t16 in FIG. 12).

In the above manner, the camera 1 can make a high-speed search determination using the second coefficient K2, and then perform a contrast AF process. As a high-speed search is conducted, the focusing lens 33 can be moved to a focus position in a short time even if the focus position is at a distance from the initial lens position (the position of the focusing lens 33 at the time of completion of the initial driving).

Meanwhile, a determination as to whether to permit a high-speed search or whether to prohibit a high-speed search is made according to the above expression (3). Accordingly, where the second coefficient K2 is set at a smaller value, a high-speed search is permitted more easily, and focusing in a shorter time can be expected.

In a high-speed search, the focusing lens 33 needs to be driven at the second search speed V2, which is higher than the first search speed V1. At the start of the third search operation, the focusing lens 33 being driven at the second search speed V2 needs to be stopped. As a result, if a high-speed search is performed too often, the life of the drive motor 331 that drives the focusing lens 33 might be shortened.

In view of this, it is preferable to set the second coefficient K2 by taking into account the balance between the time required for focusing and the life of the drive motor 331. That is, where priority is given to focusing in a short time, the second coefficient K2 should be set at a small value. Where priority is given to the life of the drive motor 331, the second coefficient K2 should be set at a great value.

Also, where the relationship between the current-position image plane movement coefficient $K_{cur}$ and the second coefficient K2 is taken into account, the following operations are to be performed. In a case where a high-speed search is not conducted, the entire search range is searched at the first search speed V1 (which is such an image plane moving speed that a focus position can be detected). According to the above expression (1), as the current-position image plane movement coefficient $K_{cur}$ becomes smaller, the driving speed of the focusing lens 33 for adjusting the image plane moving speed to the first search speed V1 becomes lower.

Therefore, as the current-position image plane movement coefficient $K_{cur}$ becomes smaller, the driving speed of the focusing lens 33 becomes lower, resulting in a longer focusing time in a case where a high-speed search is not conducted. On the other hand, as the current-position image plane movement coefficient $K_{cur}$ becomes larger, the focusing time in a case where a high-speed search is not conducted becomes shorter.

Therefore, where the current-position image plane movement coefficient $K_{cur}$ is smaller, there is a higher degree of necessity to conduct a high-speed search, and the second coefficient K2 should be set at a smaller value accordingly. On the other hand, where the current-position image plane movement coefficient $K_{cur}$ is larger, there is a lower degree of necessity to conduct a high-speed search, and the second coefficient K2 can be set at a greater value.

As a criterion in such a case, the second coefficient K2 is preferably set at a value equal to or smaller than the current-position image plane movement coefficient $K_{cur}$. This is because, if the second coefficient K2 is set at a greater value than the current-position image plane movement coefficient $K_{cur}$, the second coefficient is large while the current-position image plane movement coefficient $K_{cur}$ is small, and a high-speed search is hardly permitted. According to the above criterion, the second coefficient K2 is small while the current-position image plane movement coefficient $K_{cur}$ is small, and the second coefficient is large while the current-position image plane movement coefficient $K_{cur}$ is large.

In view of the above, in a case where priority is given to focusing in a short time, the second coefficient K2 can be set at the value of the minimum image plane movement coefficient $K_{min}$ in a specific example of setting of the second coefficient K2. In a case where priority is given to the life of the drive motor 331, on the other hand, the second coefficient K2 can be set at the value of the current-position image plane movement coefficient $K_{cur}$. It is of course also possible to set the second coefficient K2 at a value between the current-position image plane movement coefficient $K_{cur}$ and the minimum image plane movement coefficient $K_{mini}$ or at a smaller value than the minimum image plane movement coefficient $K_{min}$.

As described above, in the second embodiment, a determination as to whether to permit a high-speed search or whether to prohibit a high-speed search is made in accordance with the second coefficient K2. As a high-speed search is conducted, the time required for focusing can be shortened. Also, the balance between the time required for focusing and the drive motor 331 can be adjusted with the value of the second coefficient K2 on the side of the lens barrel 3.

For example, when the focus position is at a sufficient distance from the initial lens position, focusing in a shorter time can be expected in a case where a high-speed search is conducted on the entire second search range at the second search speed V2 than in a case where the entire second search range is searched at the first search speed V1. In a case where a high-speed search is conducted at the second search speed V2, however, the shortening of the focusing time is reduced by the amount equivalent to the time required for searching at the third search speed V3 after the high-speed search.

In view of this, the lens controller 36 may set the second coefficient K2 at a small value so that a high-speed search can be easily permitted when the focus position is at a predetermined distance or longer from the initial lens position, and set the second coefficient K2 at a great value so that a high-speed search is not easily permitted when the focus position is at a shorter distance than the predetermined distance from the initial lens position.

For example, taking into account the sizes of focus evaluation values, the variation among the focus evaluation values, changes in the focus evaluation values, and the like, the camera controller 21 may transmit, to the lens controller 36, a result of a determination as to whether the focus position is at a shorter distance than the predetermined distance from the initial lens position. In turn, the lens controller 36 can set the value of the second coefficient K2 in accordance with the determination result transmitted from the camera controller 21. For example, in a case where the second coefficient K2 is set at the value of the current-position image plane movement coefficient $K_{cur}$, the second coefficient K2 is set at a greater value than in a case where the second coefficient K2 is set at the value of the minimum image plane movement coefficient $K_{min}$. As described above, the camera controller 21 determines whether to permit a high-speed search or whether to prohibit a high-speed search according to the above expression (3).

Also, the lens controller 36 may set the second coefficient K2 at a small value when the distance between the previous focus position and the initial lens position is equal to or longer than a predetermined distance, and set the second coefficient K2 at a great value when the distance between the previous focus position and the initial lens position is shorter than the predetermined distance.

Also, the lens controller 36 or the camera controller 21 may include a determiner (not shown) that determines the scene of image shooting, image shooting conditions, and the like. The lens controller 36 may set the second coefficient K2 at a small value in a case where a relatively large degree of defocusing tends to occur, such as in the case of sport recording to capture images of an object with strenuous movement. The lens controller 36 may set the second coefficient K2 at a great value in a case where a relatively large degree of defocusing hardly occurs, such as in the case of a landscape photograph in which the object stays still.

For example, the determiner can determine that a relatively large degree of defocusing easily occurs, in a case where outputs from an angular velocity sensor (gyroscope) or the like for detecting hand movement vary over a predetermined range or wider, where the variation among focus evaluation values is equal to or greater than a predetermined value, or where photometric values obtained by the photometric sensor vary over a predetermined range or wider. In a case where the determiner is provided in the camera controller 21, the lens controller 36 can set the value of the second coefficient K2 in accordance with a determination result transmitted from the camera controller 21.

Also, the lens controller 36 may set the second coefficient K2 at a small value in a case where the operator was not operating the focusing ring a predetermined period of time ago, because there is a high possibility of a relatively large degree of defocusing in such a case. The lens controller 36 may set the second coefficient K2 at a great value in a case where the operator was operating the focusing ring the predetermined period of time ago, because there is only a low possibility of a relatively large degree of defocusing in such a case.

Also, the lens controller 36 may set the second coefficient K2 at a small value in a case where the entire search range is a lens barrel of a predetermined length or longer (a lens barrel with which a search of the entire search range requires a predetermined time), and may set the second coefficient K2 at a great value in a case where the entire search range is a lens barrel shorter than the predetermined length (a lens barrel with which a search of the entire search range does not require the predetermined time).

In the above described specific example in this embodiment, the lens controller 36 transmits the minimum image plane movement coefficient $K_{min}$ or the current-position image plane movement coefficient $K_{cur}$ as the second coefficient K2. However, the present invention is not limited to such an example. For example, in accordance with predetermined conditions shown in FIGS. 13 and 14, the lens controller may transmit a value between the minimum image plane movement coefficient $K_{min}$ and the current-position image plane movement coefficient $K_{cur}$ as the second coefficient K2, or may transmit a value between a smaller value than the minimum image plane movement coefficient $K_{min}$ and the current-position image plane movement coefficient $K_{cur}$ as the second coefficient K2.

Referring now to FIG. 13, this example is described in detail. The lens controller 36 detects the distance between the previous focus position and the initial lens position, and sets the second coefficient K2 in accordance with the detected distance. For example, in a case where the distance between the previous focus position and the initial lens position is equal to or longer than (the entire search range× 0.5), the second coefficient K2 is set at $K_{min}$. In a case where the distance between the previous focus position and the initial lens position is shorter than (the entire search range× 0.5) but is equal to or longer than (the entire search range× 0.3), a case where the distance is shorter than (the entire search range×0.3) but is equal to or longer than (the entire search range×0.1) and a case where the distance is shorter than (the entire search range×0.1) the second coefficients K2 are set at ($K_{min}$+0.3×($K_{cur}$-$K_{min}$)), $K_{min}$+0.6×($K_{cur}$-$K_{min}$)) and $K_{cur}$ respectively. In step S14 in FIG. 8 described above, the lens controller transmits the second coefficient K2 set as above, in response to a transmission request from the camera body 2.

Referring now to FIG. 14, this example is described in detail. When the lens barrel 3 of this embodiment is shipped from the factory, the second coefficient K2 is stored beforehand into the lens memory 37. For example, in a lens barrel 3 with which a search of the entire search range takes 3 seconds or longer, (the minimum image plane movement coefficient $K_{min}$×0.5) is stored as the second coefficient K2. In a lens barrel 3 with which a search of the entire search range takes less than 3 seconds but requires 2 seconds or longer, a lens barrel 3 with which a search of the entire search range takes less than 2 seconds but requires 1 second or longer, a lens barrel 3 with which a search of the entire search range takes less than 1 second, the stored second coefficients K2 are ($K_{min}$×0.5+0.3×($K_{cur}$-$K_{min}$)), ($K_{min}$× 0.5+0.6×($K_{cur}$-$K_{min}$)), and $K_{cur}$ respectively. In step S14 in FIG. 8 described above, the lens controller transmits the second coefficient K2 stored in the lens memory 37, in response to a transmission request from the camera body 2.

Third Embodiment

In a third embodiment, the camera body 2 performs anomaly determination, using the first coefficient K1 and the second coefficient K2. In this embodiment, the second coefficient K2 should be equal to or smaller than the first coefficient K1, and is not limited to any particular value.

Figure 15:
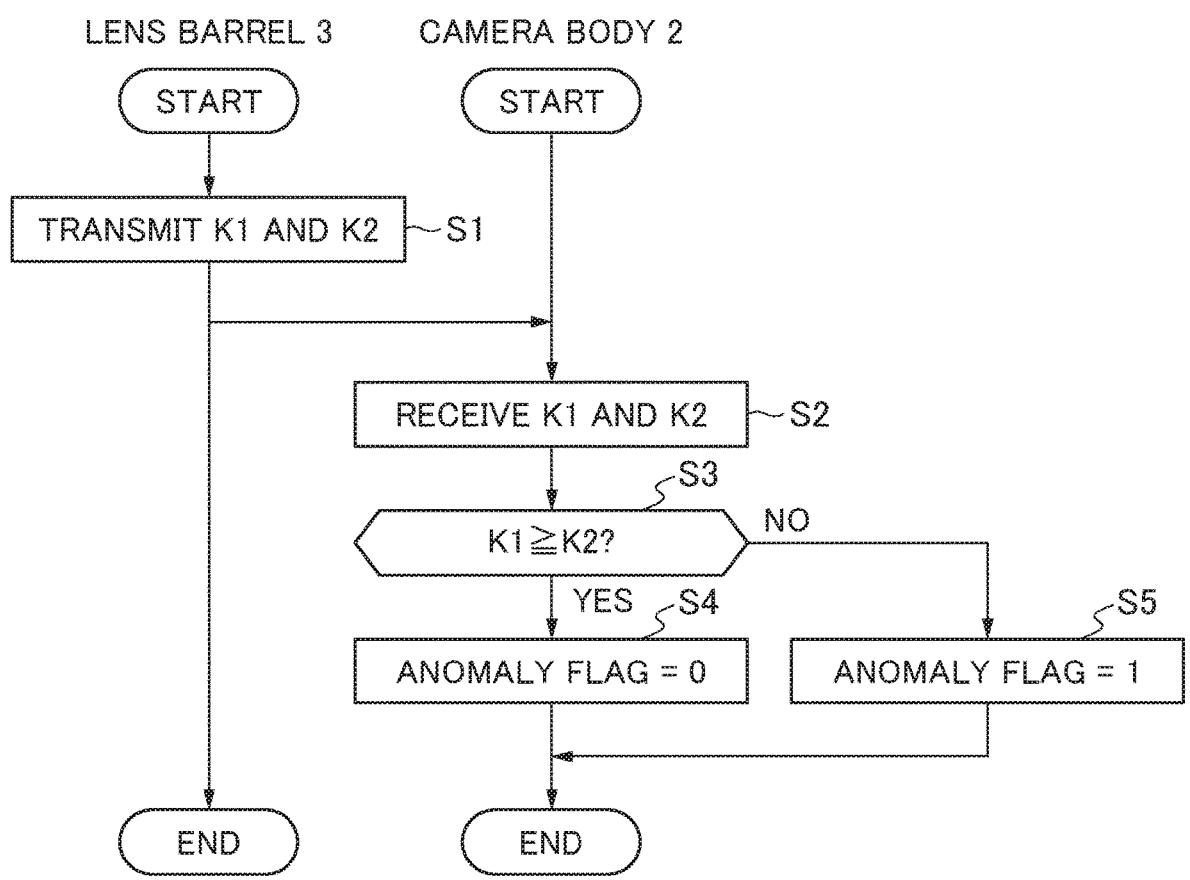
FIG. 15 is a sequence chart showing an example of an anomaly determination process.

FIG. 15 is a sequence chart showing an example of an anomaly determination process.

In step S1, the lens communication module 38 of the lens barrel 3 transmits the first coefficient K1 (which is the current-position image plane movement coefficient $K_{cur}$) and the second coefficient K2 to the camera body 2.

In step S2, the camera communication module 29 of the camera body 2 receives the first coefficient K1 and the second coefficient K2.

In step S3, the camera controller 21 determines whether the relationship, the first coefficient K1 □ the second coefficient K2, is satisfied. Since the second coefficient K2 is equal to or smaller than the first coefficient K1, this relationship should be satisfied, as long as there is no anomaly in the lens barrel 3 or in communication between the camera body 2 and the lens barrel 3.

If this relationship is satisfied (YES in step S3), it is determined that there is no anomaly, and the camera controller 21 sets an anomaly flag to 0 in step S4.

If this relationship is not satisfied (NO in step S3), on the other hand, it is determined that there is some anomaly, and the camera controller 21 sets the anomaly flag to 1 in step S5. If there is anomaly, there is a high possibility that the current-position image plane movement coefficient $K_{cur}$ is not properly transmitted to the camera body 2, and the accuracy of the contrast AF process might become lower. Therefore, a message indicating that there is some anomaly may be displayed on the camera body 2, or video recording may be prohibited.

Figure 16:
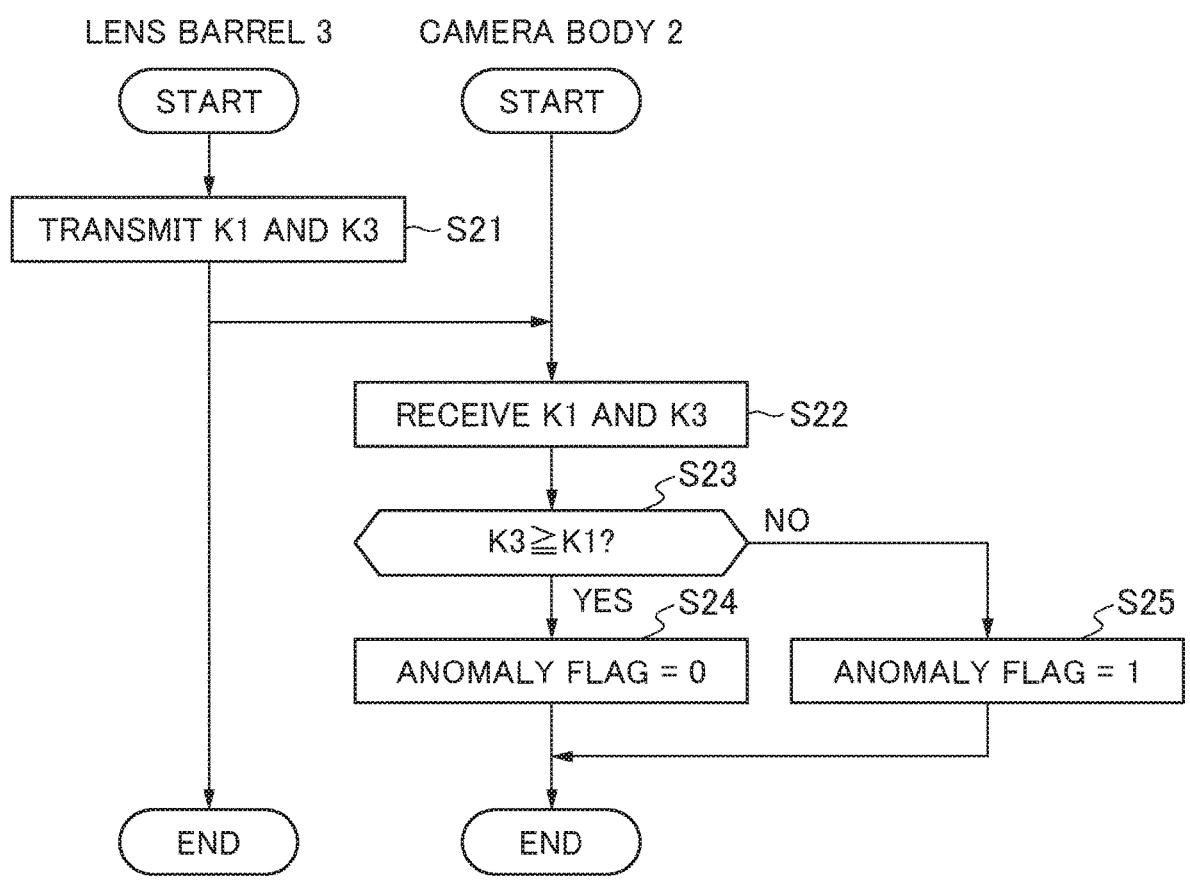
FIG. 16 is a sequence chart showing another example of an anomaly determination process.

The camera controller 21 preferably performs a determination as to whether the relationship, the first coefficient K1 □ the third coefficient K3, is satisfied, as well as the above determination as to whether the relationship, the first coefficient K1 □ the second coefficient K2, is satisfied. In this embodiment, the third coefficient K3 should be equal to or larger than the first coefficient K1, and is not limited to any particular value. Referring now to FIG. 16, such a process is described in detail.

Specifically, in step S21 shown in FIG. 16, the lens communication module 38 transmits the first coefficient K1 (current-position image plane movement coefficient $K_{cur}$) and the third coefficient K3 to the camera body 2.

In step S22, the camera communication module 29 of the camera body 2 receives the first coefficient K1 and the third coefficient K3.

In step S23, the camera controller 21 determines whether the relationship, the first coefficient K1 □ the third coefficient K3, is satisfied. Since the third coefficient K3 is equal to or larger than the first coefficient K1, this relationship should be satisfied, as long as there is no anomaly in the lens barrel 3 or in communication between the camera body 2 and the lens barrel 3.

If this relationship is satisfied (YES in step S23), it is determined that there is no anomaly, and the camera controller 21 sets the anomaly flag to 0 in step S24.

If this relationship is not satisfied (NO in step S23), on the other hand, it is determined that there is some anomaly, and the camera controller 21 sets the anomaly flag to 1 in step S25. If there is anomaly, there is a high possibility that the current-position image plane movement coefficient $K_{cur}$ is not properly transmitted to the camera body 2, and the accuracy of the contrast AF process might become lower. Therefore, a message indicating that there is some anomaly may be displayed on the camera body 2, or video recording may be prohibited.

As described above, in the third embodiment, the current-position image plane movement coefficient $K_{cur}$ is transmitted as the first coefficient K1, and a value equal to or smaller than the current-position image plane movement coefficient $K_{cur}$ is transmitted as the second coefficient K2, from the lens barrel 3 to the camera body 2. Thus, the camera body 2 can perform anomaly determination.

As described above, in this embodiment, the second coefficient K2 is not limited to any particular value, as long as it is equal to or smaller than the first coefficient K1. For example, the second coefficient K2 may be the current-position image plane movement coefficient $K_{cur}$, the minimum image plane movement coefficient $K_{min}$, a value between the current-position image plane movement coefficient $K_{cur}$ and the minimum image plane movement coefficient $K_{min}$, or a smaller value than the minimum image plane movement coefficient $K_{min}$. Alternatively, the second coefficient K2 may be a constant value, a value that varies (periodically or regularly, for example), or any appropriate value, as long as the second coefficient K2 is equal to or smaller than the first coefficient K1.

Where the second coefficient K2 is equal to or smaller than the first coefficient K1, the preferred example of setting of the second coefficient K2 for the high-speed search described in the second embodiment can be employed.

Fourth Embodiment

In a fourth embodiment, the camera body 2 determines whether to perform backlash elimination, in accordance with the second coefficient K2. First, backlash elimination is described.

Figure 17:
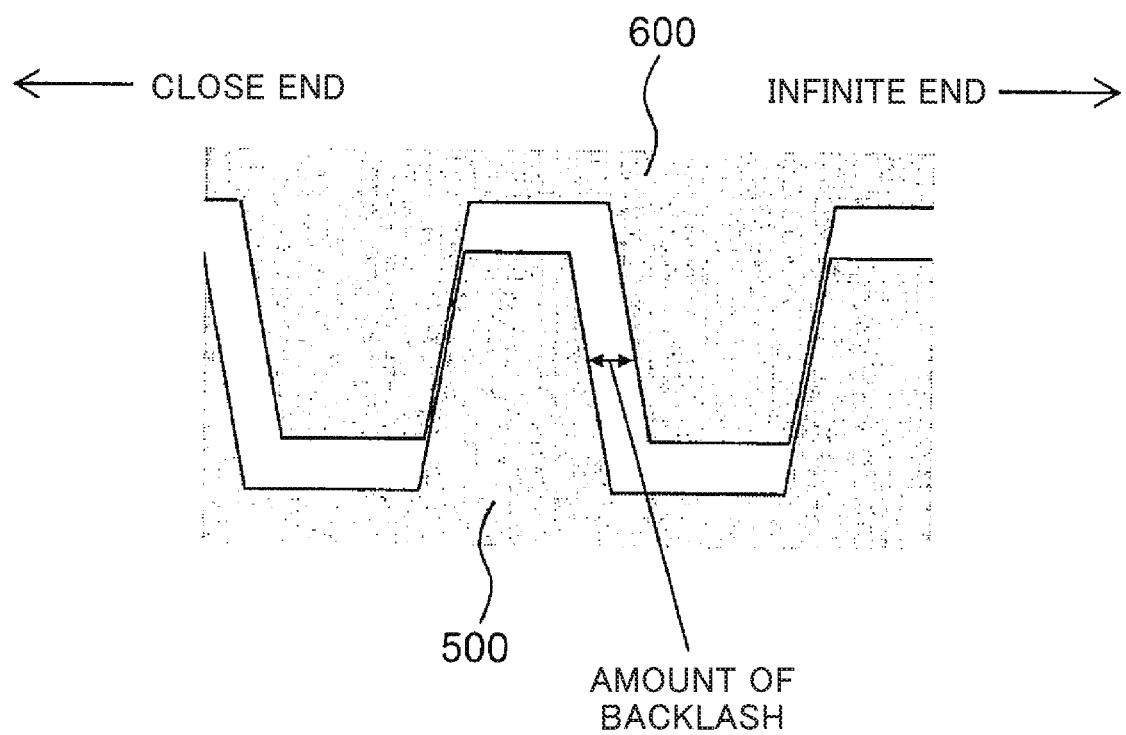
FIG. 17 is a diagram showing an example of a driving force transmission mechanism.

The focusing lens drive motor 331 for driving the focusing lens 33 shown in FIG. 1 is normally formed with a mechanical driving force transmission mechanism. As shown in FIG. 17, such a driving force transmission mechanism includes a first drive mechanism 500 and a second drive mechanism 600, for example. As the first drive mechanism 500 is driven first, the second drive mechanism 600 on the side of the focusing lens 33 is driven. With this, a mechanism that moves the focusing lens 33 toward the close side or the infinite side is formed. Between such drive mechanisms, a backlash amount G is normally allowed so that the engaging portions of the gears can move smoothly.

Figure 18:
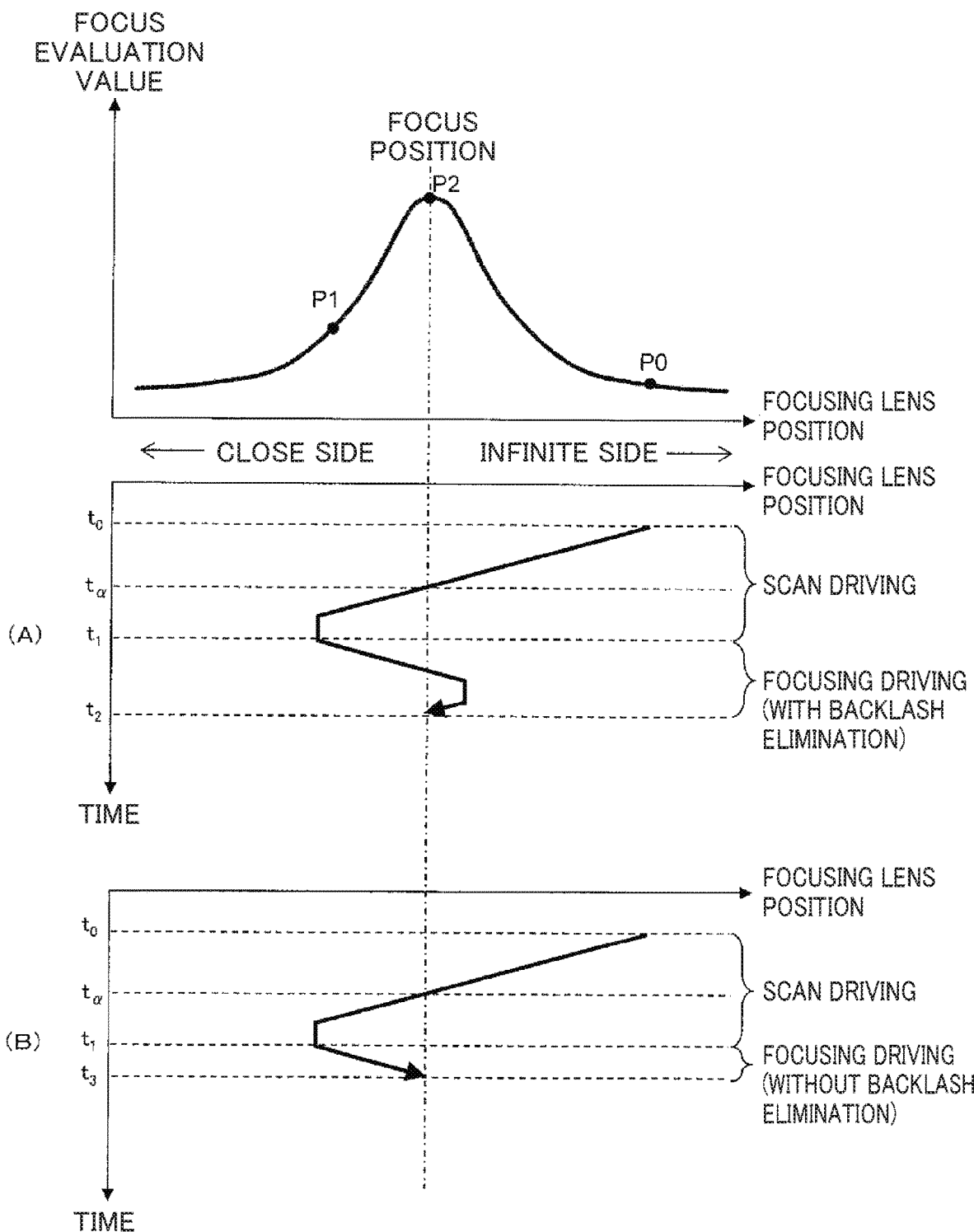
FIGS. 18(A) and 18(B) are charts showing the relationship between the position of the focusing lens 33, and focus evaluation values and time.

By the contrast detection method, however, the focusing lens 33 needs to pass through a focus position once in a search operation (a scan operation or a detection operation), because of its mechanism. After that, the driving direction needs to be reversed, so that the focusing lens 33 is driven to the focus position, as shown in FIGS. 18(A) and 18(B). If backlash elimination driving is not performed as shown in FIG. 18(B) in this case, the lens position of the focusing lens 33 deviates from the focus position by the amount equivalent to the backlash amount G. Therefore, to eliminate the influence of such a backlash amount G, the focusing lens 33 needs to pass through the focus position once when a focusing driving operation is performed. After that, the drive direction is again reversed, and the focusing lens 33 is driven to the focus position, as shown in FIG. 18(A). In this manner, backlash elimination driving is performed.

FIGS. 18(A) and 18(B) are charts showing the relationship between the position of the focusing lens 33, and focus evaluation values and time, in a case where a search operation according to this embodiment and focusing driving based on the contrast detection method are performed.

In FIG. 18(A), at time $t_0$, the camera controller 21 starts a search operation on the focusing lens 33 located at a lens position P0, in the direction from the infinite side toward the close side. After that, at time $t_1$, when the focusing lens 33 is moved to a lens position P1, a peak position P2 of the focus evaluation value is detected. At this point of time, the camera controller 21 stops the search operation, and performs focusing driving in conjunction with backlash elimination driving. With this, the focusing lens 33 is driven to the focus position at time $t_2$.

In FIG. 18(B), at time $t_0$, the camera controller 21 also starts a search operation. After that, at time $t_1$, the camera controller 21 stops the search operation, and performs focusing driving, but not backlash elimination driving. With this, the focusing lens 33 is driven to the focus position at time $t_3$.

In this embodiment, the camera body 2 performs a backlash elimination determination process to determine whether to conduct backlash elimination, using the second coefficient K2.

Figure 19:
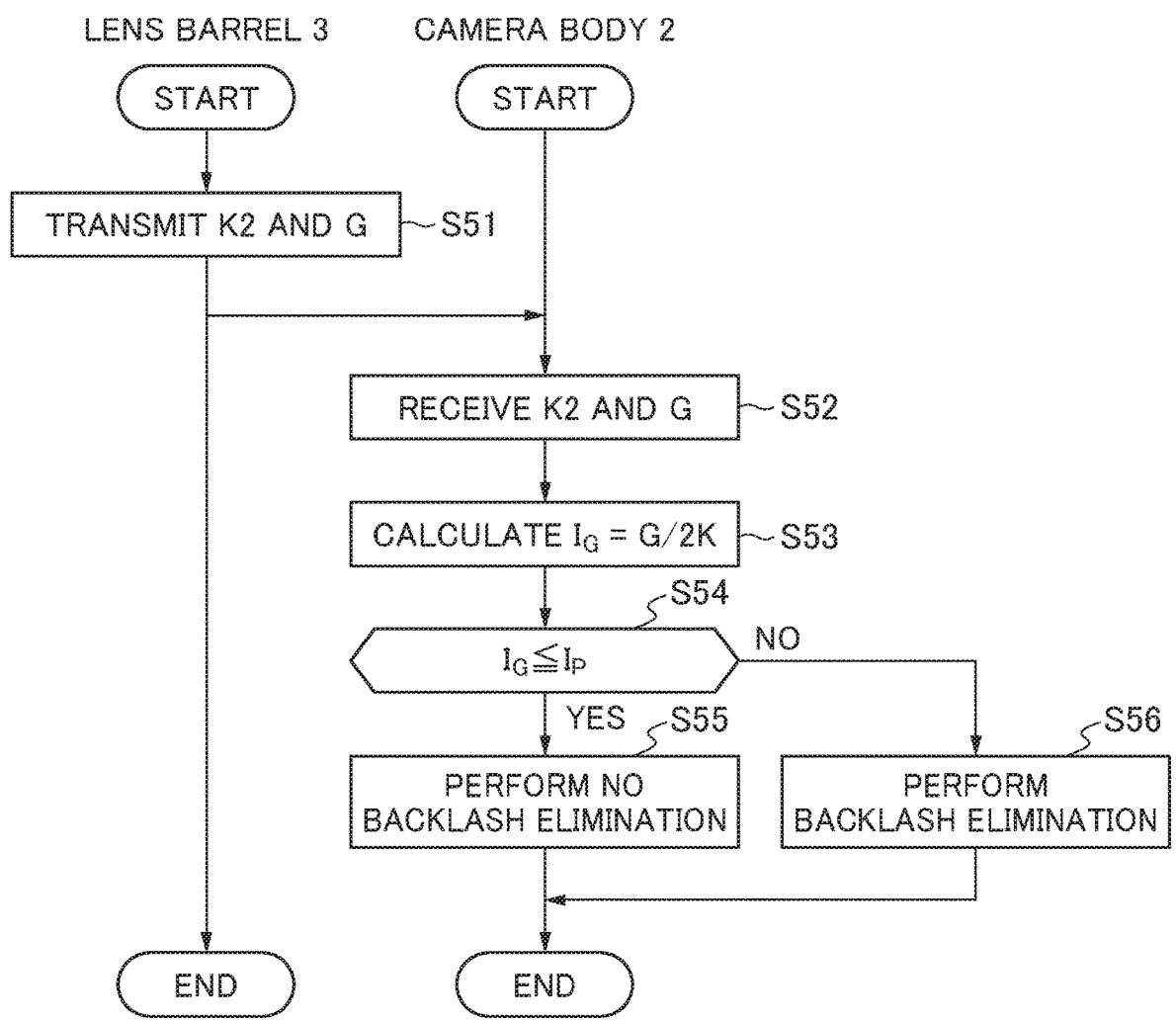
FIG. 19 is a sequence chart showing an example of a backlash elimination determination process.

FIG. 19 is a sequence chart showing an example of the backlash elimination determination process. It should be noted that the operation described below is performed when a focus position is detected by the contrast detection method. That is, as shown in FIGS. A14(A) and 18(B), the operation described below is performed at time $t_1$, when the peak position P2 of the focus evaluation value is detected. Also, the backlash amount G of the driving force transmission mechanism for the focusing lens 33 (see FIG. 17; this backlash amount will be hereinafter referred to simply as the backlash amount G) is stored into the lens memory 37 in advance.

First, in step S51, the lens communication module 38 of the lens barrel 3 transmits the second coefficient K2 and the backlash amount G to the camera body 2. The lens communication module 38 may transmit the second coefficient K2 and the backlash amount G through hot-line communication, or may transmit the second coefficient K2 and the backlash amount G in response to a transmission request from the camera body 2.

In step S52, the camera communication module 29 of the camera body 2 receives the second coefficient K2 and the backlash amount G.

In step S53, in accordance with the second coefficient K2 and the backlash amount G, the camera controller 21 calculates the image plane movement amount $I_G$ corresponding to the backlash amount G. The image plane movement amount $I_G$ corresponding to the backlash amount G is the amount of movement of the image plane in a case where the focusing lens 33 is driven by the amount equivalent to the backlash amount G, and is calculated according to the expression shown below.

$I_G = G/K2$

In step S54, the camera controller 21 performs a process of comparing the image plane movement amount $I_G$ corresponding to the backlash amount G with a predetermined image plane movement amount $I_P$. That is, the camera controller 21 determines whether the relationship, "the image plane movement amount $I_G$ corresponding to the backlash amount G"≤"the predetermined image plane movement amount $I_P$", is established.

It should be noted that the predetermined image plane movement amount $I_P$ is set in accordance with the focal depth of the optical system, and is normally the image plane movement amount corresponding to the focal depth. Also, since the predetermined image plane movement amount $I_P$ is set in accordance with the focal depth of the optical system, the predetermined image plane movement amount $I_P$ can be appropriately set in accordance with the F-value, the cell size of the imaging element 22, and the format of the image to be taken. That is, the predetermined image plane movement amount $I_P$ can be set so that, as the F-value becomes greater, the predetermined image plane movement amount $I_P$ becomes larger. Alternatively, the predetermined image plane movement amount $I_P$ can be set so that, as the sell size of the imaging element 22 becomes larger or the image format becomes smaller, the predetermined image plane movement amount $I_P$ becomes larger.

If the image plane movement amount $I_G$ corresponding to the backlash amount G is equal to or smaller than the predetermined image plane movement amount $I_P$ (YES in step S54), the position of the focusing lens 33 after driving can be adjusted to a position within the focal depth of the optical system, without backlash elimination driving. In step S55, the camera controller 21 then determines not to perform backlash elimination driving at the time of focusing driving.

If the image plane movement amount $I_G$ corresponding to the backlash amount G is larger than the predetermined image plane movement amount $I_P$ (NO in step S54), the lens position of the focusing lens 33 after driving cannot be adjusted to a position within the focal depth of the optical system, unless backlash elimination driving is performed. Therefore, in step S56, the camera controller 21 determines to perform backlash elimination driving at the time of focusing driving.

The camera body 2 transmits a result of the above determination to the lens barrel 3. Focusing driving is then performed in accordance with the result of the determination.

In the above example, the image plane movement amount $I_G$ in a case where the second coefficient K2 is the current-position image plane movement coefficient $K_{cur}$ has a smaller value than the image plane movement amount $I_G$ in a case where the second coefficient K2 is the minimum image plane movement coefficient $K_{min}$. Because of this, in a case where the lens communication module 38 transmits the current-position image plane movement coefficient $K_{cur}$ as the second coefficient K2 (where the image plane movement amount $I_G$ is small), the camera controller 21 can shorten the time required for focusing driving by the amount equivalent to the backlash elimination driving time, as backlash elimination driving is performed less frequently than in a case where the minimum image plane movement coefficient $K_{min}$ is transmitted as the second coefficient K2 (where the image plane movement amount $I_G$ is large). On the other hand, the image plane movement amount $I_G$ in a case where the second coefficient K2 is the minimum image plane movement coefficient $K_{min}$ has a larger value than the image plane movement amount $I_G$ in a case where the second coefficient K2 is the current-position image plane movement coefficient $K_{cur}$. Because of this, in a case where the lens communication module 38 transmits the minimum image plane movement coefficient $K_{min}$ as the second coefficient K2 (where the image plane movement amount $I_G$ is large), the camera controller 21 can certainly achieve a high focusing accuracy by virtue of backlash elimination driving, as backlash elimination driving is performed more readily than in a case where the current-position image plane movement coefficient $K_{cur}$ is transmitted as the second coefficient K2 (where the image plane movement amount $I_G$ is small). For example, even in a case where the backlash amount varies with changes over time, a high focusing accuracy can be certainly achieved by the lens communication module 38 transmitting the minimum image plane movement coefficient $K_{min}$ as the second coefficient K2 (or increasing the image plane movement amount $I_G$).

Figure 20:
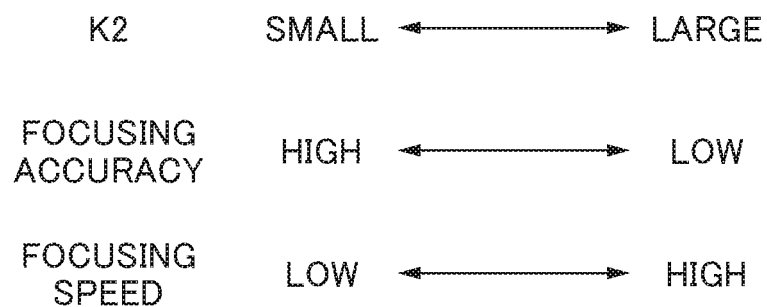
FIG. 20 is a chart schematically showing the relationship between the value of the second coefficient K2, and focusing accuracy and focusing speed.

FIG. 20 is a chart schematically showing the relationship between the value of the second coefficient K2, and focusing accuracy and focusing speed. As the second coefficient K2 is made smaller, the image plane movement amount IG corresponding to the backlash amount G becomes larger, and performing "backlash elimination" is more likely to be determined. As a result, a high focusing accuracy can be achieved more certainly, where the second coefficient K2 is smaller. On the other hand, as the second coefficient K2 is made larger, the image plane movement amount IG corresponding to the backlash amount G becomes smaller, and performing "no backlash elimination" is more likely to be determined. As a result, where the second coefficient K2 is larger, the focusing speed becomes higher by the amount equivalent to backlash elimination driving, and a through-lens image with an excellent appearance can be obtained.

In view of this, the second coefficient K2 should be appropriately set, with the balance between focusing accuracy and focusing speed being taken into account. For example, in a case where priority is given to focusing accuracy, the second coefficient K2 can be set at a small value (the minimum image plane movement coefficient $K_{min}$, for example). In a case where priority is given to focusing speed, the second coefficient K2 can be set at a large value (the current-position image plane movement coefficient $K_{cur}$, for example). It is of course also possible to set the second coefficient K2 at a value between the minimum image plane movement coefficient $K_{min}$ and the current-position image plane movement coefficient $K_{cur}$, or at a smaller value than the minimum image plane movement coefficient $K_{min}$.

As described above, in the fourth embodiment, the second coefficient K2 is transmitted from the lens barrel 3 to the camera body 2, and a check is then made to determine whether to conduct backlash elimination. As backlash elimination is conducted, a higher focusing accuracy can be achieved. Also, the balance between focusing accuracy and focusing speed can be adjusted with the value of the second coefficient K2 on the side of the lens barrel 3.

When the lens barrel 3 is shipped from the factory, for example, the second coefficient K2 is stored beforehand into the lens memory 37. For example, a second coefficient $K2=K_{cur}$ is set in a lens barrel 3 suitable for video shooting, and a second coefficient $K2=K_{min}$ is set in a lens barrel 3 suitable for still image shooting. This is because the lens barrel 3 suitable for video shooting makes backlash elimination difficult while giving priority to the appearance of a through-lens image, and a high focusing accuracy can be certainly achieved with the lens barrel 3 suitable for still image shooting. In this manner, the second coefficient K2 may be set, while not only the current image plane movement coefficient $K_{cur}$ and/or the minimum image plane movement coefficient $K_{min}$ but also whether the lens barrel is suitable for video shooting or is suitable for still image shooting is taken into account. In a specific example, the latter second coefficient K2 may be the smaller.

For example, a second coefficient $K2=K_{cur}$ may be set in a lens barrel 3 for which less-wearing, high-quality members (such as gears) are used. A second coefficient $K2=(K_{min} \times 0.5)$ may be set in a lens barrel 3 for which members that easily wear off are used. Such a second coefficient K2 is used in the lens barrel 3 in which gears and the like easily wear off, because a high focusing accuracy can be certainly achieved even in a case where the gears have worn off after a long period of use. In this manner, the second coefficient K2 may be set, while not only the current image plane movement coefficient $K_{cur}$ and/or the minimum image plane movement coefficient $K_{min}$ but also the durability of the members used in the lens barrel 3 is taken into account. In a specific example, the second coefficient K2 may be set at a small value, if the members used in the lens barrel 3 wear off rapidly.

For example, the lens barrel 3 may include a calculation module (not shown) that calculates the period of time that has passed since the date of manufacture of the lens barrel 3, the period of use of the lens barrel 3, or the like. The longer the period calculated by the calculation module, the smaller the value at which the lens controller 36 sets the second coefficient K2. For example, if the period calculated by the calculation module is five years or longer, the lens controller 36 may set the second coefficient K2 at $K_{min}$. If the period is three to five years, the lens controller 36 may set the second coefficient K2 at $(K_{min}+0.3\times(K_{cur}-K_{min}))$. If the period is one to three years, the lens controller 36 may set the second coefficient K2 at $(K_{min}+0.6\times(K_{cur}-K_{min}))$. If the period is shorter than one year, the lens controller 36 may set the second coefficient K2 at $K_{cur}$. This is because a high focusing accuracy can be certainly achieved in this manner, even if the gears have worn off after a long period of use. As described above, the second coefficient K2 may be set, while not only the current image plane movement coefficient $K_{cur}$ and/or the minimum image plane movement coefficient $K_{min}$ but also the period of time since the date of manufacture of the lens barrel 3 is taken into account. In a specific example, the second coefficient K2 may be set at a smaller value, as the period of time since the date of manufacture becomes longer.

In performing the above described backlash elimination control according to the fourth embodiment, the camera controller 21 may determine whether backlash elimination is necessary, in accordance with the focal length, the diaphragm, and the object distance. The camera controller 21 may vary the amount of driving in backlash elimination, in accordance with the focal length, the diaphragm, and the object distance. For example, in a case where the diaphragm is narrowed to a smaller value than a predetermined value (where the F-value is large), control may be performed so that backlash elimination is determined to be unnecessary or the amount of driving in backlash elimination becomes smaller than in a case where the diaphragm is not narrowed to a smaller value than the predetermined value (where the F-value is small). Further, on the wide side, control may be performed so that backlash elimination is determined to be unnecessary or the amount of driving in backlash elimination becomes smaller than on the tele side, for example.

Fifth Embodiment

In a fifth embodiment, the lens controller 36 transmits the second coefficient K2 to the camera controller, and, using the second coefficient K2, the camera controller 21 determines whether to permit silence control. If a predetermined condition is satisfied when silence control is permitted by the camera controller 21, the lens controller 36 performs silence control (slipping of the driving speed, for example). When silence control is not permitted by the camera controller 21, the lens controller 36 does not perform silence control in this embodiment.

Silence control is speed control to be performed so that the driving speed of the focusing lens 33 does not become lower than the silence lower limit lens speed (for example, the speed is clipped in such a manner as not to become lower than the silence lower limit lens speed). This is because, in a certain kind of lens barrel, if the driving speed of the focusing lens 33 becomes lower than the silence lower limit lens speed, the drive noise generated when the focusing lens 33 is driven might become higher than a predetermined level and hinder voice recording at a time of video shooting.

Figure 21:
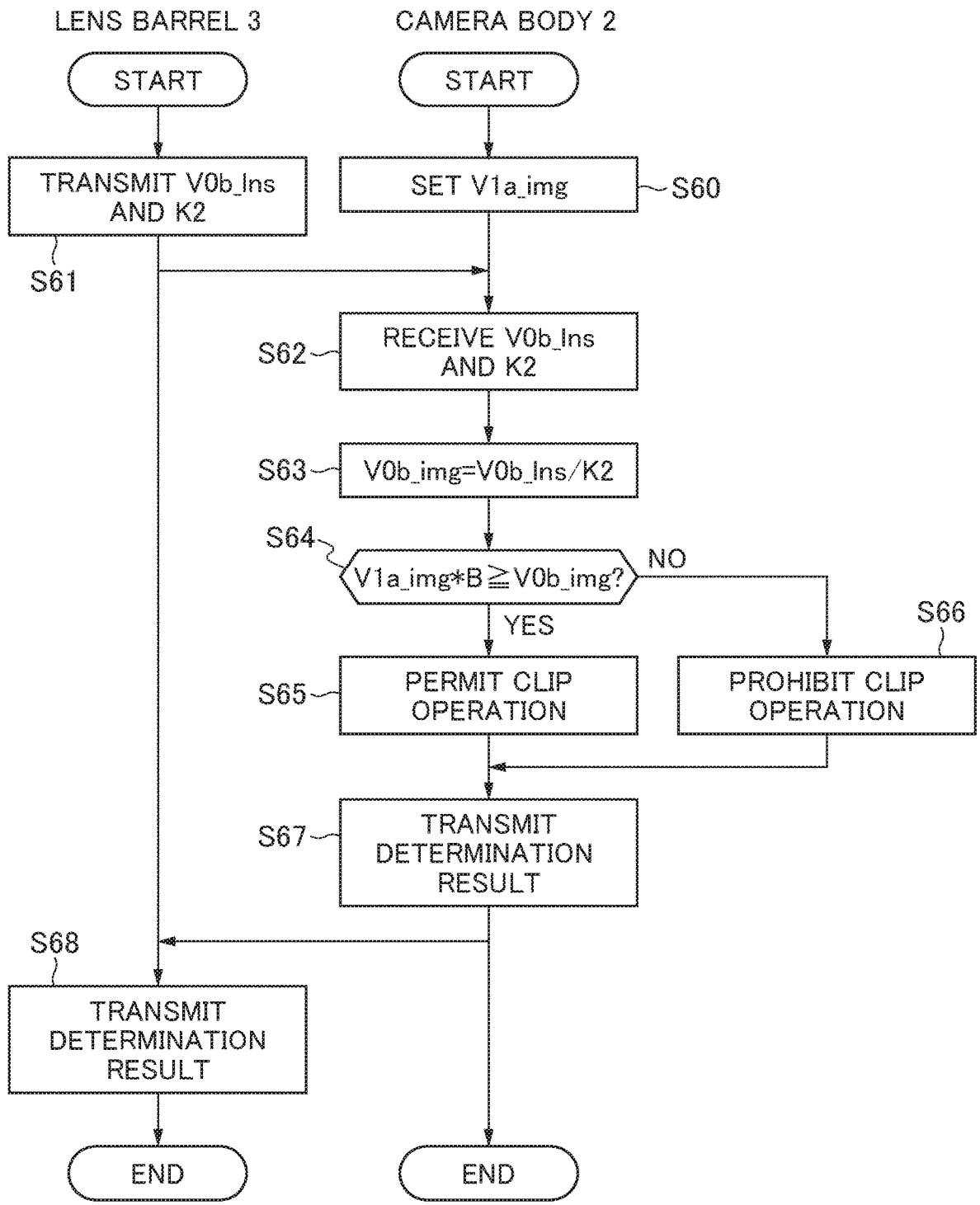
FIG. 21 is a sequence chart showing an example of a clip operation determination process.
Figure 22:
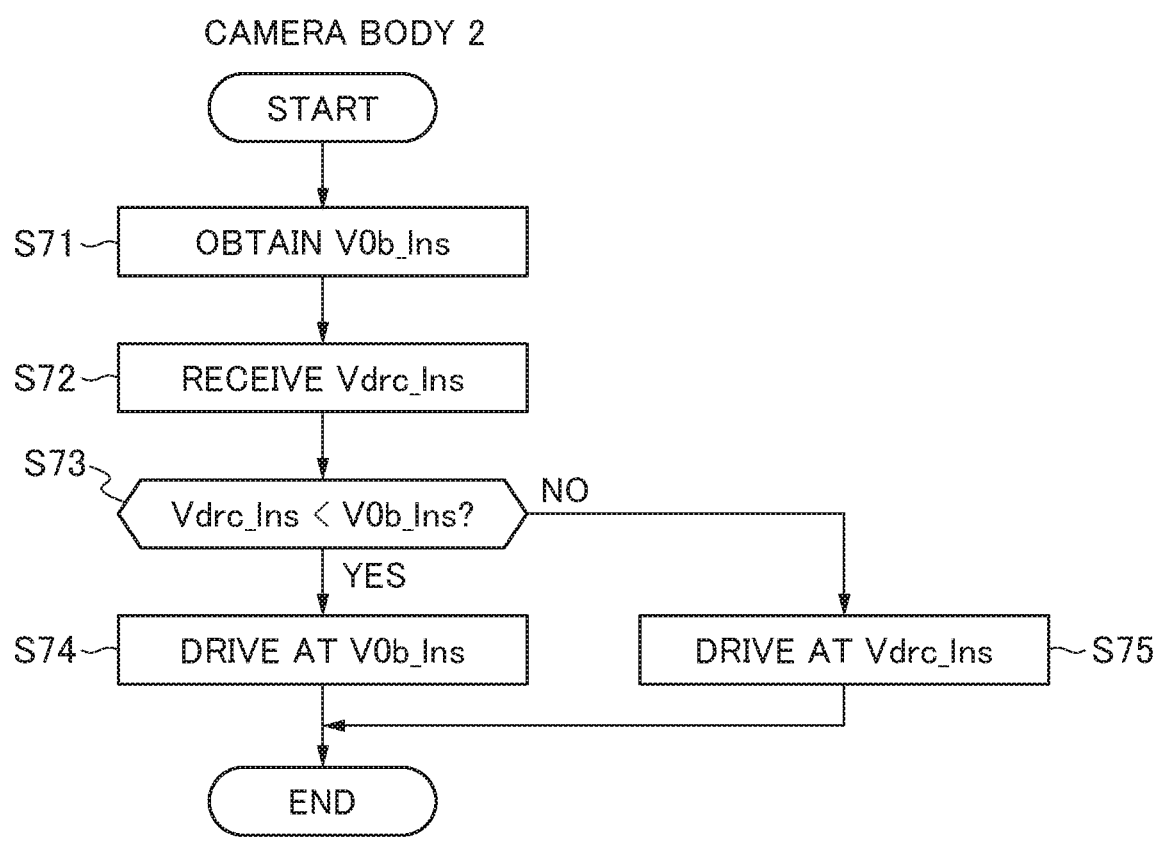
FIG. 22 is a flowchart showing an example of the processing operation to be performed in a lens barrel 3 when a clip operation is permitted.
Figure 23:
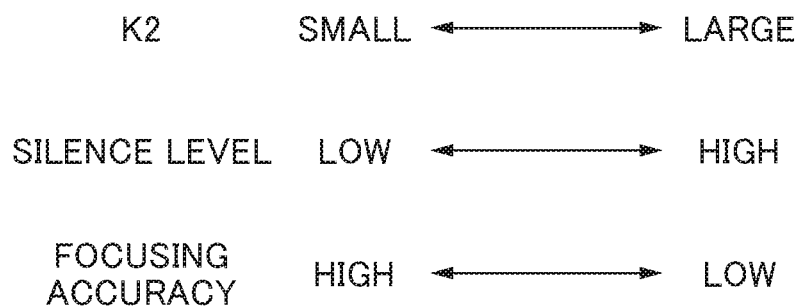
FIG. 23 is a chart schematically showing the relationship between the value of the second coefficient K2, and silence level and focusing accuracy.

Referring now to FIGS. 21 to 23, this embodiment is described in detail.

FIG. 21 is a sequence chart showing an example of a determination to be performed by the camera controller 21 as to whether to permit silence control.

In step S60, the camera controller 21 sets a focus-detection image plane moving speed V1$a$_img (mm/sec).

The focus-detection image plane moving speed V1$a$_img is an image plane moving speed at which the focal point can be detected with a predetermined degree of accuracy. When the peak position of the focus evaluation value is detected through a detection operation (search operation) performed at a search speed equal to or lower than the focus-detection image plane moving speed V1$a$_img, the focal point can be detected with the predetermined degree of accuracy. When the peak position of the focus evaluation value is detected through a detection operation performed at a higher search speed than the focus-detection image plane moving speed V1$a$_img, the focus detection accuracy might not reach the predetermined degree of accuracy.

Therefore, the camera controller 21 preferably transmits a designated driving speed to the lens controller 36 so that the image plane moving speed becomes equal to or lower than the focus-detection image plane moving speed V1$a$_img when a detection operation is performed.

For the second search speed of the above described second embodiment, for example, the camera controller 21 may make the image plane moving speed higher than the focus-detection image plane moving speed V1$a$_img. For the first search speed and the third search speed of the above described second embodiment, the camera controller 21 may make the image plane moving speed equal to or lower than the focus-detection image plane moving speed V1$a$_img.

The focus-detection image plane moving speed V1$a$_img may vary with frame rates, methods of calculating the peak position of the focus evaluation value, or the like. The focus-detection image plane moving speed V1$a$_img is set for each type of the camera body 2, and is stored into the camera memory 24 at the time of shipping from the factory.

The search speed is determined by various conditions. For example, the search speed may vary depending on whether search control is to be started when the release switch is pressed halfway, or whether search control is to be started by some other condition serving as a trigger. The search speed may also vary between the still image shooting mode and the video shooting mode. Further, the search speed may vary with frame rates, focal lengths, shooting distances, aperture values, or the like.

In step S61, before a detection operation by contrast AF is started, the lens controller 36 transmits a silence lower limit lens speed V0$b$_lns (pulses per second) and the second coefficient K2 to the camera controller 21 via the lens communication module 39 and the camera communication module 29. The silence lower limit lens speed V0$b$_lns is the lower limit driving speed of the focusing lens 33 at which the drive noise at a time of driving the focusing lens 33 becomes lower than a predetermined level. The silence lower limit lens speed V0$b$_lns is stored into the lens memory 37 at the time of shipping from the factory, for example.

In step S62, the camera controller 21 receives the silence lower limit lens speed V0$b$_lns and the second coefficient K2 from the lens controller 36.

In step S63, the camera controller 21 converts the silence lower limit lens speed V0$b$_lns (pulses per second) to a silence lower limit image plane moving speed V0$b$_img (mm/sec), using the second coefficient K2. More specifically, the camera controller 21 calculates the silence lower limit image plane moving speed V0$b$_img according to the expression shown below.

$$V0b\_img = V0b\_lns/K2$$

In a case where the second coefficient K2 is the minimum image plane movement coefficient K min, for example, the silence lower limit image plane moving speed V0b_img is equivalent to the image plane moving speed at which the lens speed of the focusing lens 33 becomes equal to the silence lower limit lens speed V0b_lns at the position where the image plane movement coefficient becomes smallest.

In step S64, the camera controller 21 determines whether the expression (4) shown below is satisfied.

$$V1a\_img*B \geq V0b\_img=V0b\_lns/K2 \text{ (however, } 1 \leq B\text{)} \quad (4)$$

As described above, the focus-detection image plane moving speed V1a_img is set at such a value that the focal point can be detected with the predetermined degree of accuracy. The camera controller 21 may make a coefficient B larger as the aperture value becomes greater, for example. In a case where the size of an image such as a live-view image is small (where the image compression rate is high, or the pixel data decimation rate is high), a high focus detection accuracy is not required, and the camera controller 21 may make the coefficient B larger. In a case where the pixel pitch of the imaging element is wide, the camera controller 21 may make the coefficient B larger. Live view is a function that displays the object on a monitor during image shooting so that the operator can perform shooting while visually checking the object.

If the above expression (4) is satisfied (YES in step S64), the camera controller 21 in step S65 permits a clip operation at the silence lower limit lens speed V0b_lns, for example.

For example, in a case where the second coefficient K2 is the minimum image plane movement coefficient K min, if the above expression (4) is satisfied, the image plane moving speed at which the lens speed of the focusing lens 33 becomes equal to the silence lower limit lens speed V0b_lns at the position where the image plane movement coefficient becomes smallest is equal to or lower than V1a_img*B. Thus, even if a clip operation is performed at the silence lower limit lens speed V0b_lns, the focal point can be detected with the predetermined degree of accuracy.

If the above expression (4) is not satisfied (NO in step S65), on the other hand, the camera controller 21 in step S66 prohibits a clip operation.

For example, in a case where the second coefficient K2 is the minimum image plane movement coefficient K min, if the above expression (4) is not satisfied, the image plane moving speed at which the lens speed of the focusing lens 33 becomes equal to the silence lower limit lens speed V0b_lns at the position where the image plane movement coefficient becomes smallest is higher than V1a_img*B. Therefore, if a clip operation is performed at the silence lower limit lens speed V0b_lns at the position where the image plane movement coefficient becomes smallest, the focal point might not be detected with the predetermined degree of accuracy. This is why a clip operation is prohibited in such a case.

In steps S67 and S68, the camera controller 21 transmits a result of the determination as to whether to permit a clip operation or whether to prohibit a clip operation, and a designated driving lens speed (search speed) to the lens controller 36 of the lens barrel 3 via the camera communication module 29 and the lens communication module 39. The search speed is preferably transmitted at the lens speed (pulses per second), not at the image plane moving speed (mm/sec), for example.

FIG. 22 is a flowchart showing an example of the processing operation to be performed in the lens barrel 3 when the camera controller determines to permit silence control.

In step S71, the lens controller 36 obtains the silence lower limit lens speed V0b_lns stored in the lens memory 37.

In step S72, the lens controller 36 receives a designated driving lens speed (search speed) Vdrc_lns (pulses per second) from the camera controller 21 via the lens communication module 39 and the camera communication module 29.

The designated driving lens speed Vdrc_lns is lower than the focus-detection image plane moving speed V1a_img, and is such a speed that the image plane moving speed becomes constant, for example. The camera controller 21 sets the designated driving lens speed Vdrc_lns, using the focus-detection image plane moving speed V1a_img, the current-position image plane movement coefficient Kcur, various image shooting conditions, image shooting settings, and the like.

In step S73, the lens controller 36 compares the designated driving lens speed Vdrc_lns with the silence lower limit lens speed V0b_lns.

If the designated driving lens speed Vdrc_lns is lower than the silence lower limit lens speed V0b_lns (YES in step S73), the lens controller 36 in step S74 drives the focusing lens 33 at the silence lower limit lens speed V0b_lns, not at the designated driving lens speed Vdrc_lns (a detection operation (a search operation)). This is because, if the focusing lens 33 is driven at the designated driving lens speed Vdrc_lns, the focusing lens 33 is driven at a lower driving speed than the silence lower limit lens speed V0b_lns, and the drive noise at the time of driving the focusing lens 33 becomes equal to or larger than the predetermined level. As silence control (a clip operation) is permitted, the focal point can be detected with the predetermined degree of accuracy even if the driving speed is clipped with the silence lower limit lens speed V0b_lns. However, as a result of a detection operation performed at the driving speed clipped with the silence lower limit lens speed V0b_lns so that the speed of the focusing lens 33 becomes constant, the focus detection accuracy might become lower than in a case where a detection operation is performed so that the moving speed of the image plane becomes constant.

If the designated driving lens speed Vdrc_lns is equal to or higher than the silence lower limit lens speed V0b_lns (NO in step S73), on the other hand, the lens controller 36 in step S75 drives the focusing lens 33 at the designated driving lens speed Vdrc_lns (a detection operation (a search operation)). This is because, even if the focusing lens 33 is driven at the designated driving lens speed Vdrc_lns, no noise is generated.

As described above, in this embodiment, the camera controller determines whether to permit silence control. Therefore, when silence control is permitted, the driving speed of the focusing lens 33 is clipped with the silence lower limit lens speed V0b_lns, in accordance with the determination (step S73) made by the lens controller 36. Thus, generation of drive noise equal to or higher than the predetermined level can be reduced. When silence control is prohibited by the camera controller, on the other hand, clipping is not performed in accordance with the determination (step S73) made by the lens controller 36. Thus, the focal point can be detected with the predetermined degree of accuracy.

Also, as a detection operation is performed so that the moving speed of the image plane becomes constant, the focal point detection accuracy can be expected to become higher than in a case where a detection operation is performed so that the speed of the focusing lens 33 becomes constant.

In a case where the second coefficient K2 is the current-position image plane movement coefficient Kcur, the camera controller 21 more easily determines to permit silence control, the driving speed of the focusing lens 33 is more easily clipped in accordance with the determination (step S73) made by the lens controller 36, and silence control can be performed in a more reliable manner than in a case where the second coefficient K2 is the minimum image plane movement coefficient K min. Therefore, in a lens barrel 3 suitable for video shooting, a second coefficient K2=$K_{cur}$ may be stored into the lens memory 37 at the time of shipping from the factory. In a lens barrel 3 suitable for still image shooting, a second coefficient K2=$K_{min}$ may be stored into the lens memory 37 at the time of shipping from the factory, for example.

FIG. 23 is a chart schematically showing the relationship between the value of the second coefficient K2, and silence level and focusing accuracy. As is apparent from the above expression (4), where the second coefficient K2 is small, the probability of clip operation prohibition is high. As a result, where the second coefficient K2 is small, a clip operation is not easily permitted, and the focusing accuracy can be expected to become higher. On the other hand, where the second coefficient K2 is large, a clip operation is easily permitted. As a result, where the second coefficient K2 is large, a clip operation is easily permitted, and silence level becomes higher.

In view of this, the second coefficient K2 should be appropriately set, with the balance between silence level and focusing accuracy being taken into account. For example, in a case where priority is given to focusing accuracy, the second coefficient K2 can be set at a small value (the minimum image plane movement coefficient $K_{min}$, for example). In a case where priority is given to silence level, the second coefficient K2 can be set at a large value (the current-position image plane movement coefficient $K_{cur}$, for example). It is of course also possible to set the second coefficient K2 at a value between the minimum image plane movement coefficient $K_{min}$ and the current-position image plane movement coefficient $K_{cur}$, or at a smaller value than the minimum image plane movement coefficient $K_{min}$.

As described above, in the fifth embodiment, the lens controller 36 transmits the second coefficient K2, and the camera controller 21 determines whether to permit silence control (a clip operation) or whether to prohibit silence control (a clip operation). If a predetermined condition is satisfied when silence control is permitted by the camera controller 21, the lens controller 36 performs a clip operation. In this manner, the drive noise of the focusing lens can be reduced to a lower level than a predetermined level. Also, the balance between silence level and focusing accuracy can be adjusted with the value of the second coefficient K2 on the side of the lens barrel 3.

Sixth Embodiment

A sixth embodiment concerns a digital single-lens reflex camera that includes a lens barrel 3 equipped with a focus limiter switch, and a camera body 2. A focus limiter switch is a switch that can be operated by a user to set a drivable range of the focusing lens 33. By operating the focus limiter switch and selecting a focus limited mode, the user can drive the focusing lens 33 in a desired drivable range.

Figure 24:
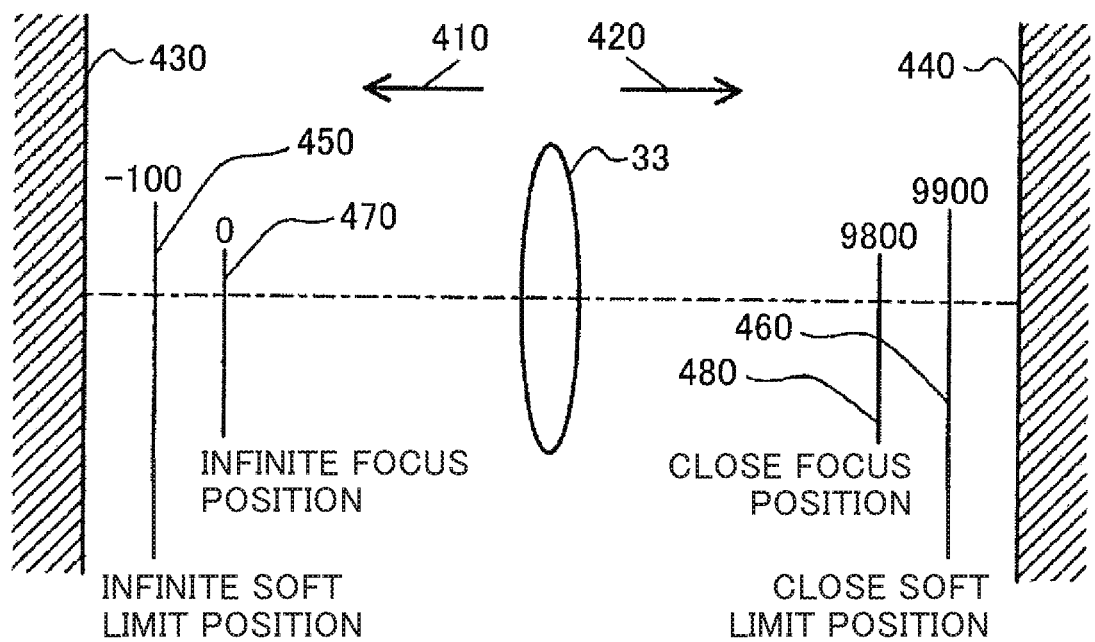
FIG. 24 shows the drive range of the focusing lens 33.

FIG. 24 is a diagram showing the drive range of the focusing lens 33. As shown in this drawing, the focusing lens 33 is designed to be movable in an infinite-end direction 410 and a close-end direction 420 on an optical axis L1 indicated by a dot-and-dash line in the drawing. Stoppers (not shown) are provided at the mechanical end point 430 in the infinite-end direction 410 and the mechanical endpoint 440 in the close-end direction 420, and mechanically limit movement of the focusing lens 33. That is, the focusing lens 33 is designed to be movable from the mechanical end point 430 in the infinite-end direction 410 to the mechanical end point 440 in the close-end direction 420.

However, the range in which the focusing lens 33 is actually driven by the lens controller 36 is the range from an infinite soft limit position 450 to a close soft limit position 460, which is narrower than the above-mentioned range from the mechanical end point 430 to the mechanical end point 440. The infinite soft limit position 450 and the close soft limit position 460 are designed for electrically limiting movement of the focusing lens 33. This movement range is now described in detail. The lens controller 36 drives the focusing lens 33 in the range from the infinite soft limit position 450 located on the inner side of the mechanical end point 430 in the infinite-end direction 410 to the close soft limit position 460 located on the inner side of the mechanical end point 440 in the close-end direction 420. That is, the lens driver 212 drives the focusing lens 33 between the close soft limit position 460 corresponding to the position of the drive limit on the close side and the infinite soft limit position 450 corresponding to the position of the drive limit on the infinite side.

The infinite soft limit position 450 is located on the outer side of an infinite focus position 470. It should be noted that the infinite focus position 470 is the position of the focusing lens 33, which corresponds to the most infinite-side position on which the imaging optical system including lenses 31, 32, 33, and 34, and a diaphragm 35 can focus. The reason why the infinite soft limit position 450 is located at such a position is that the peak focus evaluation value exists at the infinite focus position 470 when focus detection is performed by the contrast detection method. That is, if the infinite focus position 470 is located at the infinite soft limit position 450, the peak focus evaluation value existing at the infinite focus position 470 cannot be recognized as a peak. To avoid such a problem, the infinite soft limit position 450 is located on the outer side of the infinite focus position 470.

Likewise, the close soft limit position 460 is located on the outer side of a close focus position 480. It should be noted that the close focus position 480 is the position of the focusing lens 33, which corresponds to the most close-side position on which the imaging optical system including the lenses 31, 32, 33, and 34, and the diaphragm 35 can focus.

As described above, the range in which drive control is performed on the focusing lens 33 by the lens controller 36 is the range from the infinite soft limit position 450 to the close soft limit position 460.

The close focus position 480 can be set in the accordance with aberration or the like. This is because, in a case where focusing can be performed by driving the focusing lens 33 to a position on the close side of the set close focus position 480, if the aberration is poor, the position is not suitable as part of the lens usable range.

In this embodiment, the position of the focusing lens 33 can be represented by the number of pulses of a drive signal to be supplied from the lens controller 36 to a lens drive motor 321. In this case, the number of pulses can be regarded as the origin (reference) of the infinite focus position 470. For example, in the example shown in FIG. 5, the infinite soft limit position 450 is the position with "−100 pulses", the close focus position 480 is the position with "9800 pulses", and the close soft limit position 460 is the position with "9900 pulses". In this case, to move the focusing lens 33 from the infinite soft limit position 450 to the close soft limit position 460, a drive signal equivalent to 10000 pulses needs to be supplied to the lens drive motor 321. However, this embodiment is not limited to this particular mode.

Figure 26:
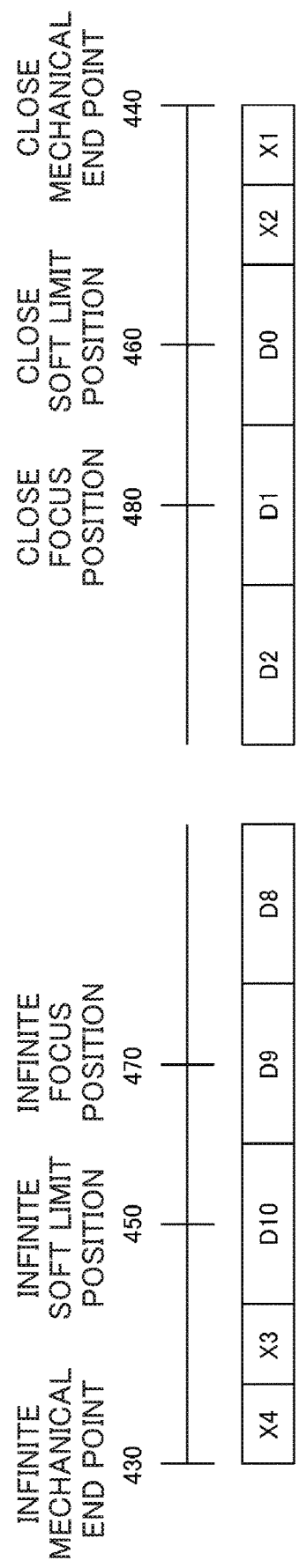
FIG. 26 is a chart showing the relationship between the drive range of the focusing lens 33 and the position of the focusing lens 33.

FIG. 25 is a table showing the relationship between image plane movement coefficients K, and lens positions (focal lengths) of the zoom lens 32 and lens positions (shooting distances) of the focusing lens 33. FIG. 26 is a chart showing the relationship between the drive range of the focusing lens 33 and the position of the focusing lens 33. In an example of this embodiment, the closer the position of the focusing lens 33 to the close side, the smaller the image plane movement coefficient.

As shown in FIG. 25, image plane movement coefficients K are defined outside the drive control range of the focusing lens 33 to be controlled by the lens controller 36. Specifically, as shown in FIG. 26, a region including the close focus position 480 corresponds to a shooting distance D1. Outside this region (on the side of the close mechanical end point 440), a region including the close soft limit position 460 corresponds to a shooting distance D0, a region including the close mechanical endpoint 440 corresponds to a shooting distance X2, and a region even closer to the close end corresponds to a shooting distance X1. Likewise, a region including the infinite focus position 470 corresponds to a shooting distance D9. Outside this region (on the side of the infinite mechanical end point 430), a region including the infinite soft limit position 450 corresponds to a shooting distance D10, a region including the infinite mechanical end point 430 corresponds to a shooting distance X3, and a region even closer to the infinite end corresponds to a shooting distance X4. The respective image plane movement coefficients K at the shooting distances X1 through X4 and D0 through D10 and focal lengths f1 through f9 are included in the table.

For example, the values of the image plane movement coefficients "α11", "α21", ... "α91" at the shooting distance "X1" are smaller than the values of the image plane movement coefficients "K10", "K20", ... "K90" in the shooting distance "D0" region. Likewise, the values of the image plane movement coefficients "α12", "α22", ... "α92" at the shooting distance "X2" are smaller than the values of the image plane movement coefficients "K10", "K20", ... "K90" at the shooting distance "D0". Also, the values of the image plane movement coefficients "α13", "α23", ... "α93" at the shooting distance "X3" are greater than the values of the image plane movement coefficients "K110", "K210", ... "K910" at the shooting distance "D10". The values of the image plane movement coefficients "α14", "α24", ... "α94" at the shooting distance "X4" are greater than the values of the image plane movement coefficients "K110", "K210", ... "K910" at the shooting distance "D10".

In this case, the minimum image plane movement coefficients $K_{min}$ may be the image plane movement coefficients K ("α11", "α21", ... "α91") at "X1", may be the image plane movement coefficients K ("α12", "α22", ... "α92") at "X2", or may be the image plane movement coefficients K ("K10", "K20", ... "K90") at "D0". In this case, the maximum image plane movement coefficients $K_{max}$ may be the image plane movement coefficients K ("α14", "α24", ... "α94") at "X4", may be the image plane movement coefficients K ("α13", "α23", ... "α93") at "X3", or may be the image plane movement coefficients K ("K110", "K210", ... "K910") at "D10".

Figure 27:
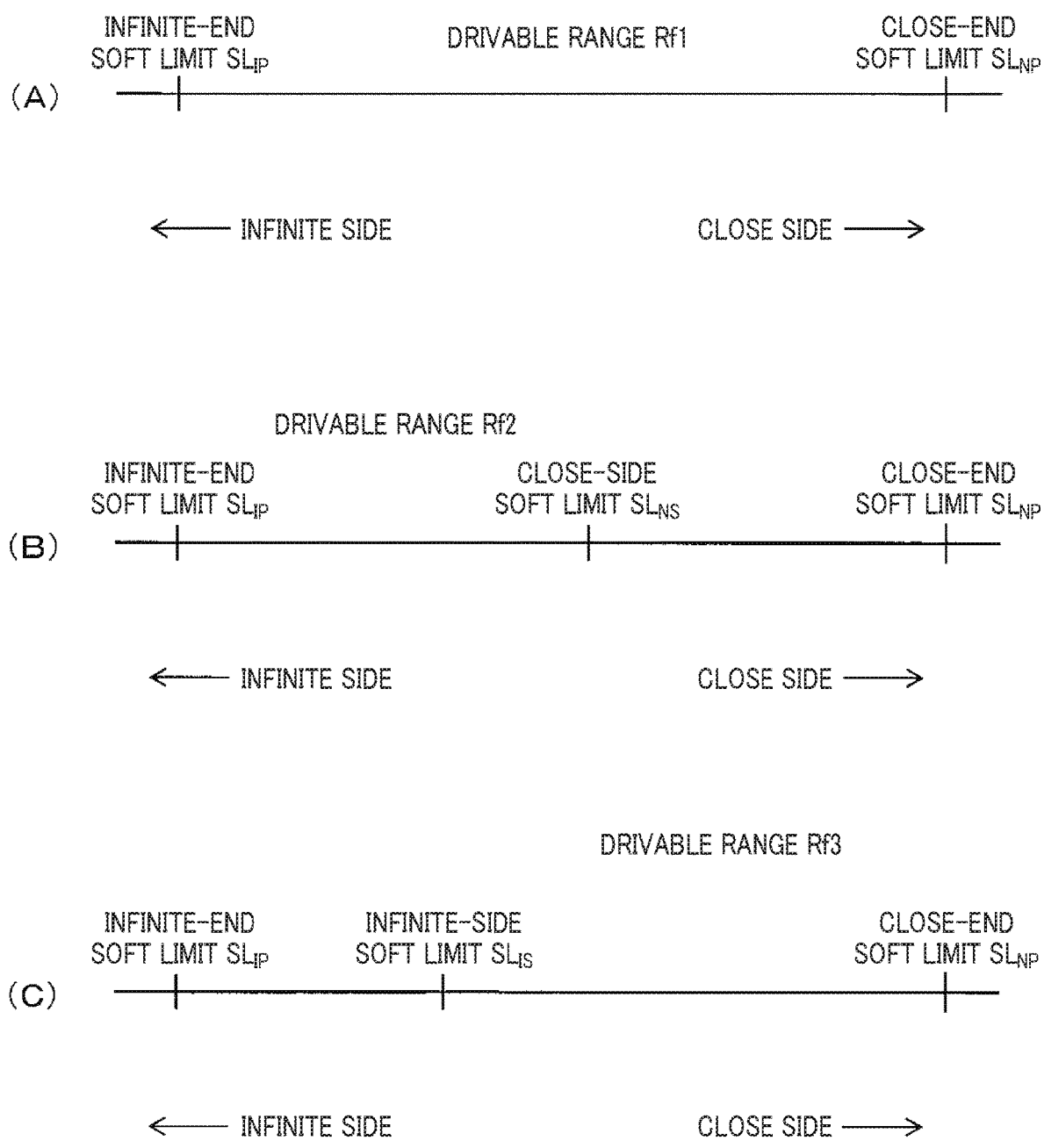
FIGS. 27(A) to 27(C) are charts each showing an example of a drivable range.

FIGS. 27(A) to 27(C) are charts each showing an example of a drivable range (focus limited mode) that is set by a user operating the focus limiter switch (not shown). The range in which the lens controller 36 does not detect a peak focus evaluation value in a search operation by contrast AF is shown in gray. In this embodiment, by operating the focus limiter switch, a user can set three focus limited modes of "FULL mode", "close-side limited mode", and "infinite-side limited mode", as shown in FIGS. 27(A) to 27(C).

The "FULL mode" is a mode for detecting a peak focus evaluation value within the range from an infinite-end soft limit $SL_{IP}$ to a close-end soft limit $SL_{NP}$ in a search operation (detection operation) by contrast AF. As shown in FIG. 27(A), the range from the lens position at the infinite-end soft limit $SL_{IP}$ to the lens position at the close-end soft limit $SL_{NP}$ is set as a range Rf1 in which driving can be performed in a search operation (detection operation).

Also, the "close-side limited mode" is a mode for detecting a peak focus evaluation value within the range from the infinite-end soft limit $SL_{IP}$ to a close-side soft limit $SL_{NS}$ in a search operation by contrast AF. As shown in FIG. 26(B), the range from the lens position at the infinite-end soft limit $SL_{IP}$ to the lens position at the close-side soft limit $SL_{NS}$ is set as a range Rf2 in which driving can be performed in a search operation.

Further, the "infinite-side limited mode" is a mode for detecting a peak focus evaluation value within the range from an infinite-side soft limit $SL_{IS}$ to the close-end soft limit $SL_{NP}$ in a search operation by contrast AF. As shown in FIG. 26(C), the range from the lens position at the infinite-side soft limit $SL_{IS}$ to the lens position at the close-end soft limit $SL_{NP}$ is set as a range Rf3 in which driving can be performed in a search operation.

Using the focus limiter switch (not shown) provided on the outer side of the lens barrel 3, for example, a user can set the drivable range to "FULL mode", "close-side limited mode", or "infinite-side limited mode".

Referring now to FIG. 25 and FIGS. 27(A) to 27(C), operations of the lens barrel 3 are described. In the example operations described below, the minimum image plane movement coefficients $K_{min}$ are set as the image plane movement coefficients K ("K10", "K20", ... "K90") at "D0" shown in FIG. 25, and the maximum image plane movement coefficients $K_{max}$ are set as the image plane movement coefficients K ("K110", "K210", ... "K910") at "D10" shown in FIG. 25.

First, a case where contrast AF is performed when the user sets "FULL mode" shown in FIG. 27(A) is described. In this case, the lens controller 36 performs the above described initial driving, search driving, and focusing driving. When a transmission request for the first coefficient K1, the second coefficient K2, and the third coefficient K3 is issued from the camera controller 21 (see step 104 in FIG. 7), the lens controller 36 transmits a current-position image plane movement coefficient $K_{cur}$ (the current-position image plane movement coefficient of the focusing lens 33) as the first coefficient K1, a minimum image plane movement coefficient $K_{min}$ (K30, for example) as the second coefficient K2, and a maximum image plane movement coefficient $K_{max}$ (K310, for example) as the third coefficient K3.

Next, a case where the user sets "close-side limited mode" shown in FIG. 27(B) is described. The close-side soft limit $SL_{NS}$ is D5, for example.

If the position of the focusing lens 33 at the start of contrast AF is D7 (a region in which a peak focus evaluation value is detected), for example, the lens controller 36 drives and controls the focusing lens 33 within the region in which a peak focus evaluation value is detected, during the above described initial driving, search driving, and focusing driving. In response to a request from the camera controller 21, the lens controller 36 also transmits a current-position image plane movement coefficient $K_{cur}$ (the current-position image plane movement coefficient of the focusing lens 33) as the first coefficient K1, the image plane movement coefficient (K35, for example) corresponding to the position D5 as the second coefficient K2, and a maximum image plane movement coefficient $K_{max}$ (K310, for example) as the third coefficient K3. As the focusing lens 33 is driven and controlled within the region in which a peak focus evaluation value is detected, it is preferable to use the image plane movement coefficient (K35, for example) corresponding to the position D5 at the close-side soft limit $SL_{NS}$ as the second coefficient K2, rather than the minimum image plane movement coefficient $K_{min}$ corresponding to the position D0 outside the area in which a peak focus evaluation value is detected. In this manner, preferable control can be performed.

On the other hand, if the position of the focusing lens 33 at the start of contrast AF is D3 (a region in which a peak focus evaluation value is not detected; shown in gray in FIG. 27(B)), for example, the lens controller 36 first drives the focusing lens 33 to the side of the infinite end. As a result, the position of the focusing lens 33 varies from D3 to D4 to D5. If a transmission request for the second coefficient K2 is issued from the camera controller 21 when the position of the focusing lens 33 is D3, the lens controller 36 transmits the image plane movement coefficient (K33, for example) corresponding to the position D3. If a transmission request for the second coefficient K2 is issued when the position of the focusing lens 33 is D4, the lens controller 36 transmits the image plane movement coefficient (K34, for example) corresponding to the position D4. This is because the image plane movement coefficients corresponding to the positions D3 and D4 are smaller than the image plane movement coefficient corresponding to the position D5 at the close-side soft limit $SL_{NS}$. When the position of the focusing lens 33 is D3 or D4, a current-position image plane movement coefficient $K_{cur}$ (the current-position image plane movement coefficient of the focusing lens 33) is transmitted as the first coefficient K1, and a maximum image plane movement coefficient $K_{max}$ (K310, for example) is transmitted as the third coefficient K3.

After the focusing lens 33 reaches the position D5, the lens controller 36 drives and controls the focusing lens 33 within a region in which a peak focus evaluation value is detected during the initial driving, search driving, and focusing driving. At this point of time, in response to a request from the camera controller 21, the lens controller 36 transmits a current-position image plane movement coefficient $K_{cur}$ (the current-position image plane movement coefficient of the focusing lens 33) as the first coefficient K1, the image plane movement coefficient (K35, for example) corresponding to the position D5 as the second coefficient K2, and a maximum image plane movement coefficient $K_{max}$ (K310, for example) as the third coefficient K3.

Next, a case where the user sets "infinite-side limited mode" shown in FIG. 27(C) is described. The infinite soft limit $SL_{IS}$ is D7, for example.

If the position of the focusing lens 33 at the start of contrast AF is D9 (a region in which a peak focus evaluation value is not detected; shown in gray in FIG. 27(C)), for example, the lens controller 36 first drives the focusing lens 33 to the side of the close end. As a result, the position of the focusing lens 33 varies from D9 to D7. If a transmission request for the third coefficient K3 is issued from the camera controller 21 when the position of the focusing lens 33 is D9 or D8, the lens controller 36 transmits the image plane movement coefficient corresponding to the position D9 or D8. At this point of time, in response to a request from the camera controller 21, the lens controller 36 transmits a current-position image plane movement coefficient $K_{cur}$ as the first coefficient K1 and a minimum image plane movement coefficient $K_{min}$ as the second coefficient K2.

When the focusing lens 33 reaches the position D5 after that, and if the position of the focusing lens 33 has remained in the region in which a peak focus evaluation value is detected since the start of the contrast AF, the lens controller 36 drives and controls the focusing lens 33 within the region in which a peak focus evaluation value is detected during the initial driving, search driving, and focusing driving. In response to a request from the camera controller 21, the lens controller 36 transmits a current-position image plane movement coefficient $K_{cur}$ as the first coefficient K1, a minimum image plane movement coefficient $K_{min}$ as the second coefficient K2, and the image plane movement coefficient (K37, for example) corresponding to the position D7 as the third coefficient K3, to the camera controller 21.

In this embodiment, the lens controller 36 can also set the first coefficient K1, the second coefficient K2, and the third coefficient K3 as appropriate, and the camera controller 21 then performs control using at least one coefficient among the first coefficient K1, the second coefficient K2, and the third coefficient K3. Thus, various kinds of control can be performed in accordance with the characteristics, the usage conditions, and the like of the lens barrel.

As described so far, in this embodiment, a current-position image plane movement coefficient $K_{cur}$ is transmitted as the first coefficient K1 from the lens barrel 3 to the camera body 2. Thus, the camera body 2 can perform a contrast AF process with high accuracy.

Further, in this embodiment, a value equal to or smaller than the first coefficient K1 is transmitted as the second coefficient K2 from the lens barrel 3 to the camera body 2. Thus, the camera body 2 can perform high-speed search determination, anomaly determination, backlash elimination determination and/or clip operation determination, or the like. As the value of the second coefficient K2 is adjusted, the balance between features in a trade-off relationship can be adjusted on the side of the lens barrel 3.

It should be noted that, using the second coefficient K2, the camera body 2 may perform all the high-speed search determination, the anomaly determination, the backlash elimination determination, and the clip operation determination, or may perform at least one of these determination processes.

Also, in a case where the position of the focusing lens 33 corresponding to the minimum image plane movement coefficient $K_{min}$ is closer to the close end than the position of the focusing lens 33 corresponding to the maximum image plane movement coefficient $K_{max}$ is, the position of the focusing lens 33 corresponding to the minimum image plane movement coefficient $K_{min}$ may be the close focus position, the close soft limit position, the close mechanical end point, a position between the close focus position and the close mechanical end point, or a position closer to the close end than the close mechanical endpoint is, for example, and the position of the focusing lens 33 corresponding to the maximum image plane movement coefficient $K_{max}$ may be the infinite focus position, the infinite soft limit position, the infinite mechanical end point, a position between the infinite focus position and the infinite mechanical end point, or a position closer to the infinite end than the infinite mechanical end point is.

Likewise, in a case where the position of the focusing lens 33 corresponding to the minimum image plane movement coefficient $K_{min}$ is closer to the infinite end than the position of the focusing lens 33 corresponding to the maximum image plane movement coefficient $K_{max}$ is, the position of the focusing lens 33 corresponding to the minimum image plane movement coefficient $K_{min}$ may be the infinite focus position, the infinite soft limit position, the infinite mechanical end point, a position between the infinite focus position and the infinite mechanical end point, or a position closer to the infinite end than the infinite mechanical end point is, for example, and the position of the focusing lens 33 corresponding to the maximum image plane movement coefficient $K_{max}$ may be the close focus position, the close soft limit position, the close mechanical end point, a position between the close focus position and the close mechanical end point, or a position closer to the close end than the close mechanical end point is, for example.

Likewise, the maximum image plane movement coefficient $K_{max}$ may be of the infinite focus position (close focus position), of the infinite soft limit position (close soft limit position), of the infinite mechanical end point (close mechanical end point), of a position between the infinite focus position (close focus position) and the infinite mechanical end point (close mechanical end point), or of a position closer to the infinite end (close end) than the infinite mechanical end point (close mechanical end point) is, for example.

It should be noted that the embodiments described above are disclosed to facilitate understanding of the present invention, and do not limit the present invention. Therefore, the components disclosed in the above embodiments include all design modifications and equivalents within the technical scope of the invention. Also, the above embodiments may be combined in any appropriate manner.

REFERENCE SIGNS LIST

1 Digital single-lens reflex camera
2 Camera body
21 Camera controller
29 Camera communication module
3 Lens barrel
32 Zoom lens
33 Focusing lens
36 Lens controller
37 Lens memory
39 Lens communication module

The invention claimed is:

1. An interchangeable lens attachable to a camera body, comprising:
    an optical system comprising a focus lens movable in a direction of an optical axis; and
    a transmitter configured to repeatedly transmit a set of information to the camera body, the set of information comprising first information, second information, and third information, the set of information indicating a relationship between a movement amount of the focus lens and a movement amount of an image of the optical system, wherein
    a value indicating a relationship between the movement amount of the focus lens corresponding to a position of the focus lens and the movement amount of the image of the optical system is set to the first information of the set of information, and
    a value indicating the first information is set to second information of the set of information.

2. The interchangeable lens according to claim 1, further comprising:
    a receiver configured to repeatedly receive a request signal from the camera body,
    wherein the transmitter is configured to transmit the set of information to the camera body each time the receiver receives the request signal.

3. The interchangeable lens according to claim 1, further comprising:
    a detector configured to detect the position of the focus lens on the optical axis,
    wherein the value indicating the relationship between the movement amount of the focus lens at the position of the focus lens detected by the detector, and the movement amount of the image of the optical system at the position of the focus lens on the optical axis detected by the detector, is set to the first information.

4. A camera body attachable to the interchangeable lens according to claim 1.

5. A camera comprising:
    the interchangeable lens according to claim 1; and
    a camera body attachable to the interchangeable lens.

6. The interchangeable lens according to claim 1, further comprising:
    a clock terminal to which a clock signal is inputted; and
    a data terminal positioned next to the clock terminal, from which data is transmitted to the camera body in synchronization with the clock signal, wherein
    the transmitter performs communication via the clock terminal and the data terminal, and
    the set of information is transmitted via the data terminal.

* * * * *